United States Patent
Ikeda et al.

(10) Patent No.: US 12,322,079 B2
(45) Date of Patent: Jun. 3, 2025

(54) INSPECTION DEVICE, INSPECTION METHOD, AND RECORDING MEDIUM FOR INSPECTING AN INSPECTION TARGET WITH MACHINE LEARNING

(71) Applicant: Mitsubishi Electric Corporation, Tokyo (JP)

(72) Inventors: Yuichi Ikeda, Tokyo (JP); Kazuyuki Miyazawa, Tokyo (JP); Akira Minezawa, Tokyo (JP); Yukihiro Toku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 554 days.

(21) Appl. No.: 17/597,400

(22) PCT Filed: Jul. 9, 2020

(86) PCT No.: PCT/JP2020/026795
§ 371 (c)(1),
(2) Date: Jan. 5, 2022

(87) PCT Pub. No.: WO2021/010269
PCT Pub. Date: Jan. 21, 2021

(65) Prior Publication Data
US 2022/0277439 A1    Sep. 1, 2022

(30) Foreign Application Priority Data
Jul. 18, 2019  (JP) .................................. 2019-132473

(51) Int. Cl.
*G06T 7/00* (2017.01)
*G06T 7/70* (2017.01)
*H04N 23/56* (2023.01)

(52) U.S. Cl.
CPC .............. *G06T 7/0004* (2013.01); *G06T 7/70* (2017.01); *H04N 23/56* (2023.01); *G06T 2207/20081* (2013.01); *G06T 2207/30136* (2013.01)

(58) Field of Classification Search
CPC ..................... G06T 7/0004; G06T 7/70; G06T 2207/20081; G06T 2207/30136;
(Continued)

(56) References Cited

U.S. PATENT DOCUMENTS

2009/0034829 A1\* 2/2009 Hamada ................. G01N 21/95
382/144
2015/0098655 A1\* 4/2015 Chang .................... G06T 7/001
382/192
(Continued)

FOREIGN PATENT DOCUMENTS

CN    101163960 A    4/2008
JP    H08114557 A    5/1996
(Continued)

OTHER PUBLICATIONS

KR 20190016733 A: Original and English Translation (Year: 2019).\*
(Continued)

*Primary Examiner* — Sumati Lefkowitz
*Assistant Examiner* — Aaron Joseph Sorrin
(74) *Attorney, Agent, or Firm* — Buchanan Ingersoll & Rooney PC

(57) ABSTRACT

A position detector applies an image to be inspected to a position detection model generated by machine learning using image information of a training image to calculate a score for a portion of an image to be inspected. The position detector specifies a portion of the image where the calculated score is a score that satisfies a predetermined relationship to detect the position of a metal part in the image to be
(Continued)

inspected. A position outputter outputs the position of the metal part detected by the position detector.

19 Claims, 29 Drawing Sheets

(58) Field of Classification Search
CPC ......... G06T 2207/20104; G06T 7/0008; G06T 7/74; G06T 2207/20084; G06T 2207/20132; G06T 2207/30116; G06T 2207/30148; G06T 2207/30152; G06T 2207/30164; G06T 7/73; H04N 23/56; G06N 3/045; G06N 3/08; G06N 20/00; G01B 11/002; G01B 21/045; G01N 2021/8883; G01N 2021/8887; G01N 21/8851; G01N 21/95684
See application file for complete search history.

(56) References Cited

U.S. PATENT DOCUMENTS

2018/0260628 A1  9/2018  Namiki et al.
2019/0308320 A1* 10/2019  Konishi ................. G06V 20/64

FOREIGN PATENT DOCUMENTS

| JP | H1091785 A | | 4/1998 |
| JP | 2001059795 A | * | 3/2001 |
| JP | 2019109563 A | | 7/2019 |
| KR | 20190016733 A | * | 2/2019 |

OTHER PUBLICATIONS

JP2001059795A—english translation (Year: 2001).*
Extended European Search Report dated Aug. 31, 2022, issued in corresponding European Patent Application No. 20840267.7, 8 pages.
International Search Report (PCT/ISA/210) with English translation and Written Opinion (PCT/ISA/237) mailed on Oct. 13, 2020, by the Japan Patent Office as the International Searching Authority for International Application No. PCT/JP2020/026795.
First Office Action dated Mar. 24, 2025, issued in the corresponding Chinese Patent Application No. 202080050643.0, 17 pages including 8 pages of English Translation.

* cited by examiner

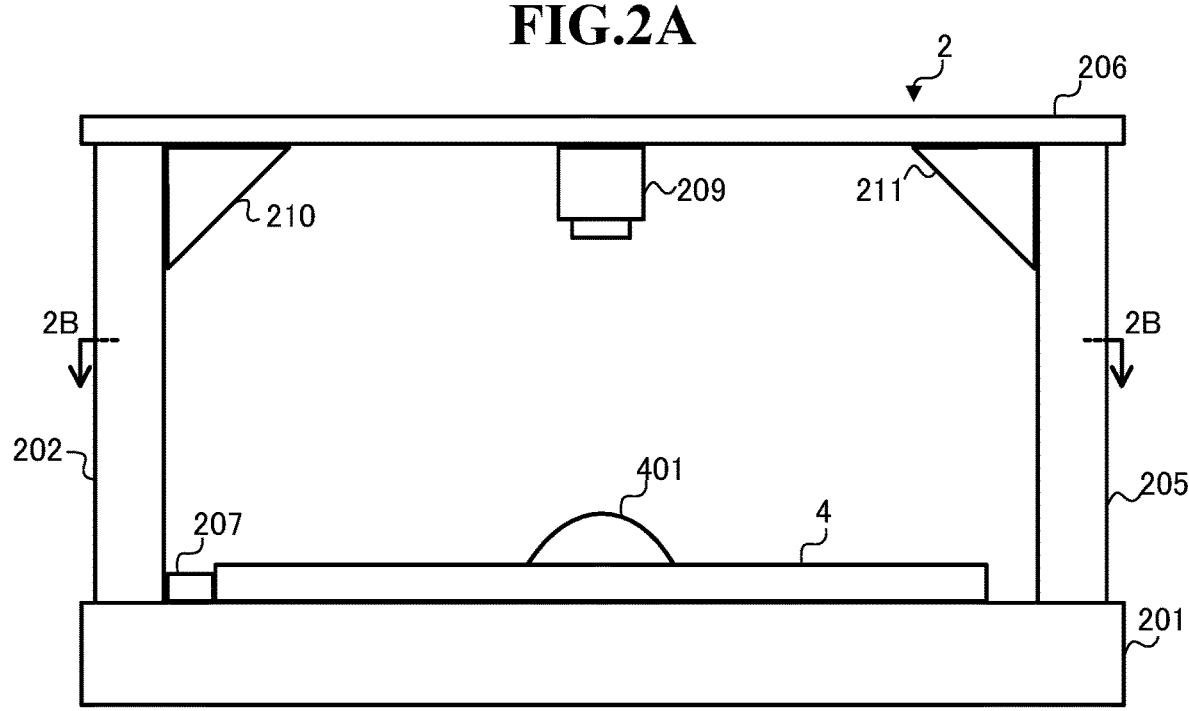

FIG.5A

| | DEVICE SETTING INFORMATION | | | | |
|---|---|---|---|---|---|
| PRODUCT NAME | INSPECTION IMAGE INFORMATION TEMPORARY STORAGE REGION | TRAINING IMAGE INFORMATION STORAGE REGION | POSITION TRAINING INFORMATION STORAGE REGION | ABNORMALITY TRAINING INFORMATION STORAGE REGION | IMAGE SIZE |
| SUBSTRATE A | FA1 | FA2 | FA3 | FA4 | SZA1 |
| SUBSTRATE B | FB1 | FB2 | FB3 | FB4 | SZB1 |
| : | : | : | : | : | : |

FIG.5B

| PRODUCT SETTING LIST INFORMATION | | | |
|---|---|---|---|
| PRODUCT NAME | POSITION INSPECTION REFERENCE | POSITION INSPECTION STANDARD | ABNORMALITY INSPECTION STANDARD |
| SUBSTRATE A | (XA1,YA1) | (XA2,YA2) | SZA3 |
| SUBSTRATE B | (XB1,YB1) | (XB2,YB2) | SZB3 |
| : | : | : | : |

FIG.5C

| POSITION INSPECTION SETTING INFORMATION | | | | | | |
|---|---|---|---|---|---|---|
| PRODUCT NAME | POSITION DETECTION RANGE | PATTERN SIZE | OFFSET | MODEL FORMAT | MASK SIZE | SCORE THRESHOLD |
| SUBSTRATE A | XSA1~XEA1, YSA1~YEA1 | (WA1,LA1) | (XOA1,YOA1) | MA1 | (MWA1,MLA1) | SA1 |
| SUBSTRATE B | XSB1~XEB1, YSB1~YEB1 | (WB1,LB1) | (XOB1,YOB1) | MB1 | (MWB1,MLB1) | SB1 |
| : | : | : | : | : | : | : |

FIG.5D

| ABNORMALITY INSPECTION SETTING INFORMATION ||||||||
|---|---|---|---|---|---|---|---|
| PRODUCT NAME | ABNORMALITY DETECTION RANGE | PATTERN SIZE | MODEL FORMAT | SCORE THRESHOLD ||||
| | | | | RUST | DISTORTION | DENT | DEPOSIT |
| SUBSTRATE A | XSA2~XEA2, YSA2~YEA2 | (WA2,LA2) | MA2 | SA21 | SA22 | SA23 | SA24 |
| SUBSTRATE B | XSB2~XEB2, YSB2~YEB2 | (WB2,LB2) | MB2 | SB21 | SB22 | SB23 | SB24 |
| : | : | : | : | : | : | : | : |

FIG.6

| PRODUCT NAME | POSITION TRAINING | MEASUREMENT VALUE |
|---|---|---|
| SUBSTRATE A | X COORDINATE | 261 |
| | Y COORDINATE | 115 |
| SUBSTRATE B | X COORDINATE | 386 |
| | Y COORDINATE | 225 |
| : | : | : |

FIG.7

| PRODUCT NAME | ABNORMALITY TRAINING | X COORDINATE | Y COORDINATE | CATEGORY | SIZE |
|---|---|---|---|---|---|
| SUBSTRATE A | 1 | 110 | 170 | DEPOSIT | 16 |
| | : | : | : | : | : |
| SUBSTRATE B | 1 | 210 | 370 | DISTORTION | 31 |
| | : | : | : | : | : |
| : | : | : | : | : | : |

FIG.16

| POSITION INSPECTION SETTING INFORMATION | | | | | | | |
|---|---|---|---|---|---|---|---|
| PRODUCT NAME | POSITION DETECTION RANGE | PATTERN SIZE | OFFSET | MODEL FORMAT | MASK SIZE | SCORE THRESHOLD | ROUGH DETECTION SPACING |
| SUBSTRATE A | XSA1~XEA1, YSA1~YEA1 | (WA1,LA1) | (XOA1,YOA1) | MA1 | (MWA1,MLA1) | SA1 | PA1 |
| SUBSTRATE B | XSB1~XEB1, YSB1~YEB1 | (WB1,LB1) | (XOB1,YOB1) | MB1 | (MWB1,MLB1) | SB1 | PB1 |
| : | : | : | : | : | : | : | : |

FIG.20

| POSITION INSPECTION SETTING INFORMATION | | | | | | | |
|---|---|---|---|---|---|---|---|
| PRODUCT NAME | POSITION DETECTION RANGE | PATTERN SIZE | OFFSET | MODEL FORMAT | MASK SIZE | SCORE THRESHOLD | ROUGH DETECTION RANGE |
| SUBSTRATE A | XSA1~XEA1, YSA1~YEA1 | (WA1,LA1) | (XOA1,YOA1) | MA1,MA3 | (MWA1,MLA1) | SA1 | XSA3~XEA3, YSA3~YEA3 |
| SUBSTRATE B | XSB1~XEB1, YSB1~YEB1 | (WB1,LB1) | (XOB1,YOB1) | MB1,MA3 | (MWB1,MLB1) | SB1 | XSB3~XEB3, YSB3~YEB3 |
| : | : | : | : | : | : | : | : |

FIG.23

| POSITION INSPECTION SETTING INFORMATION ||||||||
|---|---|---|---|---|---|---|---|
| PRODUCT NAME | POSITION DETECTION RANGE | PATTERN SIZE | OFFSET | MODEL FORMAT | MASK SIZE | SCORE THRESHOLD | PEAK DETECTION RANGE |
| SUBSTRATE A | XSA1~XEA1, YSA1~YEA1 | (WA1,LA1) | (XOA1,YOA1) | MA1 | (MWA1,MLA1) | SA1 | (WA4,LA4) |
| SUBSTRATE B | XSB1~XEB1, YSB1~YEB1 | (WB1,LB1) | (XOB1,YOB1) | MB1 | (MWB1,MLB1) | SB1 | (WB4,LB4) |
| : | : | : | : | : | : | : | : |

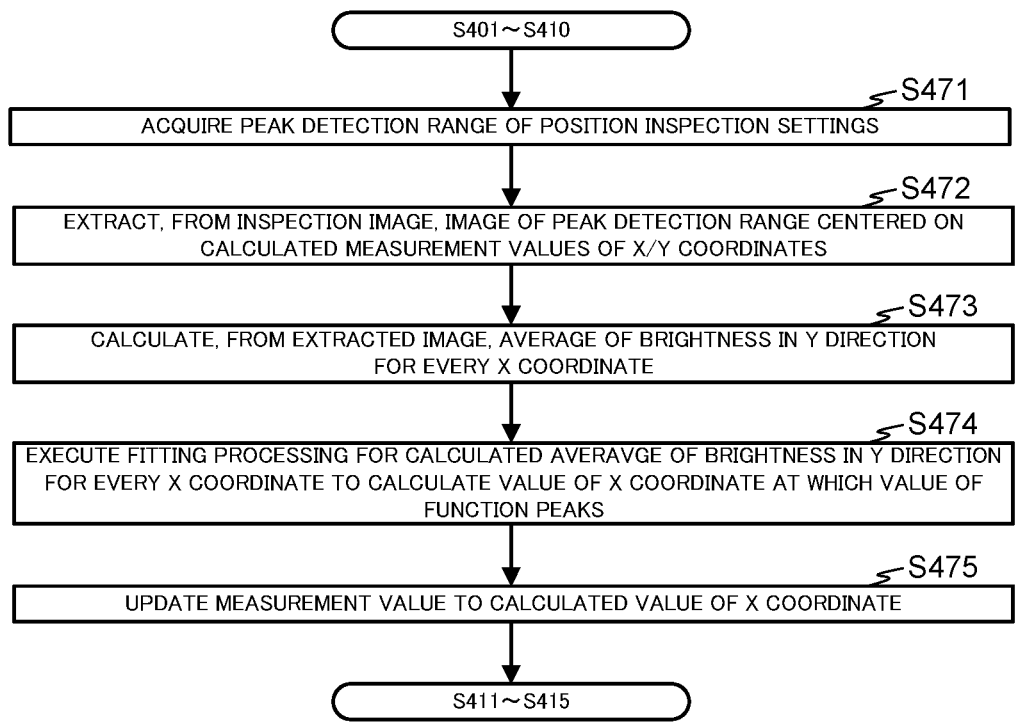

INSPECTION DEVICE, INSPECTION METHOD, AND RECORDING MEDIUM FOR INSPECTING AN INSPECTION TARGET WITH MACHINE LEARNING

TECHNICAL FIELD

The present disclosure relates to an inspection device, an inspection method, and a program.

BACKGROUND ART

Inspection devices are known that use image processing to inspect the shape, position where disposed, and the like of an inspection target.

As an example of such an inspection device, Patent Literature 1 discloses an inspection device that images metal terminals housed in a connector while illuminating using an illumination device, and inspects the quality of the shape and the position of the metal terminals on the basis of a degree of matching between a captured image and a reference pattern. This inspection device excludes the pixels near a glossy portion of the metal terminals that is caused by the illumination to calculate the degree of matching to the reference pattern, thereby reducing inspection errors caused by differences in the position, size, and the like of the glossy portion.

CITATION LIST

Patent Literature

Patent Literature 1: Unexamined Japanese Patent Application Publication No. H10-91785

SUMMARY OF INVENTION

Technical Problem

Depending on the type of inspection, even if there is an abnormality such as rust, distortion, a dent, or a deposit on the surface of the inspection target, there are situations in which there is a desire to detect even only the position where disposed, while allowing for the presence of that abnormality. However, the inspection device described in Patent Literature 1 has a problem in that the shape and the position of the glossy portion change when such abnormalities are present on the surface of the metal terminals, which results in a decrease in the degree of matching between the captured image and the reference pattern, thereby making it impossible to detect the position of each metal terminal.

The present disclosure is made with the view of the above situation, and an objective of the present disclosure is to enable the detection of the position where an inspection target is disposed, even when there is an abnormality on the surface of the inspection target.

Solution to Problem

An inspection device according to the present disclosure that achieves the objective described above includes a position detector and a position outputter. The position detector detects a position of an inspection target in an inspection image by applying the inspection image including the inspection target to a position detection model generated by machine learning using image information of a training image to calculate a score for a portion of the inspection image, and specifying a portion of the inspection image where the score satisfies a predetermined relationship. The position outputter outputs the position of the inspection target detected by the position detector.

Advantageous Effects of Invention

According to the present disclosure, the position of the inspection target in the inspection image is detected and output by specifying the portion of the inspection image where the score, which is calculated by applying the inspection image to the position detection model generated by machine learning using the image information of the training image, satisfies the predetermined relationship. Accordingly, when a position detection model is generated by machine learning using image information of a training image that includes an inspection target that has an abnormality on the surface, the inspection device can detect the position where the inspection target is disposed, even though there is an abnormality on the surface of the inspection target.

BRIEF DESCRIPTION OF DRAWINGS

FIG. 2A is a side view of an imaging device according to Embodiment 1;

FIG. 5A is a drawing illustrating an example of device setting information according to Embodiment 1;

FIG. 5B is a drawing illustrating an example of product setting list information according to Embodiment 1;

FIG. 5C is a drawing illustrating an example of position inspection setting information according to Embodiment 1;

FIG. 5D is a drawing illustrating an example of abnormality inspection setting information according to Embodiment 1;

FIG. 6 is a drawing illustrating an example of position training information according to Embodiment 1;

FIG. 7 is a drawing illustrating an example of abnormality training information according to Embodiment 1;

FIG. 16 is a drawing illustrating an example of position inspection setting information according to Embodiment 2;

FIG. 20 is a drawing illustrating an example of position inspection setting information according to Embodiment 3;

FIG. 23 is a drawing illustrating an example of position inspection setting information according to Embodiment 4;

FIG. 25 is a flowchart illustrating position inspection processing according to Embodiment 4.

DESCRIPTION OF EMBODIMENTS

Figure 1:
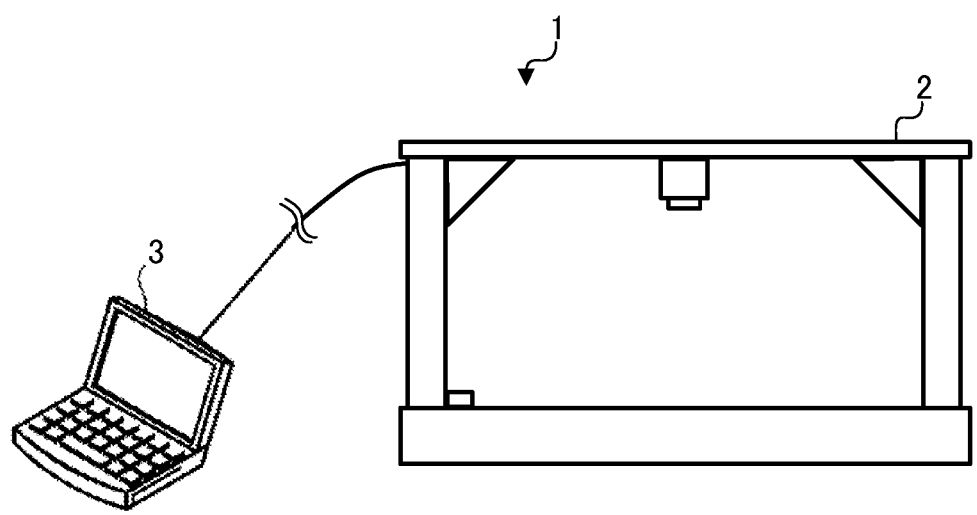
FIG. 1 is an explanatory drawing of an inspection device according to Embodiment 1 of the present disclosure.

Hereinafter, an inspection device, an inspection method, and a program according to various embodiments of the present disclosure are described while referencing the drawings. Note that, in the drawings, identical or corresponding components are denoted with the same reference numerals.

Embodiment 1

An inspection device, an inspection method, and a program according to Embodiment 1 of the present disclosure inspect the shape of an inspection target and the position where the inspection target is disposed.

Inspection Device 1

Figure 2B:
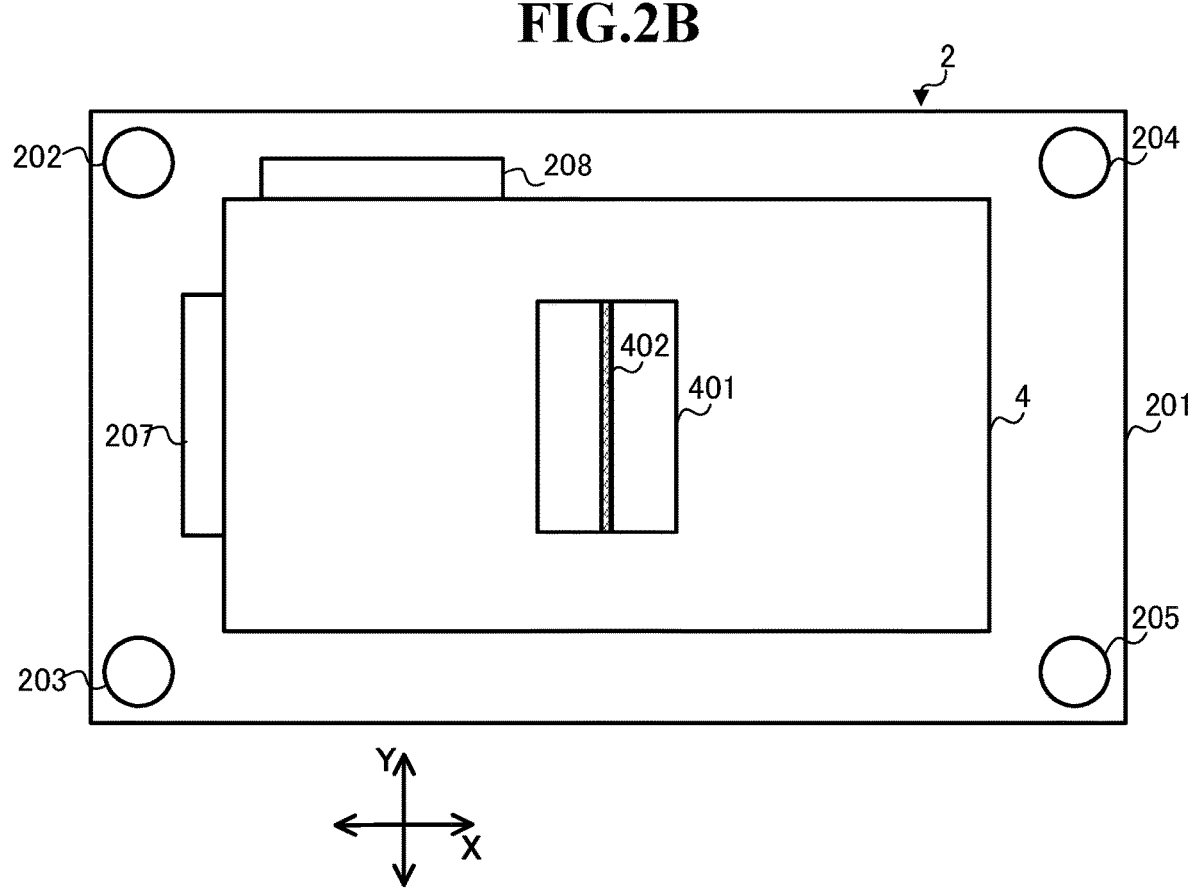
FIG. 2B is a cross-sectional view looking downward from line 2B-2B of FIG. 2A.

FIG. 1 is an explanatory drawing of an inspection device according to Embodiment 1. FIG. 2A is a side view of an imaging device according to Embodiment 1. FIG. 2B is a cross-sectional view looking downward from line 2B-2B of FIG. 2A. As illustrated in FIG. 1, an inspection device 1 according to Embodiment 1 includes an imaging device 2 that images an inspection target, and a computer 3 that inspects, on the basis of an image including the imaged inspection target, an abnormality on a surface of the inspection target and the position where the inspection target is disposed. In Embodiment 1, as illustrated in FIGS. 2A and 2B, a substrate 4 is set as an inspection target of an abnormality inspection, and a metal part 401 provided on the substrate 4 is set as an inspection target of a position inspection.

The inspection device 1 is machine trained with image information of a training image, captured by the imaging device 2, of the substrate 4. Moreover, the inspection device 1 generates a position detection model and an abnormality detection model, and stores the generated position detection model and abnormality detection model. Hereinafter, the training image is referred to as an "image to be learned."

The imaging device 2 captures an image of the substrate 4 to be inspected. As a result, the inspection device 1 acquires an inspection image. Hereinafter, the inspection image is referred to as an "image to be inspected." The inspection device 1 applies the image to be inspected to the position detection model to determine whether the position of the metal part 401 conforms to a standard. The inspection device 1 applies the image to be inspected to the abnormality detection model to determine whether the substrate 4 conforms to a standard. The inspection device 1 performs an overall determination of a position inspection result and an abnormality inspection result.

Imaging Device 2

As illustrated in FIGS. 2A and 2B, the imaging device 2 includes a bottom plate 201 that is a placement stand on which the substrate 4, which is the inspection target of the abnormality inspection, is placed; cylindrical support pillars 202 to 205 that are supported by the bottom plate 201 at the four corners of the bottom plate 201, and that extend upward; and a ceiling plate 206 that is supported by the support pillars 202 to 205. The imaging device 2 includes, on the bottom plate 201, a horizontal direction positioning block 207 against which one X direction end of the substrate 4 is pressed to determine a placement position, and a vertical direction positioning block 208 against which one Y direction end of the substrate 4 is pressed to determine the placement position. Additionally, the imaging device 2 includes an imager 209 that is disposed at the center of the bottom surface of the ceiling plate 206 and that images the substrate 4 located therebelow, and illumination light output devices 210, 211 that are disposed extending in the Y direction at both X direction ends of the ceiling plate 206 and that illuminate the substrate 4 located therebelow. Note that, in one example, the imager 209 is a camera, and the illumination light output devices 210, 211 are lighting devices provided with a light-adjustment function.

The substrate 4 includes a metal part 401 that is the inspection target of the position inspection. The metal part 401 is provided at the center of the upper surface of the substrate 4, and is a semi-cylindrical metal plate that extends in the vertical direction. With the metal part 401, when the illumination light is output from the illumination light output devices 210, 211, the illumination light reflects, and a glossy portion 402 extending in the vertical direction appears in the center of the horizontal direction. Note that the metal part is described as being semi-cylindrical, but is not limited thereto and may, for example, be any shape such as rectangular parallelepiped, hemispherical, conical, or the like. In such cases, the shape of the glossy portion 402 also changes.

Computer 3

As illustrated in FIG. 1, the computer 3 is a personal computer. However, the computer 3 is not limited to being a personal computer. For example, the computer 3 may be a super computer, a work station, or a GPU server in which a graphics processing unit (GPU) is installed. Additionally, for example, the computer 3 may be another computer that is provided with a so-called microcomputer board on which a microcomputer is mounted or a field programmable gate array (FPGA) board on which a FPGA is mounted, and that is capable of carrying out computations of the machine learning and the inspections of the inspection target. With the inspection device 1, the imaging device 2 and the computer 3 are separate, but the present embodiment is not limited thereto and, for example, the inspection device may be a device in which the computer 3 and the imaging device 2 are integrated.

Figure 3:
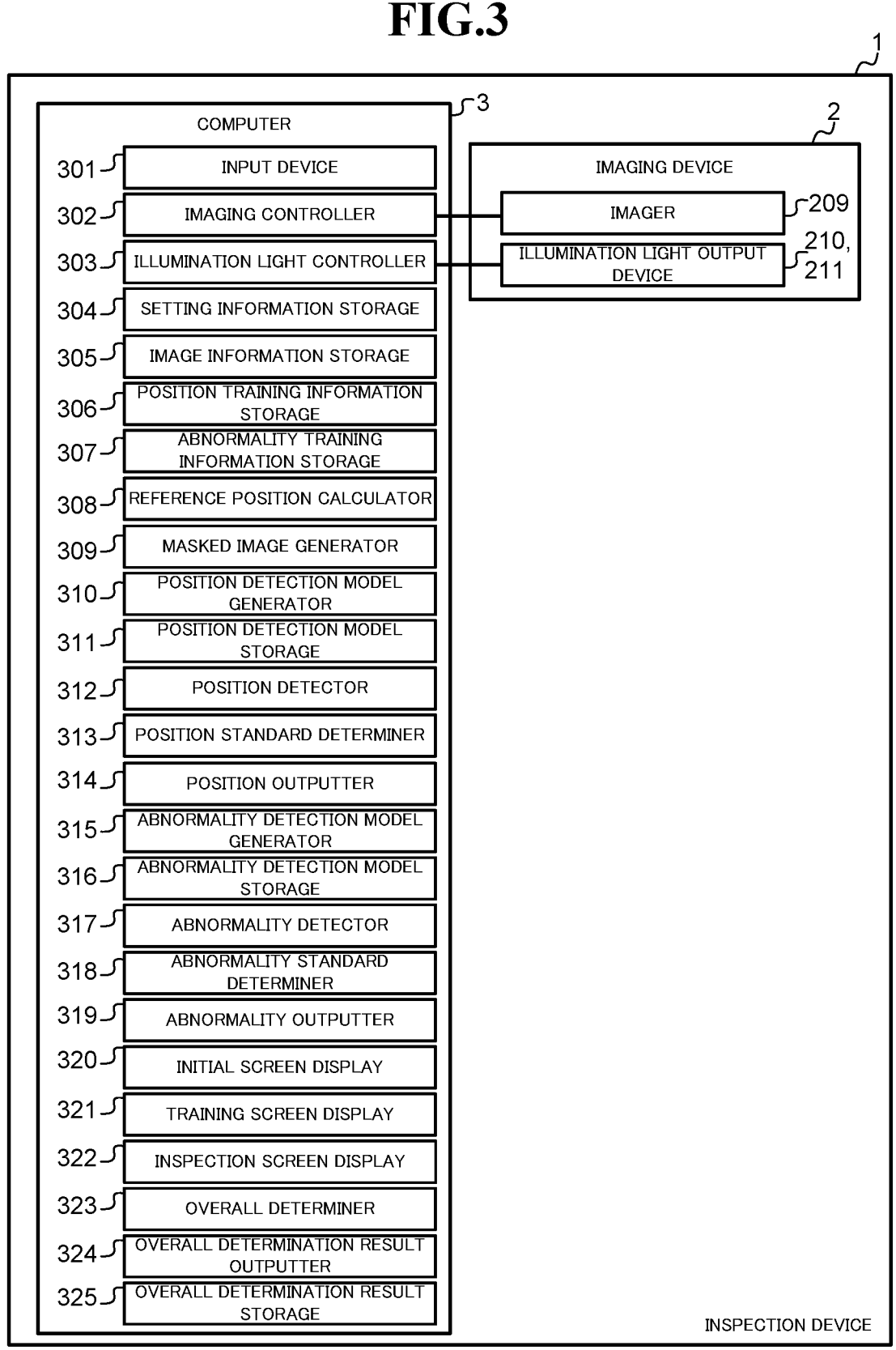
FIG. 3 is a drawing illustrating the functional configuration of the inspection device according to Embodiment 1.

FIG. 3 is a drawing illustrating the functional configuration of the inspection device according to Embodiment 1. As illustrated in FIG. 3, the computer 3 includes an input device 301 that receives inputs from a user, an imaging controller 302 that controls the imager 209, an illumination light controller 303 that controls the illumination light output devices 210, 211, and a setting information storage 304 that stores setting information used by the inspection device 1. The computer 3 also includes an image information storage 305 that stores image information of an image including the substrate 4. The computer 3 also includes a position training information storage 306 that stores position training information used in machine learning for detecting the position of the metal part 401, and an abnormality training information storage 307 that stores abnormality training information used in machine learning for detecting an abnormality of the surface of the substrate 4.

The computer 3 also includes a reference position calculator 308 that calculates a reference position for the position detection, and a masked image generator 309 that generates a masked image in which an image of a portion of the metal part 401 is masked. The computer 3 also includes a position detection model generator 310 that generates, by machine learning, a position detection model expressing the relationship between the image and the position of the metal part 401, and a position detection model storage 311 that stores the generated position detection model. The computer 3 also includes a position detector 312 that detects the position of the metal part 401 from an image that is captured by the imager 209 and that includes the substrate 4. The computer 3 also includes a position standard determiner 313 that determines whether the detected position of the metal part 401 conforms to a standard, and a position outputter 314 that outputs the detected position of the metal part 401.

The computer 3 also includes an abnormality detection model generator 315 that generates, by machine learning, an abnormality detection model expressing the relationship between the image and an abnormality of the surface of the substrate 4, and an abnormality detection model storage 316 that stores the generated abnormality detection model. The computer 3 also includes an abnormality detector 317 that detects the abnormality of the surface of the substrate 4 from an image that is captured by the imager 209 and that includes the substrate 4. The computer 3 also includes an abnormality standard determiner 318 that determines whether the detected abnormality of the surface of the substrate 4 conforms to a standard, and an abnormality outputter 319 that outputs the detected abnormality of the surface of the substrate 4.

The computer 3 also includes an initial screen display 320 that displays an initial screen on which the user performs inputs to use the inspection device 1. The computer 3 also includes a training screen display 321 that displays a training screen on which the user performs inputs to generate, by machine learning, the position detection model and the abnormality detection model. The computer 3 also includes an inspection screen display 322 that displays an inspection screen on which the user performs inputs to inspect for an abnormality of the surface of the substrate 4, inspect the position of the metal part 401, and the like. The computer 3 also includes an overall determiner 323 that carries out an overall determination of an inspection result of the position of the metal part 401 and an inspection result of the abnormality of the surface of the substrate 4, an overall determination result outputter 324 that outputs the overall determination result, and an overall determination result storage 325 that stores the overall determination result.

Figure 4:
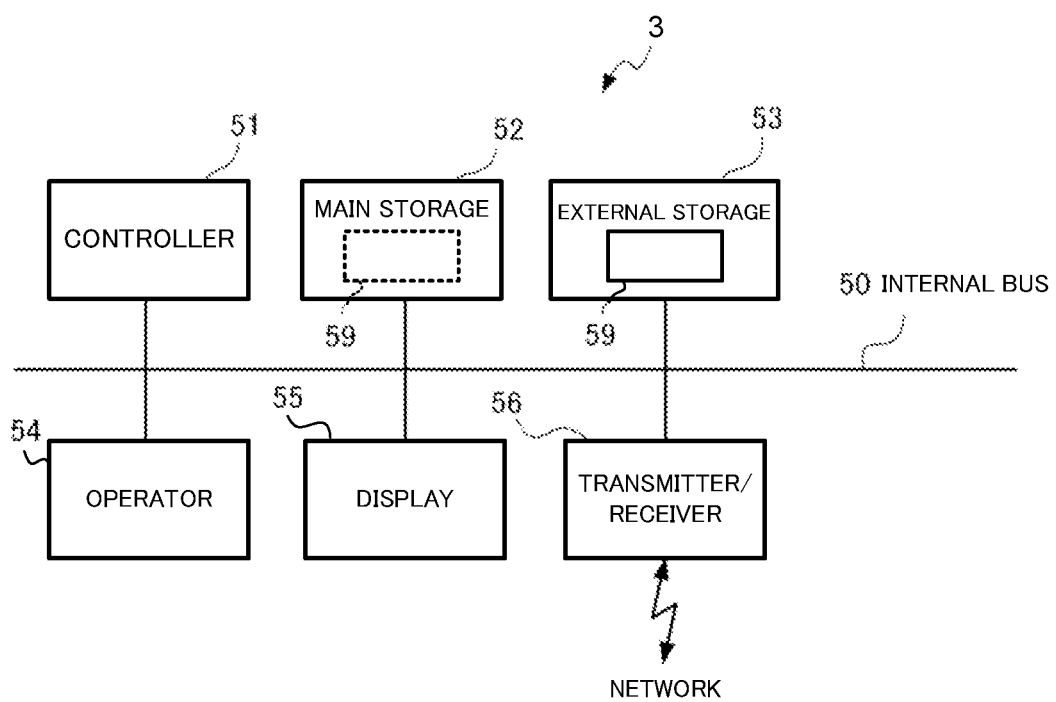
FIG. 4 is a block diagram illustrating the hardware configuration of a computer according to Embodiment 1.

FIG. 4 is a block diagram illustrating the hardware configuration of the computer according to Embodiment 1. As illustrated in FIG. 4, the computer 3 includes a controller 51 that executes processing in accordance with a control program 59. The controller 51 includes a central processing unit (CPU). In accordance with the control program 59, the controller 51 functions as the imaging controller 302, the illumination light controller 303, the reference position calculator 308, the masked image generator 309, the position detection model generator 310, the position detector 312, the position standard determiner 313, and the position outputter 314 of the computer 3. Additionally, in accordance with the control program 59, the controller 51 functions as the abnormality detection model generator 315, the abnormality detector 317, the abnormality standard determiner 318, the abnormality outputter 319, the overall determiner 323, and the overall determination result outputter 324 of the computer 3.

The computer 3 also includes a main storage 52 into which the control program 59 is loaded and that is used as the working area of the controller 51. The main storage 52 includes a random-access memory (RAM).

The computer 3 also includes an external storage 53 in which the control program 59 is stored in advance. In accordance with commands of the controller 51, the external storage 53 supplies data stored by the program to the controller 51, and stores data supplied from the controller 51. The external storage 53 includes a flash memory, a hard disk drive (HDD), a solid state drive (SSD), a digital versatile disc (DVD)-RAM, a DVD-rewritable (RW), or similar non-volatile memory. The external storage 53 functions as the setting information storage 304, the image information storage 305, the position training information storage 306, the abnormality training information storage 307, the position detection model storage 311, the abnormality detection model storage 316, and the overall determination result storage 325.

The computer 3 also includes an operator 54 that is operated by the user. Information inputted via the operator 54 is supplied to the controller 51. The operator 54 includes a keyboard, a mouse, or a similar information input component. The operator 54 functions as the input device 301.

The computer 3 also includes a display 55 that displays information inputted via the operator 54 and information outputted by the controller 51. The display 55 includes a display device such as a liquid crystal display (LCD), a plasma display panel (PDP), an organic electro-luminescence (EL) display, or the like. The display 55 functions as the initial screen display 320, the training screen display 321, and the inspection screen display 322.

The computer 3 also includes a transmitter/receiver 56 that transmits and receives information. The transmitter/receiver 56 includes a network terminating device that connects to a network, and an information communication component such as a wireless communication device or the like.

In the computer 3, the main storage 52, the external storage 53, the operator 54, the display 55, and the transmitter/receiver 56 are each connected to the controller 51 via an internal bus 50.

The computer 3 illustrated in FIGS. 1 and 3 realizes the functions of the input device 301, the imaging controller 302, and the illumination light controller 303 by the controller 51 using the main storage 52, the external storage 53, the operator 54, the display 55, and the transmitter/receiver 56 as resources. For example, the computer 3 executes an input step carried out by the input device 301, executes an imaging control step carried out by the imaging controller 302, and executes an illumination light control step carried out by the illumination light controller 303. Additionally, the computer 3 realizes the functions of the setting information storage 304, the image information storage 305, the position training information storage 306, and the abnormality training information storage 307 by the controller 51 using the main storage 52, the external storage 53, the operator 54, the display 55, and the transmitter/receiver 56 as resources. For example, the computer 3 executes a setting information storage step carried out by the setting information storage 304, and an image information storage step carried out by the image information storage 305. Additionally, for example, the computer 3 executes a position training information storage step carried out by the position training information storage 306, and an abnormality training information storage step carried out by the abnormality training information storage 307.

Additionally, the computer 3 realizes the functions of the reference position calculator 308 and the masked image generator 309 by the controller 51 using the main storage 52, the external storage 53, the operator 54, the display 55, and the transmitter/receiver 56 as resources. For example, the computer 3 executes a reference position calculation step carried out by the reference position calculator 308, and a masked image generation step carried out by the masked image generator 309. Additionally, the computer 3 realizes the functions of the position detection model generator 310, the position detection model storage 311, the position detector 312, the position standard determiner 313, and the position outputter 314 by the controller 51 using the main storage 52, the external storage 53, the operator 54, the display 55, and the transmitter/receiver 56 as resources. For example, the computer 3 executes a position detection model generation step carried out by the position detection model generator 310, a position detection model storage step carried out by the position detection model storage 311, and a position detection step carried out by the position detector 312. Additionally, for example, the computer 3 executes a position standard determination step carried out by the position standard determiner 313, and a position output step carried out by the position outputter 314.

Additionally, the computer 3 realizes the functions of the abnormality detection model generator 315, the abnormality detection model storage 316, and the abnormality detector 317 by the controller 51 using the main storage 52, the external storage 53, the operator 54, the display 55, and the transmitter/receiver 56 as resources. For example, the computer 3 executes an abnormality detection model generation step carried out by the abnormality detection model generator 315, an abnormality detection model storage step carried out by the abnormality detection model storage 316, and an abnormality detection step carried out by the abnormality detector 317. Additionally, the computer 3 realizes the functions of the abnormality standard determiner 318, the abnormality outputter 319, the overall determiner 323, the overall determination result outputter 324, and the overall determination result storage 325 by the controller 51 using the main storage 52, the external storage 53, the operator 54, the display 55, and the transmitter/receiver 56 as resources. For example, the computer 3 executes an abnormality standard determination step carried out by the abnormality standard determiner 318, and an abnormality output step carried out by the abnormality outputter 319. Additionally, for example, the computer 3 executes an overall determination step carried out by the overall determiner 323, an overall determination result output step carried out by the overall determination result outputter 324, and an overall determination result storage step carried out by the overall determination result storage 325.

Details of Functional Configuration of Computer 3

As illustrated in FIG. 3, the imaging controller 302 carries out control for causing the imager 209 to image the substrate 4. The imaging controller 302 controls the imager 209 to image the substrate 4 not only when acquiring an inspection image, namely the image to be inspected, when performing inspection, but also when acquiring the training image, namely the image to be learned, in advance before performing machine learning.

The illumination light controller 303 carries out control for adjusting the illumination light output by the illumination light output devices 210, 211 when the imaging controller 302 controls the imager 209 to image the substrate 4.

The setting information storage 304 stores the setting information used by the inspection device 1. As illustrated in FIGS. 5A to 5D that are described hereinafter, the setting information includes device setting information expressing a storage region of the information used by the inspection device 1 and an image size of the image captured by the imaging device 2, product setting list information set by product of the substrate 4, position inspection setting information used in the position inspection of the metal part 401, and abnormality inspection setting information used in the abnormality inspection of the substrate 4.

FIG. 5A is a drawing illustrating an example of the device setting information according to Embodiment 1. As illustrated in FIG. 5A, the device setting information includes information items, namely a "product name" expressing the product name of the substrate 4, an "inspection image information temporary storage region" expressing the position of a temporary storage region of the image information of the image to be inspected, a "training image information storage region" expressing the position of a storage region of the image information of the image to be learned, a "position training information storage region" expressing the position of a storage region of the position training information used in the training of the position detection, an "abnormality training information storage region" expressing the position of a storage region of the abnormality training information used in the training of the abnormality detection, and an "image size" expressing the image size of the image to be inspected. These information items are classified by the product name. Note that, as described above, the temporary storage region of the image information of the image to be inspected and the storage region of the image information of the image to be learned are set in the image information storage 305, the position training information storage region is set in the position training information storage 306, and the abnormality training information storage region is set in the abnormality training information storage 307.

In one example, in the first row illustrated in FIG. 5A, the device setting information illustrates that, for the product having the "product name" of "substrate A", the region in which the inspection image information is temporarily stored is set to a position identified as "FA1." Additionally, the device setting information illustrates that, for the product having the "product name" of "substrate A", the region in which the training image information is stored is set to a position identified as "FA2", and the region in which the position training information is stored is set to a position identified as "FA3." In the device setting information, for the product having the "product name" of "substrate A", the region in which the abnormality training information is stored is set to a position identified as "FA4", and the size of the image used in the training and the inspections is set as "SZA1."

FIG. 5B is a drawing illustrating an example of the product setting list information according to Embodiment 1. As illustrated in FIG. 5B, the product setting list information includes information items, namely a "product name" expressing the product name of the substrate 4, a "position inspection reference" expressing a designed coordinate position of the substrate 4 that is a reference for the position of the metal part 401, a "position inspection standard" expressing a threshold of a determination value, which is described later, that is the standard used in the position inspection of the metal part 401, and an "abnormality inspection standard" expressing a threshold of the size, which is described later, that is the standard used in the abnormality inspection of the substrate 4. These information items are classified by the product name. Note that, in Embodiment 1, the imaging device 2 captures an image of the substrate 4 while the substrate 4 is pressed against the horizontal direction positioning block 207 and the vertical direction positioning block 208, thereby replacing the coordinate position of the substrate 4 with the coordinate position of the image captured by the imaging device 2. In the following, the designed coordinate position of the substrate 4 is referred to as "reference values of the X coordinate and the Y coordinate." Note that the determination value is the absolute value of the difference between the reference values and measurement values, which are values of the X coordinate and the Y coordinate of the coordinate position of the substrate 4 detected at the time of position detection. That is, the threshold of the determination value that is the standard used in the position inspection is a value allowed as the absolute value of the difference between the measurement values of the X coordinate and the Y coordinate of the substrate 4 detected at the time of position detection and the designed reference values of the X coordinate and Y coordinate of the substrate 4.

In one example, in the first row of FIG. 5B, the product setting list information illustrates that, for the product having the "product name" of "substrate A", the designed coordinate position of the metal part 401 is (XA1, YA1), and the threshold of the difference between measurement value and the reference value of the X coordinate for the position of the metal part 401 is "XA2." Additionally, the product setting list information illustrates that, for the product having the "product name" of "substrate A", the threshold of the absolute value of the difference between measurement value and the reference value of the Y coordinate is "YA2", and the threshold of the size allowed for an abnormality of the surface of the substrate 4 is "SZA3." In the following, the threshold of the difference may be referred to as a "standard value." Note that, in Embodiment 1, the absolute value of the difference is set as the determination value and the threshold of the absolute value of the difference is set as the standard value, but Embodiment 1 is not limited thereto. For example, the difference may be set as the determination value, and from a lower limit value to an upper limit value of the difference may be set as a range of the standard. In this case, for the first row of information of FIG. 5B, an expression of "from (−YA2) to (+YA2)" or "±YA2" may be set instead of "YA2", or an expression of "from YA21 to YA22" may be set using the different numerical values "YA21" and "YA22."

FIG. 5C is a drawing illustrating an example of the position inspection setting information according to Embodiment 1. As illustrated in FIG. 5C, the position inspection setting information includes information items, namely, a "product name" expressing the product name of the substrate 4, a "position detection range" expressing, as the position detection range information in the image to be inspected, a range of the value of the X coordinate from a starting point to an ending point and a range of the value of the Y coordinate from a starting point to an ending point, a "pattern size" expressing the width and the height used to specify the size of the image to be extracted from the image to be learned or the image to be inspected, an "offset" expressing offset values used to correct the measurement values of the X coordinate and the Y coordinate of the position of the metal part 401, a "model format" expressing the format of the training model of the machine learning, a "mask size" expressing lengths of the width and the height that specify the size to mask of the image extracted from the image to be learned or the image to be inspected, and a "score threshold" expressing a threshold of a score calculated for the image extracted at the time of inspection. These information items are classified by the product name.

For example, in the first row of FIG. 5C, for the product having the "product name" of "substrate A", the position inspection setting information illustrates that an image having a width WA1 that is the size in the X direction and a height LA1 that is the size in the Y direction is extracted from in a rectangular detection range of that image having the starting point (XSA1, YSA1) and the ending point (XEA1, YEA1) as diagonal vertices, and is set to be inspected. Additionally, for the product having the "product name" of "substrate A", the position inspection setting information illustrates that the offset value for correcting the measurement value of the X coordinate of the position of the metal part 401 is "XOA1", and the offset value for correcting the measurement value of the X coordinate of the position of the metal part 401 is "YOA1." Additionally, for the product having the "product name" of "substrate A", the position inspection setting information illustrates that the training model used in the inspection is "MA1", the size in the vertical direction masking the image is "MWA1", the size in the horizontal direction masking the image is "MLA1", and the threshold of the score is "SA1."

FIG. 5D is a drawing illustrating an example of the abnormality inspection setting information according to Embodiment 1. As illustrated in FIG. 5D, the abnormality inspection setting information includes information items, namely, a "product name" expressing the product name of the substrate 4, an "abnormality detection range" expressing, as the abnormality detection range information in the image to be inspected, a range of the value of the X coordinate from a starting point to an ending point and a range of the value of the Y coordinate from a starting point to an ending point, a "pattern size" expressing lengths of the width and the height used to specify the size of the image to be extracted from the image to be learned or the image to be inspected, a "model format" expressing the format of the training model of the machine learning, and a "score threshold" expressing a threshold for whether the score calculated for the image extracted at the time of inspection is sufficiently high. These information items are classified by the product name. For the "score threshold" item, examples of the abnormality category include "rust", "distortion", "dent", and "deposit." Note that an example is given in which "rust", "distortion", "dent", and "deposit" are described as the abnormality categories, but the abnormality categories are not limited thereto. For example, "scratch" and "defect" may be added to the abnormality categories.

For example, in the first row of FIG. 5D, for the product having the "product name" of "substrate A", the abnormality inspection setting information illustrates that a rectangular shape, having the starting point (XSA2, YSA2) and the ending point (XEA2, YEA2) of that image as diagonal vertices, is the inspection range. Additionally, for the product having the "product name" of "substrate A", the abnormality inspection setting information illustrates that an image for which the width that is the size in the X direction is "WA2" and the height that is the size in the Y direction is "LA2" is extracted from the inspection range and set to be inspected. Moreover, the abnormality inspection setting information illustrates that, for the product having the "product name" of "substrate A", the training model used in the inspection is "MA2", the score threshold of "rust" is "SA21", the score threshold of "distortion" is "SA22", the score threshold of "dent" is "SA23", and the score threshold of "deposit" is "SA24."

Image information, acquired in advance, of a plurality of types of images to be learned is stored in the image information storage 305. Additionally, image information of the image to be inspected that is acquired when carrying out an inspection is temporarily stored in the image information storage 305.

FIG. 6 is a drawing illustrating an example of the position training information according to Embodiment 1. As described above, the position training information storage 306 stores the position training information used in the machine learning for detecting the position of the metal part 401, that is, in the position training. Here, the position training information is information expressing the measurement values of the X coordinate and the Y coordinate of the position of the glossy portion 402 of the metal part 401 in the image to be learned. As illustrated in FIG. 6, the position training information includes information items, namely, a "measurement value" expressing the measurement values of the X coordinate and the Y coordinate of the glossy portion 402. The information item of the measurement values of the "X coordinate" and the "Y coordinate" is classified by the product name. Additionally, the location of the position training information is specified by the information set in the position training information storage region of FIG. 5A.

For example, as illustrated in FIG. 6, for an image to be learned of the "substrate A" acquired at a time of training, the position training information illustrates that the glossy portion 402 exists at the position where the "X coordinate" is "261" and the "Y coordinate" is "115." Note that the storage location of the position training information is specified as "FA3" from the information of the "position training information storage region" of FIG. 5A.

FIG. 7 is a drawing illustrating an example of the abnormality training information according to Embodiment 1. As described above, the abnormality training information storage 307 stores the abnormality training information used in the machine learning for detecting an abnormality of the surface of the substrate 4, that is, in the abnormality training. Here, the abnormality training information is information expressing the measurement values of the X coordinate and the Y coordinate of the position of an abnormality of the surface of the substrate 4 in the image to be learned, the category of the abnormality, and the size of the abnormality. As illustrated in FIG. 7, the abnormality training information includes information items, namely an "X coordinate" and a "Y coordinate" expressing the measurement values of the X coordinate and the Y coordinate of the abnormality identified in reality or in simulation, a "category" expressing the category of the abnormality, and a "size" expressing the size of the abnormality. These information items are classified by the product name. Note that, when a plurality of abnormalities must be learned for one product, these pieces of information are classified by the abnormality to be learned.

For example, as illustrated in FIG. 7, for an image to be learned of the "substrate A" acquired at the time of training, the abnormality training information illustrates that, as a first abnormality, there is an abnormality in which foreign matter having a size of "16" is "deposit"ed at a position where the "X coordinate" is "110" and the "Y coordinate" is "170."

The reference position calculator 308 illustrated in FIG. 3 calculates values of an X coordinate and a Y coordinate that are a reference position for which a position is detected at a time of position training of the metal part 401. Specifically, the reference position calculator 308 acquires, from the location specified by the "position training information storage region" information item of the device setting information stored in the setting information storage 304, the measurement values of the "X coordinate" and the "Y coordinate" of the position training information corresponding to the product name. Additionally, the reference position calculator 308 acquires the "offset" information item of the position inspection setting information corresponding to the product name of the metal part 401 stored in the setting information storage 304, that is, acquires the offset values for correcting the measurement values of the X coordinate and the Y coordinate. The reference position calculator 308 calculates the reference values of the X coordinate and the Y coordinate by adding the offset value of the X coordinate to the measurement value of the X coordinate and adding the offset value of the Y coordinate to the measurement value of the Y coordinate. The offset is provided to suppress variation in the measurement values of each inspection device in situations in which the position at which the object is captured in the imaging range is not uniform due to variations in the placement of the cameras. As example of such a situation is a case in which there a plurality of inspection devices is provided. Specifically, as the offset values, negative values, obtained by inverting the positive/negative of each of the X coordinate and Y coordinate values of the upper left edge of the substrate 4 in the image of the substrate 4, are set for each inspection device. Moreover, the reference position calculator 308 adds the X coordinate and Y coordinate values of the offset to the X coordinate and the Y coordinate values of the position of the metal part 401 in the image of the substrate 4. As a result, the inspection device 1 can calculate the measurement values of the position of the metal part 401 as a relative position from the upper left edge of the substrate 4, without variation by inspection device.

For example, when an image to be learned of the "substrate A" is acquired, the reference position calculator 308 specifies, from "FA3" of the "position training information storage region", the address at which the position training information is stored, and acquires, from the position training information, "261" and "115" as the measurement values of the X coordinate and the Y coordinate of the position of the metal part 401. Additionally, the reference position calculator 308 acquires, from the position inspection setting information, "XOA1" and "YOA1" as the offset values of the X coordinate and the Y coordinate. Thus, the reference position calculator 308 calculates (261+XOA1, 115+YOA1) as the reference values of the X coordinate and the Y coordinate.

When an abnormality is detected in an image that has the pattern size and is extracted from the image to be learned or the detection image, the masked image generator 309 generates a masked image by applying a mask. When an abnormality is detected, the masked image generator 309 acquires the "mask size" information item of the position inspection setting information corresponding to the product name of the metal part 401 stored in the setting information storage 304, that is, acquires the lengths of the width and the height of the mask. Then, the masked image generator 309 generates a masked image by applying a mask that has the acquired lengths of the width and the height, and that is centered on the coordinate position having the X coordinate and Y coordinate values where the abnormality is detected. In this case, the mask is an image filled with white. However, the mask is not limited to an image filled with white and, for example, may be an image filled with a color other than white, or may be an image filled with an average color of a range having the acquired width and height. Additionally, for example, the mask may be an image that contains a plurality of types of colors, or may be an image in which the range having the acquired width and height is blurred. Moreover, the mask may be an image having a specific pattern such as a lattice pattern, a striped pattern, or the like.

For example, when an image to be learned of the "substrate A" is acquired, the masked image generator 309 acquires the width MWA1 and the height MLA1 of the "mask size" of the position inspection setting information. Additionally, the masked image generator 309 acquires, from the "X coordinate" and "Y coordinate" items of the abnormality training information, "110" and "170" as the measurement values of the X coordinate and the Y coordinate of the coordinate position of the abnormality. Moreover, the masked image generator 309 identifies whether the position of (110, 170) is included in the extracted image having the pattern size. Furthermore, when, for example, the masked image generator 309 identifies that the position (110, 170) is included in the extracted image having the pattern size, the masked image generator 309 replaces an image, that is centered on the coordinate position (110, 170) and that has a range in which the width is MWA1 and the height is MLA1, of the extracted image having the pattern size with an image filled with white.

As described above, the position detection model generator 310 generates, by machine learning, the position detection model that expresses the relationship between the image and the position of the metal part 401. The position detection model generator 310 acquires the "model format" information item of the position inspection setting information corresponding to the product name of the metal part 401 stored in the setting information storage 304, that is, acquires the format of the training model of the machine learning to generate a template of a position detection model. Here, the machine learning method carried out by the position detection model generator 310 is a convolutional neural network (CNN) that is commonly used in deep learning for image recognition. Additionally, the format of the training model of the machine learning generatable by the position detection model generator 310 is selectable from any of "AlexNet", "VGG", and "ResNet", which are typical CNN deep learning models. However, the format of the training model is not limited thereto, and another CNN training model may be selected. Note that the machine learning method is not limited to CNN, and any machine learning method capable of image recognition may be used. In this case, the set format of the training model of the machine learning method must be selectable.

The position detection model generator 310 references the "training image information storage region" information item of the device setting information stored in the setting information storage 304 to acquire the image information of the image to be learned stored in the image information storage 305. Additionally, the position detection model generator 310 acquires the "pattern size" information item of the position inspection setting information corresponding to the product name of the metal part 401, that is, acquires the lengths of the width and the height of the image to be extracted from the image to be learned. Moreover, the position detection model generator 310 extracts, from the image to be learned, an image that has the pattern size of the acquired width and height, and that is centered on the reference values of the X coordinate and the Y coordinate calculated by the reference position calculator 308. Here, the extracted image is an image extracted from reference values based on the measurement values of the X coordinate and the Y coordinate of the position of the glossy portion 402 of the metal part 401 in the image to be learned, and is an image that is capable of specifying the position of the metal part 401. Therefore, the extracted image is an image of a portion specifiable as having detected the position in the position detection, that is, the extracted image is an image that is treated as a so-called OK classification image. As such, the position detection model generator 310 updates the position detection model by carrying out machine learning using this extracted image as an OK classification image.

Note that, when the masked image generator 309 generates a masked image for the extracted image, the position detection model generator 310 updates the position detection model by carrying out machine learning using the masked image as an OK classification image as well. Additionally, the position detection model generator 310 extracts, from the image to be learned, an image that has the pattern size of the acquired width and the height, and that is centered on the coordinate position expressed by any values different from the reference values of the X coordinate and the Y coordinate, and updates the position detection model by carrying out machine learning using this extracted image as an NG classification image. Note that an NG classification image centered on the coordinate position expressed by any values different from the reference values of the X coordinate and the Y coordinate is extracted, but the present embodiment is not limited thereto. For example, the NG classification image may be centered on a coordinate position expressed by values obtained by adding or subtracting a predetermined value to or from the reference value of the X coordinate, or may be centered on a coordinate position expressed by values obtained by adding or subtracting a predetermined value to or from the reference value of the Y coordinate. That is, the position detection model generator 310 may extract NG classification images centered on coordinate positions separated by a predetermined spacing from the reference position.

For example, when the position detection model generator 310 acquires an image to be learned of the "substrate A", the position detection model generator 310 acquires "MA1" of the "model format" item of the position inspection setting information. Here, when, for example, "MA1" is "VGG16", which indicates a 16-layer "VGG", the position detection model generator 310 generates a template of a position detection model having "VGG16" as the format of the training model. Additionally, the position detection model generator 310 references "FA2" of the "training image information storage region" of the device setting information to specify the address where the image information of the image to be learned is stored, and acquires the image information of the image to be learned. Moreover, the position detection model generator 310 acquires the width WA1 and the height LA1 of the "pattern size" of the position inspection setting information to extract, from the image to be learned, an image that is centered on the coordinate position (261+XOA1, 115+YOA1) and that has a range in which the width is WA1 and the height is LA1. Additionally, the position detection model generator 310 updates the position detection model by carrying out machine learning using the extracted image as an OK classification image. Note that, when a masked image of the extracted image is generated, the position detection model generator 310 updates the position detection model by carrying out machine learning using the masked image as an OK classification image as well. The position detection model generator 310 extracts, from the image to be learned, an image that is centered on a coordinate position other than (261+

XOA1, 115+YOA1) and that has a range in which the width is WA1 and the height is LA1. Additionally, the position detection model generator 310 updates the position detection model by carrying out machine learning using the extracted image as an NG classification image.

As described above, the position detector 312 detects the position of the metal part 401 from the image to be inspected that includes the substrate 4 and is captured by the imager 209. The position detector 312 references the "inspection image information temporary storage region" information item of the device setting information corresponding to the product name of the metal part 401 stored in the setting information storage 304 to acquire the image information of the image to be inspected that is temporarily stored in the image information storage 305. Additionally, the position detector 312 acquires the value of the "image size" item of the device setting information and, also, acquires the "position detection range" and the "pattern size" information items of the position inspection setting information corresponding to the product name of the metal part 401 stored in the setting information storage 304. That is, the position detector 312 acquires the X coordinate and Y coordinate values that are the starting point of the position detection range and the X coordinate and Y coordinate values that are the ending point of the position detection range in the image to be inspected, and the lengths of the width and the height of the image to be extracted.

The position detector 312 extracts, from the image to be inspected, an image that has the pattern size expressed by the acquired width and the height, and that is centered on the coordinate position expressed by the X coordinate and Y coordinate values selected from in the position detection range. Additionally, the position detector 312 acquires the position detection model stored in the position detection model storage 311, and applies the position detection model to the extracted image to calculate a score that is an evaluation value of the image. The calculated score is a score that expresses the possibility of being an OK classification image. The score increases as the possibility of the extracted image being an OK classification image increases, and the score decreases as the possibility of the extracted image being an OK classification image decreases. Additionally, the position detector 312 extracts all of the images having the pattern size that are extractable from the position detection range, and calculates the score of each of the extracted images. The position detector 312 acquires the "score threshold" information out item of the position inspection setting information corresponding to the product name of the metal part 401, that is, acquires the score threshold, and determines whether there is an image for which the calculated score is greater than or equal to the acquired score threshold. When there are scores that are greater than or equal to the score threshold, the position detector 312 calculates the measurement values of the X coordinate and the Y coordinate acquired from the image having the maximum score to detect the position of the metal part 401.

For example, when an image to be inspected of the "substrate A" is acquired, the position detector 312 references "FA1" of the "inspection image information temporary storage region" item of the device setting information to specify the address where the image information of the image to be inspected is stored, and acquires the image information of the image to be inspected. Additionally, the position detector 312 acquires "SZA1" of the "image size" of the device setting information and, also acquires the range XSA1 to XEA1 of the X coordinate value and the range YSA1 to YEA1 of the Y coordinate value of the "position detection range" of the position inspection setting information, and the width WA1 and the height LA1 of the "pattern size" of the position inspection setting information. Moreover, the position detector 312 extracts, from the image to be inspected, an image that is centered on a coordinate position selected from the rectangular position detection range having the starting point (XSA1, YSA1) and the ending point (XEA1, YEA1) as diagonal vertices, and that has a range in which the width is WA1 and the height is LA1.

When there are N positions of selectable coordinates in the position detection range, the position detector 312 applies the acquired position detection model to N extracted images to calculate scores SC11 to SC1N of the N images. Additionally, the position detector 312 acquires "SA1" of the "score threshold" of the position inspection setting information, and determines, from the calculated scores SC11 to SC1N, whether there is an image for which the score is greater than or equal to SA1. When the maximum score among the scores greater than or equal to SA1 is SC1M, the position detector 312 detects the measurement values of the X coordinate and the Y coordinate from the image having the maximum score SC1M, for example. Specifically, when the X coordinate and Y coordinate values acquired from the image having the maximum score SC1M are (X0, Y0), the position detector 312 calculates (X0+XOA1, Y0+YOA1), obtained by adding the offset values (XOA1, YOA1) of the X coordinate and the Y coordinate, as the measurement values of the X coordinate and the Y coordinate to detect the position of the metal part 401. Here (X1, Y1)=(X0+XOA1, Y0+YOA1), and in the following, the measurement values of the X coordinate and the Y coordinate are referred to as (X1, Y1).

As described above, the position standard determiner 313 determines whether the detected position of the metal part 401 conforms to the standard. The position standard determiner 313 acquires the "position inspection reference" and the "position inspection standard" information items of the product setting list information corresponding to the product name of the metal part 401 stored in the setting information storage 304, that is, acquires the reference values of the X coordinate and the Y coordinate in the position inspection of the metal part 401 and the threshold of the determination value that is the standard value. The position standard determiner 313 subtracts the reference value from the measurement value of the X coordinate identified by the position detector 312 and, also, subtracts the reference value from the measurement value of the Y coordinate identified by the position detector 312 to calculate differences of the X coordinate and the Y coordinate. Then, when the absolute value of the calculated difference that is the determination value of the X coordinate is less than or equal to the threshold and, also, the absolute value of the calculated difference that is the determination value of the Y coordinate is less than or equal to the threshold, the position standard determiner 313 determines that the detected position of the metal part 401 conforms to the standard. When the absolute value of the calculated difference of the X coordinate exceeds the threshold, or the absolute value of the calculated difference of the Y coordinate exceeds the threshold, the position standard determiner 313 determines that the detected position of the metal part 401 does not conform to the standard.

For example, when an image to be inspected of the "substrate A" is acquired, the position standard determiner 313 acquires the reference values (XA1, YA1) of the X coordinate and the Y coordinate of the "position inspection reference" of the product setting list information, and the threshold XA2 of the difference of the X coordinate and the threshold YA2 of the difference of the Y coordinate of the "position inspection standard." Additionally, the position standard determiner 313 calculates the differences (X1−XA1, Y1−YA1) between the measurement values (X1, Y1) and the reference values (XA1, YA1) of the X coordinate and the Y coordinate. Then, when |X1−XA1|≤XA2 and |Y1−YA1|≤YA2, the position standard determiner 313 determines that the standard is conformed to, and when |X1−XA1|>XA2 or |Y1−YA1|>YA2, determines that the standard is not conformed to.

The position outputter 314 outputs, as the detected position of the metal part 401, the measurement values of the X coordinate and the Y coordinate calculated by the position detector 312. Additionally, the position outputter 314 outputs the reference values and the standard values of the X coordinate and the Y coordinate acquired by the position standard determiner 313, and the absolute values of the differences, calculated by the position standard determiner 313, that are the determination values of the X coordinate and the Y coordinate. When the position standard determiner 313 determines that the standard is conformed to, the position outputter 314 outputs, as determination result information, OK determination information expressing that the standard is conformed to. When the position standard determiner 313 determines that the standard is not conformed to, the position outputter 314 outputs, as the determination result information, NG determination information expressing that the standard is not conformed to. Note that the OK determination information and the NG determination information are, for example, information of "OK" and "NG". Additionally, when the position detector 312 fails to detect the position of the metal part 401, the position outputter 314 outputs inspection failure information. Note that the inspection failure information is, for example, information of "N/A."

For example, when an image to be inspected of the "substrate A" is acquired, the position outputter 314 outputs (X1, Y1), (XA1, YA1), (XA2, YA2), and (X1−XA1, Y1−YA1). When |X1−XA1|≤XA2 and |Y1−YA1|≤YA2, the position outputter 314 outputs the OK determination information, and when |X1−XA1|>XA2 or |Y1−YA1|>YA2, outputs the NG determination information.

As described above, the abnormality detection model generator 315 generates, by machine learning, the abnormality detection model that expresses the relationship between the image and the abnormality of the surface of the substrate 4. The abnormality detection model generator 315 acquires the "model format" information item of the abnormality inspection setting information corresponding to the product name of the metal part 401 stored in the setting information storage 304, that is, acquires the format of the training model of the machine learning to generate a template of an abnormality detection model. Additionally, the abnormality detection model generator 315 references the "training image information storage region" information item of the device setting information stored in the setting information storage 304 to acquire the image information of the image to be learned stored in the image information storage 305. Moreover, the abnormality detection model generator 315 references the "abnormality training information storage region" information item of the device setting information corresponding to the product name of the metal part 401 stored in the setting information storage 304 to acquire the "X coordinate" and the "Y coordinate" information items of the abnormality training information corresponding to the product name of the metal part 401 stored in the abnormality training information storage 307. That is, the abnormality detection model generator 315 acquires the measurement values of the X coordinate and the Y coordinate.

The abnormality detection model generator 315 acquires the "pattern size" information item of the abnormality inspection setting information, that is, acquires the lengths of the width and the height of the image to be extracted from the image to be learned. The abnormality detection model generator 315 extracts, from the image to be learned, an image that is centered on the acquired measurement values of the X coordinate and the Y coordinate and that has the pattern size of the acquired width and the height. Additionally, the abnormality detection model generator 315 acquires the "category" information item of the abnormality training information corresponding to the product name of the metal part 401, that is, acquires the category of the abnormality to be learned, and updates the abnormality detection model by carrying out machine learning using the extracted image as an image of a type of abnormality of the acquired category.

For example, when an image to be learned of the "substrate A" is acquired, the abnormality detection model generator 315 acquires "MA2" of the "model format" of the abnormality inspection setting information to generate a template of an abnormality detection model. Here, when, for example, "MA2" is "VGG16", the abnormality detection model generator 315 generates a template of an abnormality detection model having "VGG16" as the format of the training model. Additionally, the abnormality detection model generator 315 references "FA2" of the "training image information storage region" to acquire the image information of the image to be learned.

The abnormality detection model generator 315 references "FA4" of the "abnormality training information storage region" to specify the address where the abnormality training information is stored, and acquires, from the abnormality training information, "110" and "170" as the measurement values of the X coordinate and the Y coordinate of the position of the abnormality of the surface of the substrate 4. Additionally, the abnormality detection model generator 315 acquires, from the abnormality inspection setting information, the width WA2 and the height LA2 of the "pattern size." The abnormality detection model generator 315 extracts, from the image to be learned, an image that is centered on the coordinate position (110, 170) and that has a range in which the width is WA2 and the height is LA2. The abnormality detection model generator 315 acquires "deposit" of the "category" item of the abnormality training information, and updates the abnormality detection model by carrying out machine learning using the extracted image as an image of a deposit type of abnormality.

As described above, the abnormality detector 317 detects an abnormality of the surface of the substrate 4 from an image that includes the substrate 4 and is captured by the imager 209. The abnormality detector 317 references the "inspection image information temporary storage region" information item of the device setting information corresponding to the product name of the metal part 401 stored in the setting information storage 304 to acquire the image information of the image to be inspected temporarily stored in the image information storage 305. Additionally, the abnormality detector 317 acquires the value of the "image size" item of the device setting information and, also, acquires the "abnormality detection range" and the "pattern size" information items of the abnormality inspection setting information corresponding to the product name of the metal part 401 stored in the setting information storage 304. That is, the abnormality detector 317 acquires the X coordinate and Y coordinate values that are the starting point of the abnormality detection range in the image to be inspected and the X coordinate and Y coordinate values that are the ending point of the abnormality detection range in the image to be inspected, and the lengths of the width and the height of the image to be extracted.

The abnormality detector 317 extracts, from the image to be inspected, an image that is centered on the coordinate position expressed by the X coordinate and Y coordinate values selected from in the abnormality detection range, and that has the pattern size of the acquired width and the height. Additionally, the abnormality detector 317 acquires the abnormality detection model stored in the abnormality detection model storage 316, and applies the abnormality detection model to the extracted image to calculate, for each abnormality category, a score that is an evaluation value of that image. Here, the calculated score is a score that indicates the possibility of being an image that includes an abnormality of a specific category. Taking the score for "rust" as an example, the score increases as the possibility of the extracted image being an image that includes a "rust" abnormality increases, and the score decreases as the possibility of the extracted image being an image that includes a "rust" abnormality decreases.

The abnormality detector 317 acquires the "score threshold" information item of the position inspection setting information corresponding to the product name of the metal part 401, that is, acquires the score thresholds for each abnormality category, and determines whether there is a category for which the calculated score is greater than or equal to the acquired score threshold. When there is a score that is greater than or equal to a score threshold, the abnormality detector 317 specifies the abnormality of the category having the maximum score, calculates the measurement values of the X coordinate and the Y coordinate of the image specified as the abnormality, and calculates, by image processing, the size of the portion identified as the abnormality. Note that, a score that is greater than or equal to the score threshold not existing means that an abnormality of the surface of the substrate 4 has not been detected by the abnormality detector 317. The abnormality detector 317 extracts all of the images having the pattern size in the abnormality detection range, calculates a score for each of the abnormality categories in the extracted images and, when there is a category that has a score that is greater than or equal to a score threshold, specifies the abnormality of the category having the maximum score, and calculates the measurement values of the X coordinate and the Y coordinate and the size.

For example, when an image to be inspected of the "substrate A" is acquired, the abnormality detector 317 references "FA1" of the "inspection image information temporary storage region" to acquire the image information of the image to be inspected. The abnormality detector 317 acquires "SZA1" of the "image size" item and also acquires the range XSA2 to XEA2 of the X coordinate value and the range YSA2 to YEA2 of the Y coordinate value of the "abnormality detection range" and the width WA2 and the height LA2 of the "pattern size" of the abnormality inspection setting information. Additionally, the position detector 312 extracts, from the image to be learned, an image of that is centered on a coordinate position, selected from in the rectangular abnormality detection range having the starting point (XSA2, YSA2) and the ending point (XEA2, YEA2) as diagonal vertices, and that has a range in which the width is WA2 and the height is LA2.

The abnormality detector 317 applies the acquired abnormality detection model to the extracted image to calculate a score of that image for each abnormality category. Additionally, the abnormality detector 317 acquires the score threshold SA21 of "rust", the score threshold SA22 of "distortion", the score threshold SA23 of "dent" and the score threshold SA24 of "deposit" of the "score threshold" of the position inspection setting information, and determines whether there is a category for which the calculated score is greater than or equal to the acquired score threshold. When there is a score that is greater than or equal to a score threshold, the abnormality detector 317 specifies the abnormality of the category having the maximum score. Specifically, when the score of "rust" is SC21, the score of "distortion" is SC22, the score of "dent" is SC23, and the score of "deposit" is SC24, SC21<SC22<SC23<SC24, SC21<SA21, SC22<SA22, SC23<SA23, and SC24>SA24, the abnormality detector 317 specifies a deposit abnormality.

Note that, in Embodiment 1, when there is a score that is greater than or equal to a score threshold, the abnormality detector 317 specifies the abnormality of the category having the maximum score. However, a configuration is possible in which, when there is a score that is greater than or equal to the score threshold, an abnormality of the category having that score is specified, even if that score is not the maximum score. For example, when SC22<SC23<SC21<SC24, SC21>SA21, SC22<SA22, SC23<SA23, and SC24>SA24, the abnormality detector 317 may specify rust and deposit abnormalities. Additionally, when, for example, the X coordinate and Y coordinate values of the image identified as an abnormality are (X2, Y2) and the size is SZ2, the abnormality detector 317 calculates (X2, Y2) as the measurement values of the X coordinate and the Y coordinate and calculates, by image processing, SZ2 as the size of the portion specified as the abnormality. The abnormality detector 317 extracts all of the images having pattern size in the abnormality detection range, calculates a score for each abnormality category in the extracted images and, when there is a category having a score that is greater than or equal to a score threshold, specifies the category of the abnormality having the maximum score, and calculates the measurement values of the X coordinate and the Y coordinate and the size.

As described above, the abnormality standard determiner 318 determines whether the detected abnormality of the surface of the substrate 4 conforms to the standard. The abnormality standard determiner 318 acquires the "abnormality inspection standard" information item of the product setting list information corresponding to the product name of the metal part 401 stored in the setting information storage 304, that is, acquires a standard value of the size of the abnormality in the abnormality inspection of the metal part 401. When the value of the size of the abnormality calculated by the abnormality detector 317 is less than or equal to the standard value, the abnormality standard determiner 318 determines that the standard is conformed to, even if there is a detected abnormality of the surface of the substrate 4. When the value of the size of the abnormality calculated by the abnormality detector 317 exceeds the standard value, depending on the detected abnormality of the surface of the substrate 4, the abnormality standard determiner 318 determines that the standard is not conformed to.

For example, when an image to be inspected of the "substrate A" is acquired, the abnormality standard determiner 318 acquires the threshold "SZA3" of the size of the "abnormality inspection standard" of the product setting list information. Additionally, when SZ2≤SZA3, the abnormality standard determiner 318 determines that the standard is conformed to, and when SZ2>SZA3, determines that the standard is not conformed to.

The abnormality outputter 319 outputs, as the detected abnormality of the surface of the substrate 4, the abnormality category specified by the abnormality detector 317, and the X coordinate and Y coordinate values and the size of the abnormality calculated by the abnormality detector 317. Additionally, the abnormality outputter 319 outputs the standard value of the size of the abnormality acquired by the abnormality standard determiner 318. When the abnormality standard determiner 318 determines that the standard is conformed to, the abnormality outputter 319 outputs, as determination result information, OK determination information expressing that the standard is conformed to. When the abnormality standard determiner 318 determines that the standard is not conformed to, the abnormality outputter 319 outputs, as the determination result information, NG determination information expressing that the standard is not conformed to.

For example, when an image to be inspected of the "substrate A" is acquired, the abnormality outputter 319 outputs "deposit", (X2, Y2), SZ2, and SZA3. Additionally, when SZ2≤SZA3, the abnormality outputter 319 outputs the OK determination information, and when SZ2>SZA3, outputs the NG determination information.

Figure 8:
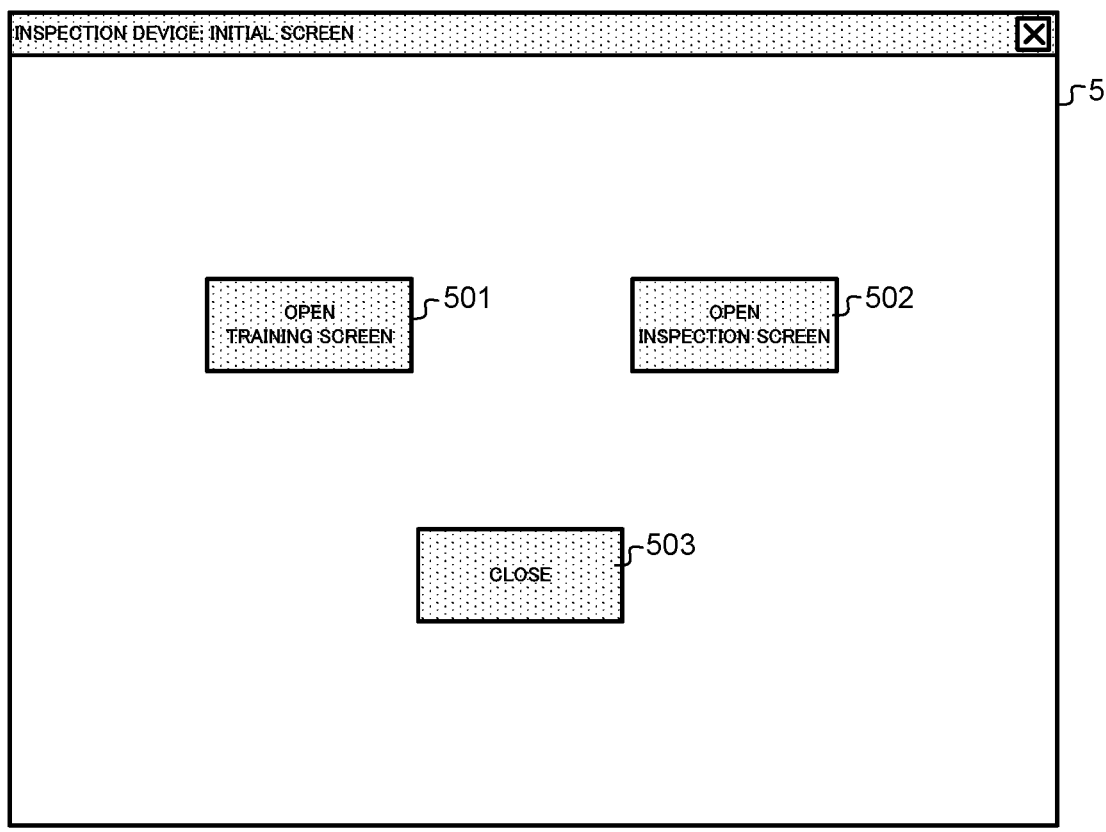
FIG. 8 is a drawing illustrating a display example of an initial screen according to Embodiment 1.

FIG. 8 is a drawing illustrating a display example of the initial screen according to Embodiment 1. When the program for inspection is executed, the initial screen display 320 displays the initial screen 5 illustrated in FIG. 8. The initial screen 5 includes a training screen display button 501 for displaying the training screen, an inspection screen display button 502 for displaying the inspection screen, and an end button 503 for ending the program. As illustrated in FIG. 8, in the initial screen 5, the training screen display button 501 is provided in the upper left portion of the initial screen 5, the inspection screen display button 502 is provided in the upper right portion of the initial screen 5, and the end button 503 is provided in the center of the right-left direction of the lower portion of the initial screen 5.

Figure 9:
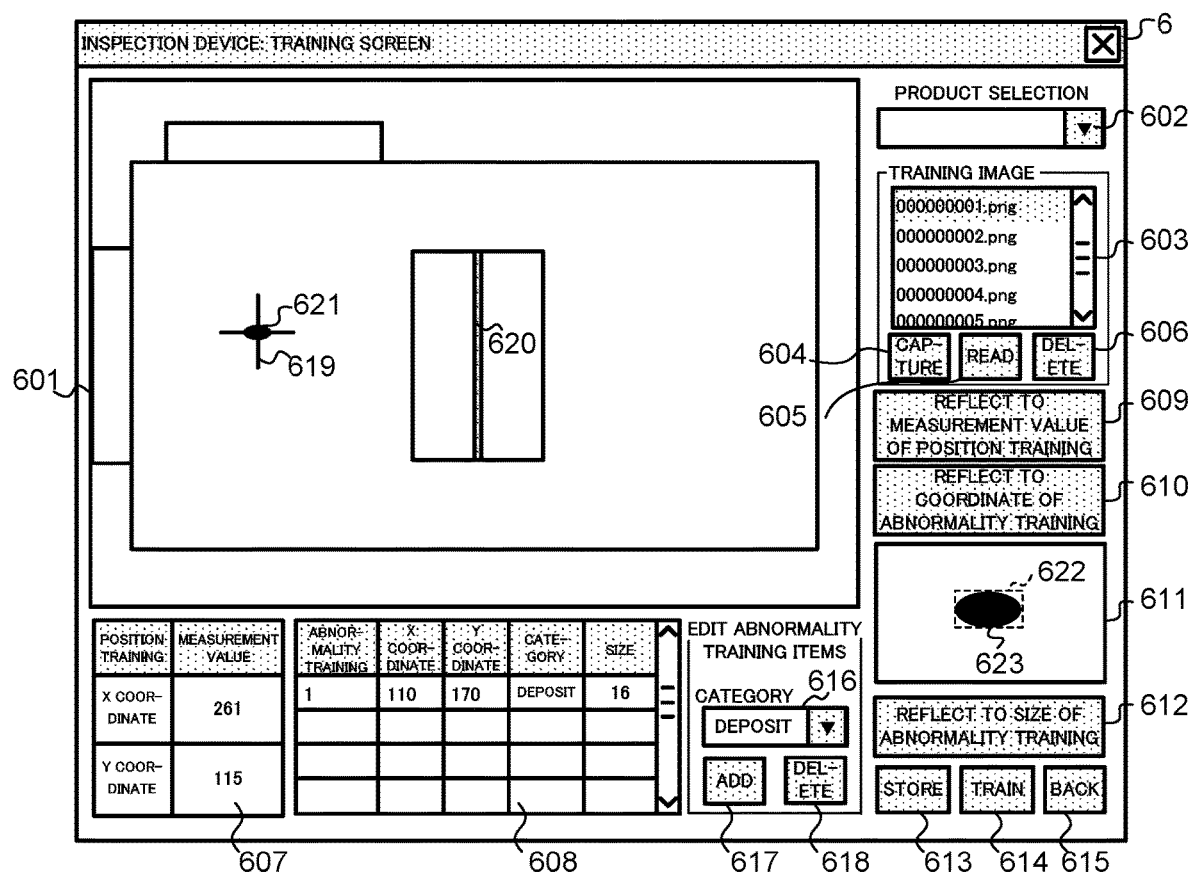
FIG. 9 is a drawing illustrating a display example of a training screen according to Embodiment 1.

FIG. 9 is a drawing illustrating a display example of the training screen according to Embodiment 1. The training screen display 321 displays the training screen 6 illustrated in FIG. 9 when the training screen display button 501 is operated on the initial screen 5. The training screen 6 includes a training image display field 601 for displaying the image to be learned, a product selection field 602 for selecting the product name of the substrate 4, and a training image selection field 603 for selecting the image to be learned. Additionally, the training screen 6 includes a training image capture button 604 for capturing the image to be learned, a training image read button 605 for reading the image information of the selected image to be learned, and a training image delete button 606 for deleting the image information of the selected image to be learned.

Additionally, the training screen 6 includes a position training information display field 607 for displaying the position training information, an abnormality training information display field 608 for displaying the abnormality training information, and a position training information apply button 609 for applying the position of the metal part 401 to the position training information display field 607. Additionally, the training screen 6 includes a first abnormality training information apply button 610 for applying the position of the abnormality of the surface of the substrate 4 to the abnormality training information display field 608, and an enlarged display field 611 for displaying an image of the surface of the substrate 4 in an enlarged manner. Additionally, the training screen 6 includes a second abnormality training information apply button 612 for applying the size of the abnormality of the surface of the substrate 4 to the abnormality training information display field 608. Additionally, the training screen 6 includes a store button 613 for storing the contents of the position training information display field 607 and the abnormality training information display field 608 as the position training information and the abnormality training information, and a train button 614 for executing the machine learning.

Additionally, the training screen 6 includes a back button 615 for returning to the display of the initial screen 5, an abnormality category selection field 616 for selecting the category of the abnormality of the surface of the substrate 4, and an add abnormality category button 617 for adding an item of an abnormality category of the surface of the substrate 4 to the abnormality training information display field 608. Additionally, the training screen 6 includes a delete abnormality category button 618 for deleting the item of the abnormality category of the surface of the substrate 4 selected in the abnormality training information display field 608.

As illustrated in FIG. 9, in the training screen 6, the training image display field 601 is provided in the upper left portion of the training screen 6, the product selection field 602 is provided in the upper right portion of the training screen 6, and the training image selection field 603 is provided below the product selection field 602. The training image capture button 604 is provided on the left side below the training image selection field 603, the training image read button 605 is provided below the training image selection field 603, and the training image delete button 606 is provided on the right side below the training image selection field 603. The position training information display field 607 is provided on the left side below the training image display field 601, the abnormality training information display field 608 is provided below the training image display field 601, and the position training information apply button 609 is provided below the buttons 604 to 606.

The first abnormality training information apply button 610 is provided below the position training information apply button 609, the enlarged display field 611 is provided below the first abnormality training information apply button 610, and the second abnormality training information apply button 612 is provided below the enlarged display field 611. The store button 613 is provided on the left side below the second abnormality training information apply button 612, the train button 614 is provided below the second abnormality training information apply button 612, and the back button 615 is provided on the right side below the second abnormality training information apply button 612. The abnormality category selection field 616 is provided on the right side below the training image display field 601, the add abnormality category button 617 is provided on the left side below the abnormality category selection field 616, and the delete abnormality category button 618 is provided on the right side below the abnormality category selection field 616.

The training screen display 321 acquires the "product name" information item stored in the setting information storage 304, that is, acquires all of the product names, and makes the product names selectable in the product selection field 602. When the user selects a product name in the product selection field 602 via the input device 301, the training screen display 321 references the "training image information storage region" information item of the device setting information corresponding to the selected product name stored in the setting information storage 304 to display, in a list, file names of images to be learned for the product name selected in the training image selection field 603. Additionally, when the user operates, via the input device 301, the training image read button 605 after selecting a file name in the training image selection field 603, the training screen display 321 acquires, from the image information storage 305, the image information of the image to be learned having the selected file name, and displays the image to be learned in the training image display field 601.

Note that, when the user operates the training image capture button 604 via the input device 301 while a product name is selected in the product selection field 602, the illumination light controller 303 controls the illumination light output devices 210, 211 to output illumination light, and the imaging controller 202 controls the imager 209 to capture an image to be learned and stores the image information in the image information storage 305. Moreover, the training screen display 321 adds/displays the file name of the captured image to be learned to/in the training image selection field 603, and displays the captured image to be learned in the training image display field 601.

The training screen display 321 displays a cursor 619 in the training image display field 601, and the user can change the display position of the cursor 619 via the input device 301. Therefore, the user can change, via the input device 301, the display position of the cursor 619 from the image to be learned displayed in the training image display field 601 to a position 620 corresponding to the glossy portion 402 of the metal part 401 or to a position 621 corresponding to the abnormality of the surface of the substrate 4. Additionally, when the user changes the display position of the cursor 619 to the position 620 corresponding to the glossy portion 402, the training screen display 321 displays, in the enlarged display field 611, an enlarged image of the position 620 corresponding to the glossy portion 402. Moreover, when the user operates, via the input device 301, the position training information apply button 609 while the enlarged image is displayed in the enlarged display field 611, the training screen display 321 displays, in the position training information display field 607, the measurement values of the X coordinate and the Y coordinate corresponding to the display position of the cursor 619.

When the user changes the display position of the cursor 619 to the position 621 corresponding to the abnormality of the surface of the substrate 4, the training screen display 321 displays, in the enlarged display field 611, an enlarged image of the position 621 corresponding to the abnormality of the surface of the substrate 4. At this time, the training screen display 321 displays a region display frame 622, and displays an image 623 of the abnormality centered on the position 621 corresponding to the abnormality of the surface of the substrate 4, in a state surrounded by the region display frame 622. Additionally, the training screen display 321 can select the four types of abnormality categories, namely "rust", "distortion", "dent", and "deposit" in the abnormality category selection field 616.

When the user selects, via the input device 301, an abnormality category in the abnormality category selection field 616 and then operates the add abnormality category button 617 while the region display frame 622 is displayed in the enlarged display field 611, the training screen display 321 adds an item of abnormality training, and displays the selected abnormality category in the "category" item of the abnormality training information display field 608. When the user operates, via the input device 301, the first abnormality training information apply button 610 while a type of abnormality training of the abnormality training information display field 608 is selected, the training screen display 321 displays the measurement values of the X coordinate and the Y coordinate corresponding to the display position of the cursor 619 in the "X coordinate" and "Y coordinate" items of the selected abnormality training of the abnormality training information display field 608. When the user operates, via the input device 301, the second abnormality training information apply button 612 while a type of abnormality training of the abnormality training information display field 608 is selected, the training screen display 321 displays the size of the region display frame 622 in the "size" item of the selected abnormality training of the abnormality training information display field 608.

When the user operates, via the input device 301, the delete abnormality category button 618 while a type of abnormality training of the abnormality training information display field 608 is selected, the training screen display 321 hides the selected abnormality training item.

When the user operates, via the input device 301, the store button 613 while there is a display in the position training information display field 607, the training screen display 321 references the "position training information storage region" item of the image display information of the selected product name stored in the setting information storage 304, and stores the information displayed in the position training information display field 607 in the position training information storage 306 as the position training information of the selected product name. When the user operates, via the input device 301, the store button 613 while there is a display in the abnormality training information display field 608, the training screen display 321 references the "abnormality training information storage region" item of the image display information of the selected product name stored in the setting information storage 304, and stores the information displayed in the abnormality training information display field 608 in the abnormality training information storage 307 as the abnormality training information of the selected product name.

When the user operates, via the input device 301, the train button 614 while there is a display in the position training information display field 607, as described above, the training screen display 321 causes the position detection model generator 310 to generate a position detection model. Additionally, when the user operates, via the input device 301, the train button 614 while there is a display in the abnormality training information display field 608, as described above, the training screen display 321 causes the abnormality detection model generator 315 to generate an abnormality detection model. Note that, when the user operates, via the input device 301, the train button 614 while the position detection model and the abnormality detection model are being generated, the training screen display 321 stops the generating by the position detection model generator 310 and the abnormality detection model generator 315.

When the user operates, via the input device 301, the training image delete button 606 while a file name is selected in the training image selection field 603, the training screen display 321 hides the selected file name of the training image selection field 603. At this time, when there is information, related to the image to be learned of the selected file name, in the training image display field 601, the enlarged display field 611, the position training information display field 607, and the abnormality training information display field 608, the training screen display 321 hides that information. Additionally, at this time, the training screen display 321 causes the image information storage 305 to delete the image information of the image to be learned of the selected file name. Moreover, when the user operates the back button 615 via the input device 301, the training screen display 321 hides the training screen 6 and causes the initial screen display 320 to display the initial screen 5.

Figure 10:
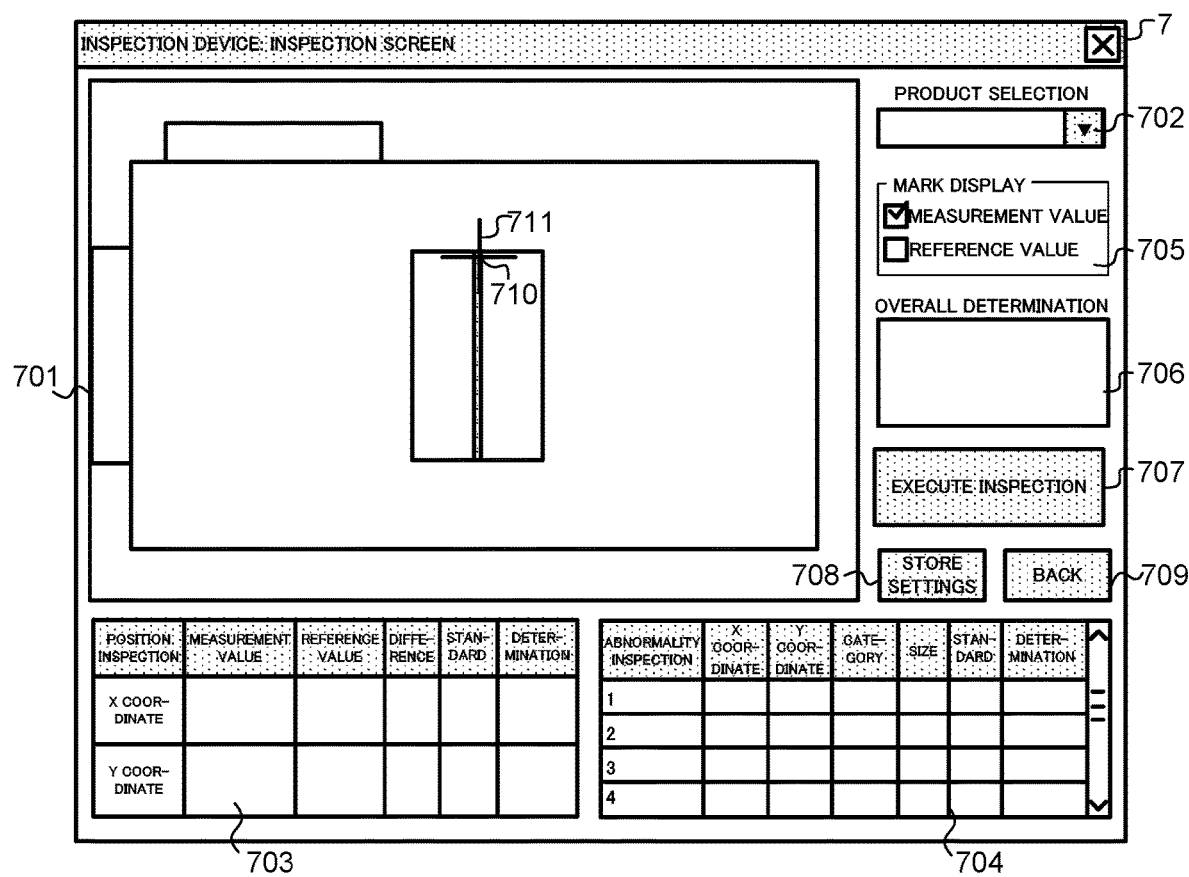
FIG. 10 is a drawing illustrating a display example of an inspection screen according to Embodiment 1.

FIG. 10 is a drawing illustrating a display example of the inspection screen according to Embodiment 1. The inspection screen display 322 displays the inspection screen 7 illustrated in FIG. 10 when the inspection screen display button 502 is operated in the initial screen 5. The inspection screen 7 includes an inspection image display field 701 in which the image to be inspected is displayed, a product selection field 702 for selecting the product name of the substrate 4, and a position inspection information display field 703 for displaying information related to the inspection of the position of the metal part 401. Additionally, the inspection screen 7 includes an abnormality inspection information display field 704 for displaying information related to the inspection of the abnormality of the surface of the substrate 4, and a mark display switch field 705 for switching whether marks, based on the measurement values and the reference values of the position inspection information display field 703, are displayed in the inspection image display field 701. Additionally, the inspection screen 7 includes an overall determination field 706 for displaying the overall determination result of the inspection of the position of the metal part 401 and the inspection of the abnormality of the surface of the substrate 4, and an execute inspection button 707 for executing the inspections. Additionally, the inspection screen 7 includes a store button 708 for storing the information displayed in the position inspection information display field 703 and the abnormality inspection information display field 704, and a back button 709 for returning to the display of the initial screen.

As illustrated in FIG. 10, in the inspection screen 7, the inspection image display field 701 is provided in the upper left portion of the inspection screen 7, and the product selection field 702 is provided in the upper right portion of the inspection screen 7. The position inspection information display field 703 is provided below the inspection image display field 701, and the abnormality inspection information display field 704 is provided to the right of the position inspection information display field 703. The mark display switch field 705 is provided below the product selection field 702, the overall determination field 706 is provided below the mark display switch field 705, and the execute inspection button 707 is provided below the overall determination field 706. The store button 708 is provided on the left side below the execute inspection button 707, and the back button 709 is provided on the right side below the execute inspection button 707.

When the inspection screen display 322 displays the inspection screen 7, the illumination light controller 303 outputs the illumination light by controlling the illumination light output devices 210, 211, and the imaging controller 302 displays, in the inspection image display field 701 an image to be inspected that is captured by controlling the imager 209. The inspection screen display 322 acquires the "product name" information item stored in the setting information storage 304, that is, acquires all of the product names, and makes the product names selectable in the product selection field 702. When the user operates, via the input device 301, the execute inspection button 707 while a product name is selected in the product selection field 702, as described above, the inspection screen display 322 causes the position detector 312 to detect the position of the metal part 401. The inspection screen display 322 causes the position standard determiner 313 to determine whether the standard is conformed to, and the position outputter 314 to output the measurement values, the reference values, the standard values, the determination values, and the determination result information of the X coordinate and the Y coordinate. Additionally, the inspection screen display 322 displays, in the position inspection information display field 703, the outputted measurement values, reference values, standard values, determination values, and determination result information of the X coordinate and the Y coordinate.

Note that, in the inspection screen display 322, the "measurement values" item and the "reference values" item are selectable in the mark display switch field 705. When the user selects, via the input device 301, the "measurement values" item in the mark display switch field 705 while there is a display of the measurement values of the X coordinate and the Y coordinate in the position inspection information display field 703, the inspection screen display 322 displays a measurement value mark 711 at a position 710 corresponding to the measurement values of the X coordinate and the Y coordinate in the inspection image display field 701. When the user selects, via the input device 301, the "reference values" item in the mark display switch field 705 while there is a display of the reference values of the X coordinate and the Y coordinate in the position inspection information display field 703, the inspection screen display 322 displays a non-illustrated reference value mark at a position corresponding to the reference values of the X coordinate and the Y coordinate in the inspection image display field 701. Note that, a configuration is possible in which, when the user moves, via the input device 301, the position of the reference value mark while the reference value mark is displayed in the inspection image display field 701, the inspection screen display 322 changes the display of the reference values of the X coordinate and the Y coordinate in the position inspection information display field 703.

When the user operates, via the input device 301, the execute inspection button 707 while a product name is selected in the product selection field 702, as described above, the inspection screen display 322 causes the abnormality detector 317 to detect the abnormality of the surface of the substrate 4. The inspection screen display 322 causes the abnormality standard determiner 318 to determine whether the standard is conformed to, and the abnormality outputter 319 to output the abnormality category, the X coordinate and Y coordinate values of the abnormality, the measurement value of the size of the abnormality, the standard value, and the determination result information. Additionally, the inspection screen display 322 displays, in the abnormality inspection information display field 704, the abnormality category, the X coordinate and Y coordinate values of the abnormality, the measurement value of the size of the abnormality, the standard value, and the determination result information that are outputted.

When the user operates, via the input device 301, the execute inspection button 707 while a product name is selected in the product selection field 702, the inspection screen display 322 causes the overall determiner 323 to carry out the overall determination and the overall determination result outputter 324 to output the overall determination result information. Additionally, the inspection screen display 322 displays the outputted overall determination result information in the overall determination field 706.

When the user operates, via the input device 301, the store button 708 while there is a display in the position inspection information display field 703, the inspection screen display 322 causes the measurement values, the reference values, the standard values, the determination values, and the determination result information of the X coordinate and the Y coordinate displayed in the position inspection information display field 703 to be stored as the position inspection information in the overall determination result storage 325. Note that, a configuration is possible in which, at this time, when the display of the reference values of the X coordinate and the Y coordinate is changed in the position inspection information display field 703, the "position inspection reference" information item of the product setting list information is updated to the changed values in the setting information storage 304. When the user operates, via the input device 301, the store button 708 while there is a display in the abnormality inspection information display field 704, the inspection screen display 322 causes the abnormality category, the X coordinate and Y coordinate values of the abnormality, the measurement values of the size of the abnormality, the standard value, and the determination result information displayed in the abnormality inspection information display field 704 to be stored as the abnormality inspection information in the overall determination result storage 325. When the user operates, via the input device 301, the store button 708 while there is a display in the abnormality inspection information display field 704, the inspection screen display 322 causes the overall determination information displayed in the overall determination field 706 to be stored in the overall determination result storage 325. When the user operates the back button 709 via the input device 301, the inspection screen display 322 hides the inspection screen 7 and causes the initial screen display 320 to display the initial screen 5.

As described above, the overall determiner 323 carries out an overall determination of the inspection result of the position of the metal part 401 and the inspection result of the abnormality of the surface of the substrate 4. When the determination result information outputted by the position outputter 314 is OK determination information and, also, the determination result information outputted by the abnormality outputter 319 are all OK determination information, the overall determiner 323 determines an OK overall determination as the overall determination result. However, when the determination result information outputted by the position outputter 314 is NG determination information or even one of the determination result information outputted by the abnormality outputter 319 is NG determination information, the overall determiner 323 determines an NG overall determination as the abnormality overall determination result.

When the overall determiner 323 makes a determination of OK overall determination, the overall determination result outputter 324 outputs OK overall determination information as the overall determination result information. When the overall determiner 323 makes a determination of NG overall determination, the overall determination result outputter 324 outputs NG overall determination information as the overall determination result information. Note that the OK overall determination information and the NG overall determination information are, for example, "OK determination" and "NG determination" information.

As described above, the overall determination result storage 325 stores the position inspection information displayed in the position inspection information display field 703 of the inspection screen 7, the abnormality inspection information displayed in the abnormality inspection information display field 704 of the inspection screen 7, and the overall determination information displayed in the overall determination field 706 of the inspection screen 7.

Figure 11:
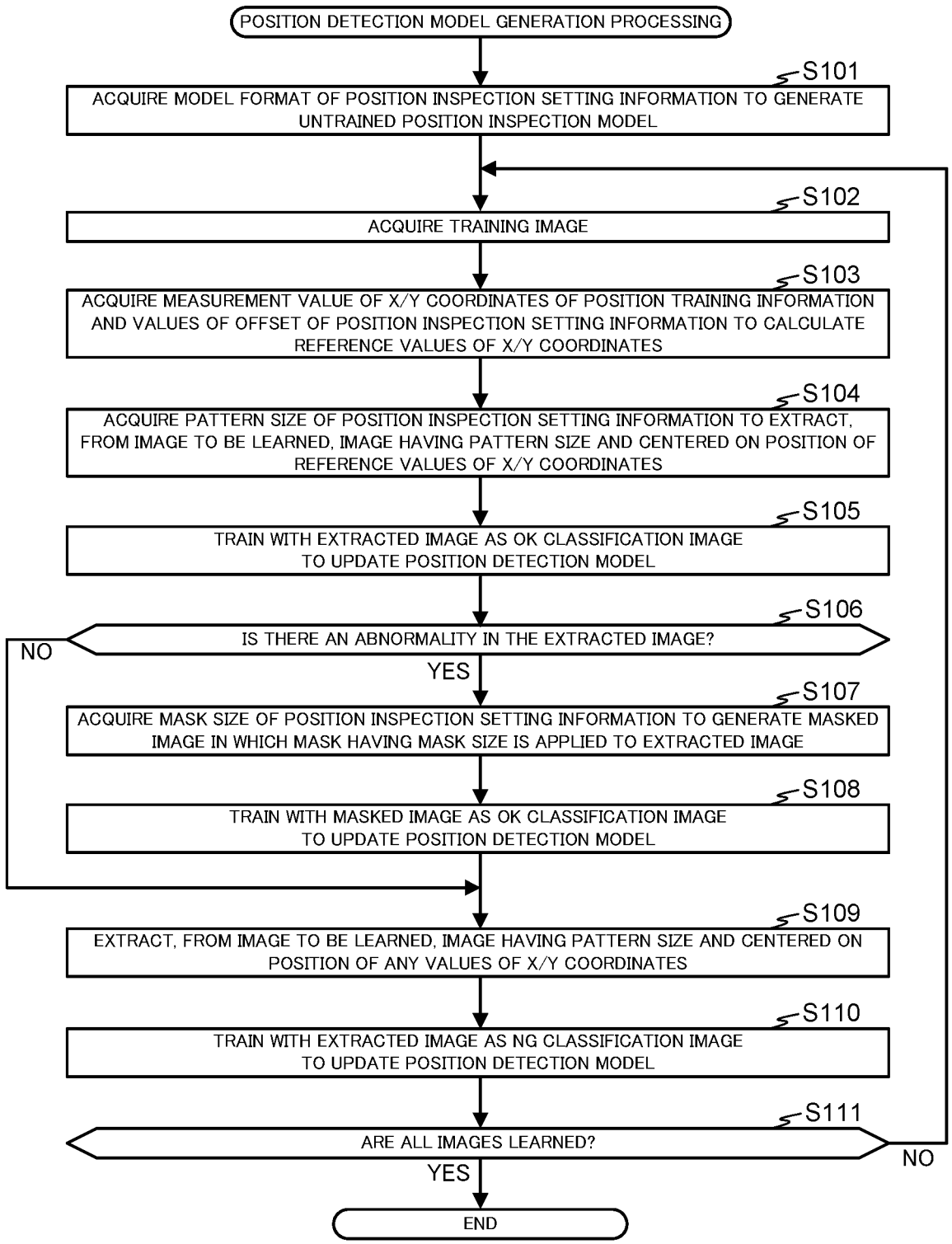
FIG. 11 is a flowchart illustrating position detection model generation processing according to Embodiment 1.

FIG. 11 is a flowchart illustrating position detection model generation processing according to Embodiment 1. The operations of the inspection device 1 for generating the position detection model are described using the flowchart illustrated in FIG. 11. When the user operates, via the input device 301, the train button 614 on the training screen 6, the position detection model generator 310 starts the execution of the position detection model generation processing. Firstly, as illustrated in FIG. 11, the position detection model generator 310 acquires the model format from the position inspection setting information corresponding to the product name selected on the training screen 6, and generate an untrained position detection model (step S101). For example, when the "substrate A" is selected on the training screen 6, the position detection model generator 310 acquires "MA1" from the position inspection setting information and generates a position detection model having the model format of "MA1."

The position detection model generator 310 acquires the image to be learned from the image information corresponding to the product name selected on the training screen 6 (step S102). The position detection model generator 310 acquires the measurement values of the X coordinate and the Y coordinate of the position training information and the offset values of the X coordinate and the Y coordinate of the position inspection setting information corresponding to the product name selected on the training screen 6, and causes the reference position calculator 308 to calculate the reference position, that is, the reference values of the X coordinate and the Y coordinate (step S103). For example, when the "substrate A" is selected on the training screen 6, the reference position calculator 308 acquires "261" and "115" from the position training information and acquires "(XOA1, YOA1)" from the position inspection setting information, and calculates (261+XOA1, 115+YOA1).

The position detection model generator 310 acquires the pattern size of the position inspection setting information corresponding to the product name selected on the training screen 6, and extracts, from the image to be learned, an image that is centered on the reference values of the X coordinate and the Y coordinate and that has the pattern size (step S104). For example, when the "substrate A" is selected on the training screen 6, the position detection model generator 310 acquires "(WA1, LA1)" of the position inspection setting information, and extracts, from the image to be learned, an image that is centered on the coordinate position (261+XOA1, 115+YOA1) and that has a range in which the width is WA1 and the height is LA1. Additionally, the position detection model generator 310 updates the position detection model by carrying out machine learning using the extracted image as an OK classification image (step S105).

The position detection model generator 310 acquires the X coordinate and Y coordinate values of the abnormality training information stored in the abnormality training information storage 307, and determines whether an abnormality of the surface of the substrate 4 is detected in the extracted image (step S106). For example, when the "substrate A" is selected on the training screen 6, the position detection model generator 310 acquires "110" and "170" of the abnormality training information, and determines whether the coordinate position (110, 170) is included in the extracted image having the pattern size.

When an abnormality is detected (step S106; YES), the position detection model generator 310 acquires the mask size from the position inspection setting information corresponding to the product name selected on the training screen 6, and causes the masked image generator 309 to generate a masked image in which a mask of the mask size is applied to the extracted image (step S107). For example, in a case in which the "substrate A" is selected on the training screen 6, when the coordinate position (110, 170) is included in the extracted image having the pattern size, the masked image generator 309 acquires "(MWA1, MLA1)" from the position inspection setting information. Additionally, the masked image generator 309 replaces a range centered on the coordinate position (110, 170) in which the width is MWA1 and the height is MLA1 with an image filled with white.

The position detection model generator 310 updates the position detection model by carrying out machine learning using the generated masked image as an OK classification image (step S108). After the position detection model update based on the masked image or when an abnormality is not detected (step S106; NO), the position detection model generator 310 extracts, from the image to be learned, an image that has the pattern size and is centered on any values other than the reference values of the X coordinate and the Y coordinate (step S109). For example, when the "substrate A" is selected on the training screen 6, the position detection model generator 310 acquires "(WA1, LA1)" of the position inspection setting information, and extracts, from the image to be learned, an image that is centered on any coordinate position other than (261+XOA1, 115+YOA1), and that has a range in which the width is WA1 and the height is LA1. Additionally, the position detection model generator 310 updates the position detection model by carrying out machine learning using the extracted image as an NG classification image (step S110).

The position detection model generator 310 determines whether the machine learning has been carried out using all of the images to be learned (step S111). When the machine learning has not been carried out using all of the images to be learned (step S111; NO), the position detection model generator 310 repeats the processing of steps S102 to S110 is repeated until the machine learning is carried out using all of the images to be learned. However, the machine learning has been carried out using all of the images to be learned (step S111; YES), position detection model generator 310 ends the processing.

Figure 12:
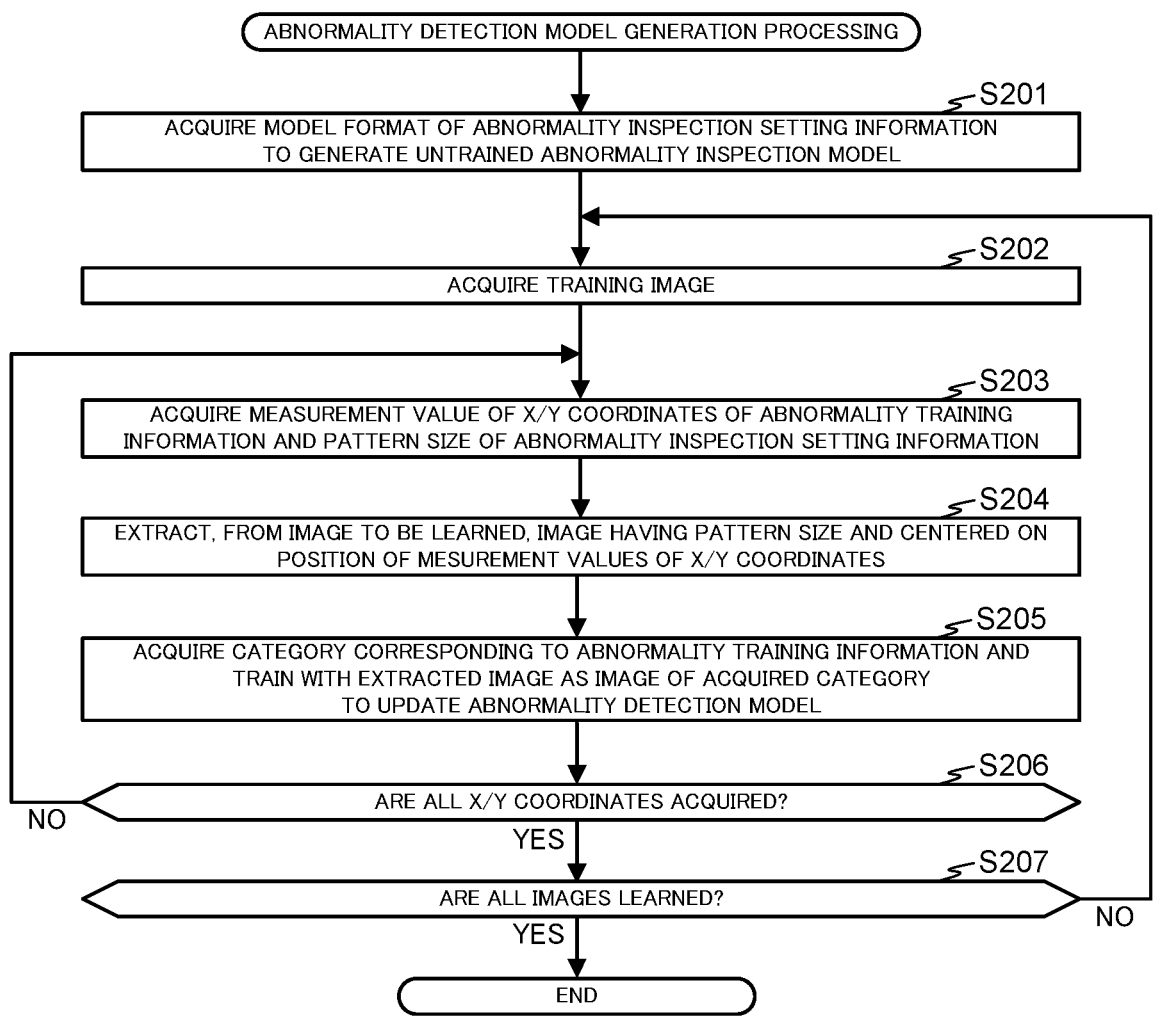
FIG. 12 is a flowchart illustrating abnormality detection model generation processing according to Embodiment 1.

FIG. 12 is a flowchart illustrating abnormality detection model generation processing according to Embodiment 1. The operations of the inspection device 1 for generating the abnormality detection model are described using the flowchart illustrated in FIG. 12. When the user operates, via the input device 301, the train button 614 on the training screen 6, the abnormality detection model generator 315 starts the execution of the abnormality detection model generation processing. Firstly, as illustrated in FIG. 12, the abnormality detection model generator 315 acquires the model format from the abnormality inspection setting information corresponding to the product name selected on the training screen 6, and generates an untrained abnormality detection model (step S201). For example, when the "substrate A" is selected on the training screen 6, the abnormality detection model generator 315 acquires "MA2" from the abnormality inspection setting information and generates an abnormality detection model having the model format of "MA2."

The abnormality detection model generator 315 acquires the image to be learned from the image information corresponding to the product name selected on the training screen 6 (step S202). Additionally, the abnormality detection model generator 315 acquires the X coordinate and Y coordinate values of the abnormality training information and the pattern size of the abnormality inspection setting information corresponding to the product name selected on the training screen 6 (step S203). For example, when the "substrate A" is selected on the training screen 6, the abnormality detection model generator 315 acquires "110" and "170" of the abnormality training information, and acquires "(WA2, LA2)" of the abnormality inspection setting information. Additionally, the abnormality detection model generator 315 extracts, from the image to be learned, an image that is centered on the X coordinate and Y coordinate values and that has the pattern size (step S204). For example, when the "substrate A" is selected on the training screen 6, the abnormality detection model generator 315 extracts, from the image to be learned, an image that is centered on the coordinate position (110, 170) and that has a range in which the width is WA2 and the height is LA2.

The abnormality detection model generator 315 acquires, from the abnormality training information, the category of the item in which the acquired X coordinate and Y coordinate are included, and updates the abnormality detection model by carrying out machine learning using the extracted image as an image of the acquired category (step S205). For example, when the "substrate A" is selected in the training screen 6, the abnormality detection model generator 315 acquires "deposit" of the abnormality training information, and updates the abnormality detection model by carrying out machine learning using the extracted image as an image of an abnormality of the deposit type.

The abnormality detection model generator 315 determines whether the X coordinate and Y coordinate values of all of the items of the abnormality training information have been acquired (step S206). When the X coordinate and Y coordinate values of all of the items have not been acquired (step S206; NO), the abnormality detection model generator 315 repeats the processing of steps S203 to S205 until the X coordinate and Y coordinate values of all of the items have been acquired. However, when the X coordinate and Y coordinate values of all of the items of the abnormality training information have been acquired (step S206; YES), the abnormality detection model generator 315 determines whether machine learning has been carried out using all of the images to be learned (step S207). When machine learning has not been carried out using all of the images to be learned (step S207; NO), the abnormality detection model generator 315 repeats the processing of steps S202 to S206 until machine learning is carried out using all of the images to be learned. However, when machine learning has been carried out using all of the images to be learned (step S207; YES), the abnormality detection model generator 315 ends the processing.

Figure 13:
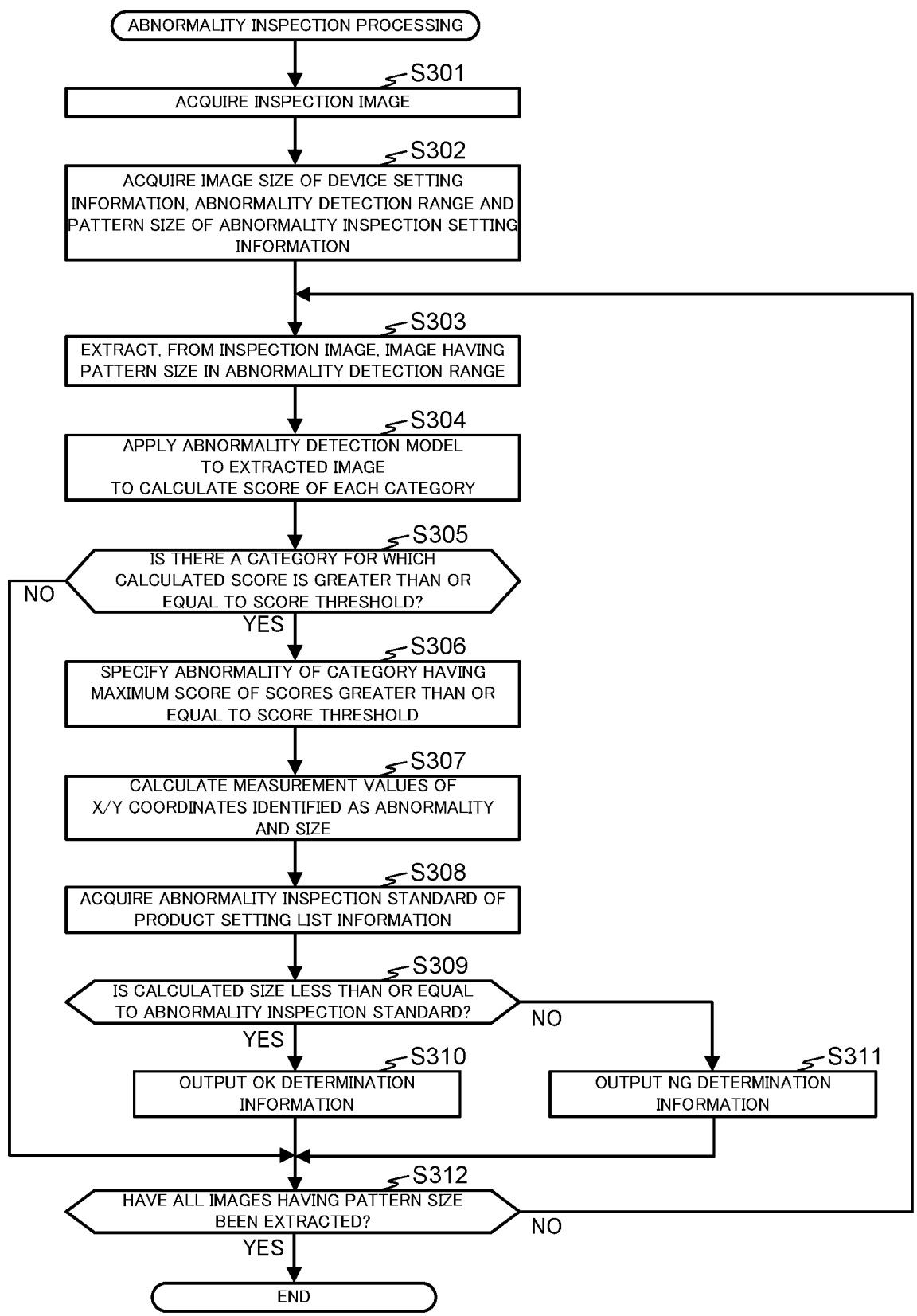
FIG. 13 is a flowchart illustrating abnormality inspection processing according to Embodiment 1.

FIG. 13 is a flowchart illustrating abnormality inspection processing according to Embodiment 1. The operations of the inspection device 1 for inspecting for abnormalities of the surface of the substrate 4 are described using the flowchart illustrated in FIG. 13. When the user operates, via the input device 301, the execute inspection button 707 on the inspection screen 7, the abnormality detector 317 starts the execution of the abnormality inspection processing. Firstly, as illustrated in FIG. 13, the abnormality detector 317 acquires an image to be inspected that is an image that is captured by the imager 209 and that includes the substrate 4 (step S301). The abnormality detector 317 acquires the image size from the device setting information corresponding to the product name selected on the inspection screen 7, and acquires the abnormality detection range and the pattern size of the abnormality inspection setting information (step S302). For example, when the "substrate A" is selected on the inspection screen 7, the abnormality detector 317 acquires "SZA1" of the device setting information, and acquires "(XSA2 to XEA2, YSA2 to YEA2)" and "(WA2, LA2)" of the abnormality inspection setting information.

The abnormality detector 317 extracts, from the image to be inspected, an image having the pattern size in the abnormality detection range (step S303). For example, when the "substrate A" is selected on the inspection screen 7, the abnormality detector 317 extracts, from the image to be inspected, an image that is centered on the coordinate position selected in the rectangular abnormality detection range having the starting point (XSA2, YSA2) and the ending point (XEA2, YEA2) as diagonal vertices, and that has a range in which the width is WA2 and the height is LA2. Additionally, the abnormality detector 317 applies, to the extracted image, the abnormality detection model corresponding to the product name selected on the inspection screen 7, and calculates a score for each abnormality category (step S304). For example, when the "substrate A" is selected in the inspection screen 7, the abnormality detector 317 calculates a score SC21 for "rust", a score SC22 for "distortion", a score SC23 for "dent", and a score SC24 for "deposit."

The abnormality detector 317 acquires the score thresholds of the categories of the abnormality inspection setting information corresponding to the product name selected on the inspection screen 7, and determines whether there is a category for which the calculated score is greater than or equal to the acquired score threshold (step S305). For example, when the "substrate A" is selected on the inspection screen 7, and SC21<SC22<SC23<SC24, SC21<SA21, SC22<SA22, SC23<SA23, and SC24>SA24, the abnormality detector 317 determines that the score SC24 for deposit is greater than or equal to the score threshold SA24. When there is a category for which the calculated score is greater than or equal to the score threshold (step S305; YES), the abnormality detector 317 specifies the abnormality of the category having the maximum score among the scores that are greater than or equal to the score threshold (step S306). For example, when the "substrate A" is selected on the inspection screen 7, the abnormality detector 317 specifies the abnormality of the deposit that has the maximum score SC24.

The abnormality detector 317 calculates the X coordinate and the Y coordinate specified as the abnormality, and the size (step S307). For example, when the "substrate A" is selected on the inspection screen 7, the abnormality detector 317 calculates (X2, Y2) and SZ2. Additionally, the abnormality standard determiner 318 acquires, from the product setting list information corresponding to the product name selected on the inspection screen 7, the value of the abnormality inspection standard (step S308). For example, when the "substrate A" is selected on the inspection screen 7, the abnormality standard determiner 318 acquires "SZA3" of the product setting list information.

The abnormality standard determiner 318 determines whether the calculated value of the size is less than or equal to the value of the abnormality inspection standard (step S309). When less than or equal to the value of the abnormality inspection standard (step S309; YES), the abnormality standard determiner 318 causes the abnormality outputter 319 to output, as the determination result information, OK determination information (step S310). However, when exceeding the value of the abnormality inspection standard (step S309; NO), the abnormality standard determiner 318 causes the abnormality outputter 319 to output, as the determination result information, NG determination information (step S311). For example, when the "substrate A" is selected on the inspection screen 7, the abnormality standard determiner 318 determines that the standard is conformed to and the abnormality outputter 319 outputs OK determination information when SZ2≤SZA3, and the abnormality standard determiner 318 determines that the standard is not conformed to and the abnormality outputter 319 outputs NG determination information when SZ2>SZA3.

After the determination result information outputting or when there is not a category for which the calculated score is greater than or equal to the score threshold (step S305; NO), the abnormality detector 317 determines whether all of the images having the pattern size in the abnormality detection range have been extracted from the image to be inspected (step S312). For example, when the "substrate A" is selected on the inspection screen 7, the abnormality detector 317 determines whether images having the pattern size have been extracted from all coordinates selectable in the rectangular abnormality detection range having the starting point (XSA2, YSA2) and the ending point (XEA2, YEA2) as diagonal vertices. When all of the images having the pattern size have not been extracted (step S312; NO), the abnormality detector 317 repeats the processing of steps S303 to S311 until the all of the images having the pattern size are extracted. However, when all of the images having the pattern size are extracted (step S312; YES), the abnormality detector 317 ends the processing.

Figure 14:
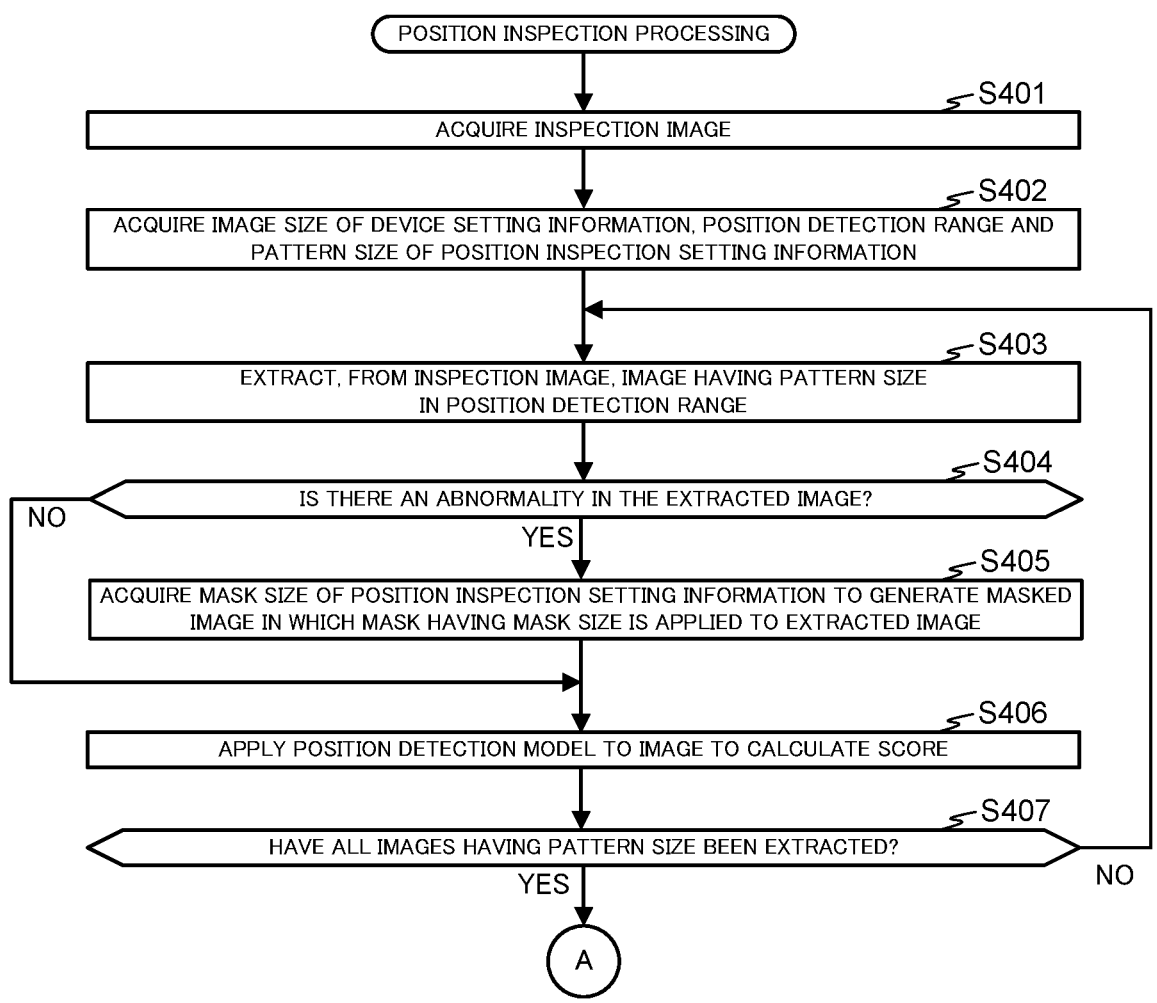
FIG. 14 is a flowchart illustrating position inspection processing according to Embodiment 1.
Figure 15:
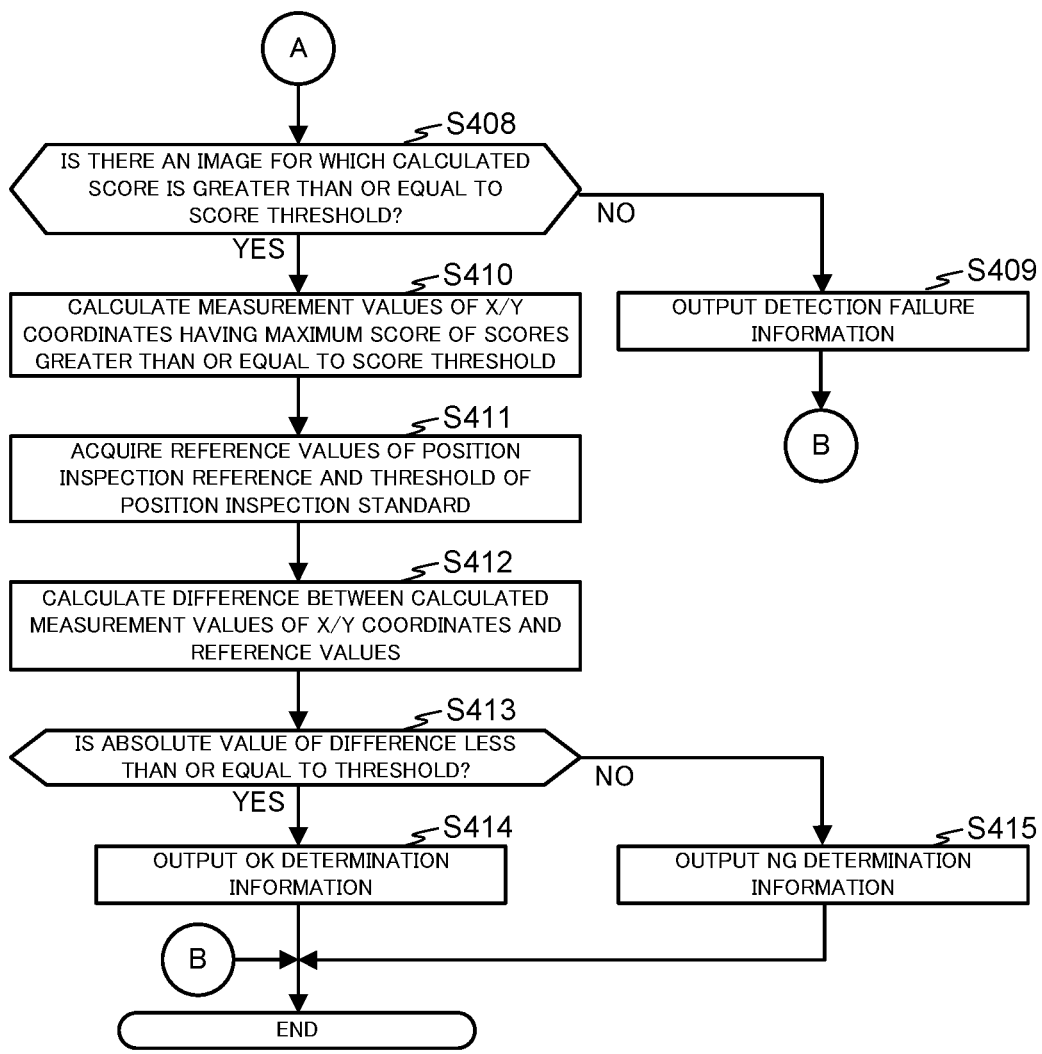
FIG. 15 is a flowchart continued from FIG. 14.

FIGS. 14 and 15 are flowcharts illustrating position inspection processing according to Embodiment 1. The operations of the inspection device 1 for inspecting the position of the metal part 401 are described using the flowcharts illustrated in FIGS. 14 and 15. When the user operates, via the input device 301, the execute inspection button 707 on the inspection screen 7, the position detector 312 starts the execution of the position inspection processing. Firstly, as illustrated in FIG. 14, the position detector 312 acquires an image to be inspected that is an image, captured by the imager 209, that includes the substrate 4 (step S401).

The position detector 312 acquires the image size from the device setting information corresponding to the product name selected on the inspection screen 7, and acquires the position detection range and the pattern size of the position inspection setting information (step S402). For example, when the "substrate A" is selected on the inspection screen 7, the position detector 312 acquires "SZA1" of the device setting information, and acquires "XSA1 to)(EA', YSA1 to YEA1" and "(WA1, LA1)" of the position inspection setting information. The position detector 312 extracts, from the image to be inspected, an image having the pattern size in the position detection range (step S403). For example, when the "substrate A" is selected on the inspection screen 7, the position detector 312 extracts, from the image to be inspected, an image that is centered on the coordinate position selected in the rectangular position detection range having the starting point (XSA1, YSA1) and the ending point (XEA1, YEA1) as diagonal vertices, and that has a range in which the width is WA1 and the height is LA1.

The position detector 312 acquires the X coordinate and the Y coordinate specified as an abnormality calculated by the abnormality detector 317, and determines whether an abnormality of the surface of the substrate 4 is detected in the extracted image (step S404). For example, when the "substrate A" is selected on the inspection screen 7, the position detector 312 determines whether the coordinate position (X2, Y2) calculated by the abnormality detector 317 is included in the extracted image. When an abnormality is detected (step S404; YES), the position detector 312 acquires the mask size from the position inspection setting information, and causes the masked image generator 309 to generate a masked image in which a mask of the mask size is applied to the extracted image (step S405). For example, in a case in which the "substrate A" is selected on inspection screen 7, when the coordinate position (X2, Y2) is included in the extracted image having the pattern size, the masked image generator 309 acquires "(MWA1, MLA1)" from the position inspection setting information. Additionally, the masked image generator 309 replaces a range centered on the coordinate position (X2, Y2) in which the width is MWA1 and the height is MLA1 with an image filled with white.

After the masked image generation or when an abnormality is not detected (step S404; NO), the position detector 312 applies, to the image, the position detection model corresponding to the product name selected on the inspection screen 7, and calculates a score (step S406). The position detector 312 determines whether all of the images having the pattern size in the position detection range have been extracted from the image to be inspected (step S407). When all of the images having the pattern size are not extracted (step S407; NO), the position detector 312 repeats the processing of steps S403 to S406 until the all of the images having the pattern size are extracted. For example, when the "substrate A" is selected on the inspection screen 7, the position detector 312 continues to extract images having the pattern size from the image to be inspected until scores SC11 to SC1N of N images are calculated.

However, as illustrated in FIG. 15, when all of the images having the pattern size have been extracted (step S407; YES), the position detector 312 acquires the score threshold of the position inspection setting information and determines whether there is an image for which the calculated score is greater than or equal to the score threshold (step S408). When there is not an image for which the calculated score is greater than or equal to the score threshold (step S408; NO), the position detector 312 outputs detection failure information (step S409) and ends the processing. However, when there is an image for which the calculated score is greater than or equal to the score threshold (step S408; YES), the position detector 312 calculates the measurement values of the X coordinate and the Y coordinate from the image having the maximum score among the scores that are greater than or equal to the score threshold (step S410). For example, when the "substrate A" is selected on the inspection screen 7, the position detector 312 calculates (X1, Y1)=(X0+XOA1, Y0+YOA1) as the measurement values of the X coordinate and the Y coordinate of when acquiring from the image having the maximum score SC1M among the scores greater than or equal to SA1.

The position standard determiner 313 acquires, from the product setting list information corresponding to the product name selected on the inspection screen 7, the reference values of the X coordinate and the Y coordinate of the position inspection reference and the standard values of the X coordinate and the Y coordinate of the position inspection standard, that is, acquires the threshold of the determination value (step S411). For example, when the "substrate A" is selected on the inspection screen 7, the position standard determiner 313 calculates "(XA1, YA1)" and "(XA2, YA2)" from the product setting list information. Additionally, the position standard determiner 313 calculates the differences between the calculated measurement values of the X coordinate and the Y coordinate and the reference values of the X coordinate and the Y coordinate (step S412). For example, when the "substrate A" is selected on the inspection screen 7, the position standard determiner 313 calculates (X1−XA1, Y1−YA1).

The position standard determiner 313 determines whether the absolute values of the differences of the X coordinate and the Y coordinate are less than or equal to a threshold (step S413). When the absolute values of the differences of the X coordinate and the Y coordinate are less than or equal to the threshold (step S413; YES), the position standard determiner 313 causes the position outputter 314 to output, as the determination result information, OK determination information (step S414), and ends the processing. However, when any of the absolute values of the differences of the X coordinate and the Y coordinate exceeds the threshold (step S413; NO), the position standard determiner 313 causes the position outputter 314 to output, as the determination result information, NG determination information (step S415), and ends the processing. For example, when |X1−XA1|≤XA2 and |Y1−YA1|≤YA2, the position standard determiner 313 determines that the standard is conformed to, and the position outputter 314 outputs OK determination information. However, when |X1−XA1|>XA2 or |Y1−YA1|>YA2, the position standard determiner 313 determines that the standard is not conformed to, and the position outputter 314 outputs NG determination information.

As described above, with the inspection device 1 according to Embodiment 1, the position detector 312 applies the image to be inspected captured by the imager 209 to the position detection model, and calculates a score for each image for the images that have the pattern size and are extracted from the position detection range of the image to be inspected. Moreover, the position detector 312 specifies the image having the maximum score among the scores that are greater than or equal to the score threshold to detect the position of the metal part 401 in the image to be inspected, and the position outputter 314 outputs the detected position of the metal part 401.

As a result, when the position detection model is generated by machine learning using the image information of an image that includes the metal part 401 that has an abnormality on the surface thereof, the inspection device 1 can detect the position of the metal part 401 while allowing for the abnormality of the surface of the metal part 401, and can inspect whether the position of the metal part 401 conforms to the position inspection standard.

Note that, although it is preferable that, as in Embodiment 1, the inspection device 1 carries out the machine learning using position inspection setting information and position training information set by the user, it is possible to carry out machine learning using only the image information, without using the position inspection setting information and the position training information. That is, the setting information storage 304 and the position training information storage 306 may be omitted.

With the inspection device 1 according to Embodiment 1, the position detection model generator 310 generates, by machine learning using the image information of an image to be learned acquired in advance, and position inspection setting information and position training information set by the user, a position detection model that expresses the relationship between the image to be learned and the position of the metal part 401.

As a result, the inspection device 1 can use the image information of the image to be learned, the position inspection setting information, and the position training information to learn the relationship between the image to be learned and the metal part 401.

Note that, in Embodiment 1, the inspection device 1 includes the position detection model generator 310 and the position detection model storage 311, but a configuration is possible in which the position detection model generator 310 and the position detection model storage 311 are not provided. For example, a configuration is possible in which an external training device includes the position detection model generator 310 and the position detection model storage 311, the position detection model generator 310 generates the position detection model by machine learning using the aforementioned information, and the generated position detection model is stored in the position detection model storage 311. In such a case, the inspection device 1 must acquire the position detection model stored in the training device.

With the inspection device 1 according to Embodiment 1, the position standard determiner 313 determines whether the position of the metal part 401 detected by the position detector 312 conforms to the predetermined position inspection standard. Specifically, the position standard determiner 313 determines whether the position of the metal part 401 conforms to the position inspection standard by determining whether the position detected at the time of position detection is a value allowable as the difference between the measurement values of the X coordinate and the Y coordinate of the substrate 4 and the designed reference values of the X coordinate and Y coordinate of the substrate 4.

As a result, the inspection device 1 can determine whether the detected position of the metal part 401 conforms to the position inspection standard.

With the inspection device 1 according to Embodiment 1, the abnormality detector 317 applies the image to be inspected captured by the imager 209 to the abnormality detection model to calculate a score for each abnormality category for the images having the pattern size extracted from the abnormality detection range of the image to be inspected. Moreover, the abnormality detector 317 identifies the category having the maximum score of the scores that are greater than or equal to the score threshold to detect the abnormality of the surface of the substrate 4 in the image to be inspected, and the abnormality outputter 319 outputs the category, the position, and the size of the detected abnormality of the surface of the substrate 4.

As a result, the inspection device 1 can detect the category, the position, and the size of an abnormality of the surface of the substrate 4, and can inspect whether the abnormality inspection standard is conformed to, even when there is an abnormality of the surface of the substrate 4.

Note that it is preferable that, as in Embodiment 1, the inspection device 1 detects the abnormality category in the abnormality inspection, but a configuration is possible in which the abnormality category is not detected.

Note that it is preferable that, as in Embodiment 1, the inspection device 1 carries out the machine learning out using abnormality inspection setting information and abnormality training information set by the user, but a configuration is possible in which machine learning is carried out using only the image information, without using the abnormality inspection setting information and the abnormality training information. That is, a configuration is possible in which the setting information storage 304 and the abnormality training information storage 307 are omitted.

Note that it is preferable that, as in Embodiment 1, the abnormality detection model generator 315 generates an abnormality detection model in order for the inspection device 1 to carry out the abnormality inspection, the abnormality detector 317 detects an abnormality of the surface of the substrate 4, and the abnormality outputter 319 outputs the category, the position, and the size of the detected abnormality of the surface of the substrate 4. However, a configuration is possible in which the abnormality detection model generator 315, the abnormality detector 317, and the abnormality outputter 319 are omitted.

With the inspection device 1 according to Embodiment 1, the abnormality detection model generator 315 generates, by machine learning using the image information of the image to be learned that is acquired in advance, and the abnormality inspection setting information and the abnormality training information set by the user, an abnormality detection model that expresses the relationship between and the image to be learned and the abnormality of the surface of the substrate 4.

As a result, the inspection device 1 can learn the relationship between the image to be learned and the abnormality of the surface of the substrate 4 using the image information of the image to be learned, the abnormality inspection setting information, and the abnormality training information.

In Embodiment 1, the inspection device 1 includes the abnormality detection model generator 315 and the abnormality detection model storage 316, but a configuration is possible in which the abnormality detection model generator 315 and the abnormality detection model storage 316 are not provided. For example, a configuration is possible in which the inspection device 1 includes an external training device that is provided with the abnormality detection model generator 315 and the abnormality detection model storage 316, the abnormality detection model generator 315 generates the abnormality detection model by machine learning using the information described above, and the generated abnormality detection model is stored in the abnormality detection model storage 316. In such a case, the inspection device 1 must acquire the abnormality detection model stored in the training device.

With the inspection device 1 according to Embodiment 1, the abnormality standard determiner 318 determines whether the predetermined abnormality inspection standard is conformed to even when there is an abnormality of the surface of the substrate 4 detected by the abnormality detector 317. Specifically, the abnormality standard determiner 318 determines whether the abnormality inspection standard is conformed to, even when there is an abnormality of the surface of the substrate 4, by determining whether the size of the abnormality detected at the time of abnormality detection is an allowable value.

As a result, the inspection device 1 can determine whether the abnormality inspection standard is conformed to, even when there is a detected abnormality the surface of the substrate 4.

With the inspection device 1 according to Embodiment 1, when an abnormality of the surface of the substrate 4 is detected in an image extracted from the image to be learned, the masked image generator 309 generates a masked image in which a mask covers the portion where the abnormality is detected. Moreover, the position detection model generator 310 updates the position detection model by machine learning further using the image information of the masked image in addition to the extracted image.

As a result, the inspection device 1 can more easily detect the position of the metal part 401 while allowing for abnormalities of the surface of the metal part 401 than in a case of an inspection device that does not update the position detection model by machine learning further using the image information of the masked image.

Note that it is preferable that, as in Embodiment 1, the mask is applied centered on the coordinate position of the detected abnormality on the basis of the mask size set in the position inspection setting information, but Embodiment 1 is not limited thereto. Configurations are possible in which the inspection device 1 applies the mask to any position other than the position of the detected abnormality, and applies the mask at a plurality of positions separated by a predetermined spacing.

Note that it is preferable that, as in Embodiment 1, the masked image generator 309 generates the masked image in order for the inspection device 1 to carry out the machine learning using the image information of the masked image, but a configuration is possible in which the masked image generator 309 is omitted. That is, a configuration is possible in which, in the inspection device 1, even when an abnormality of the surface of the substrate 4 is detected in an image extracted from the image to be learned, the masked image is not generated. In such a case, the position detection model generator 310 may update the position detection model by machine learning using the image information included only in the extracted image, without using the image information included in the masked image.

With the inspection device 1 according to Embodiment 1, when an abnormality of the surface of the substrate 4 is detected in an image extracted from the image to be inspected, the masked image generator 309 generates a masked image by applying a mask that covers the portion where the abnormality is detected. Moreover, the position detector 312 calculates the score by applying not only the extracted image, but also the masked image to the position detection model.

As a result, the inspection device 1 can more easily detect the position of the metal part 401 while allowing for abnormalities of the surface of the metal part 401 than in a case of an inspection device that does not calculate the score by applying the masked image to the position detection model as well.

Note that it is preferable that, as in Embodiment 1, the masked image generator 309 generates the masked image in order for the inspection device 1 to calculate the scored by applying the masked image to the position detection model, but a configuration is possible in which the masked image generator 309 is omitted. That is, a configuration is possible in which, in the inspection device 1, even when an abnormality of the surface of the substrate 4 is detected in an image extracted from the image to be inspected, the masked image is not generated. In such a case, the position detector 312 may calculate the score by applying only the extracted image to the position detection model, without applying the masked image to the position detection model to calculate the score.

With the inspection device 1 according to Embodiment 1, the imager 209 images the substrate 4 while the illumination light output devices 210, 211 are outputting the illumination light. Moreover, the position detection model generator 310 generates the position detection model by machine learning using the image information of the image to be learned captured while the illumination light output devices 210, 211 are outputting the illumination light. Furthermore, the measurement values of the X coordinate and the Y coordinate of the position training information are set on the basis of the position of the glossy portion 402.

As a result, the inspection device 1 can detect the position of the metal part 401 on the basis of the position of the glossy portion 402 caused by the reflected light of the illumination light output from the illumination light output devices 210, 211. That is, by carrying out machine learning about the image including the reflected light from when the illumination light is output on the metal part 401, the inspection device 1 can detect the position of the metal part 401 on the basis of the position, size, and range of the glossy portion 402 that is a feature quantity related to the shape of the metal part 401 and is obtained from the reflected light of the illumination light.

Note that, with the inspection device 1, it is preferable that, as in Embodiment 1, the imager 209 captures the substrate 4 while the illumination light is being outputted in order to detect the position of the metal part 401 on the basis of the position of the glossy portion 402, but Embodiment 1 is not limited thereto. Configurations are possible in which, in the inspection device 1, the imager 209 does not capture the substrate 4 while the illumination light is being output, and the illumination light output devices 210, 211 and the illumination light controller 303 are omitted.

With the inspection device 1 according to Embodiment 1, the training screen display 321 displays the training screen 6. The user can operate the training screen 6 via the input device 301 to acquire the image to be learned, create the position training information and the abnormality training information, and generate the position detection model and the abnormality detection model by machine learning.

As a result, the inspection device 1 can carry out, in a visualized manner, the machine learning for inspecting the position of the metal part 401 and inspecting for abnormalities of the surface of the substrate 4, and a user can more easily add information needed for the machine learning than in the case of an inspection device in which a training screen is not displayed.

Note that, in Embodiment 1, the inspection device 1 acquires the image to be learned, creates the position training information and the abnormality training information, and the like via the training screen 6, but Embodiment 1 is not limited thereto. A configuration is possible in which the inspection device 1 does not acquire the image to be learned, create the position training information and the abnormality training information, and the like via the training screen 6. For example, a configuration is possible in which the user acquires the image to be learned, creates the position training information and the abnormality training information, and the like via the input device 301.

Note that it is preferable that, as in Embodiment 1, the inspection device 1 displays the training screen 6 in order to carry out the machine learning in a visualized manner, but configurations are possible in which the training screen 6 is not displayed and the training screen display 321 is omitted. In such cases, the user must be able to execute the machine learning via the input device 301.

With the inspection device 1 according to Embodiment 1, the inspection screen display 322 displays the inspection screen 7. Additionally, the user can operate the inspection screen 7 via the input device 301 to acquire the image to be inspected to carry out the inspection of the position of the metal part 401 and the inspection of the abnormality of the surface of the substrate 4, carry out the overall determination, and the like.

As a result, the inspection device 1 can carry out these inspections and the overall determination in a visualized manner.

Note that, in Embodiment 1, the inspection device 1 carries out the overall determination via the inspection screen 7, but a configuration is possible in which the overall determination is not carried out via the inspection screen 7. That is, configurations are possible in which the inspection device 1 does not carry out the overall determination, and the overall determiner 323 the overall determination result outputter 324, and the overall determination result storage 325 are omitted.

Note that it is preferable that, as in Embodiment 1, the inspection device 1 displays the inspection screen 7 in order to carry out the inspections and the overall determination in a visualized manner, but configurations are possible in which the inspection screen 7 is not displayed and inspection screen display 322 is omitted. In such cases, the user of the inspection device 1 must execute the inspections via the input device 301.

Note that, in Embodiment 1, with the inspection device 1, the initial screen display 320 displays the initial screen 5, and the user operates the initial screen 5 via the input device 301 to display the training screen 6, display the inspection screen 7, and the like. However, a configuration is possible in which the initial screen 5 is not displayed. That is, a configuration is possible in which the initial screen display 320 is omitted.

In Embodiment 1, with the inspection device 1, when the position detection model generator 310 generates the position detection model, the reference position calculator 308 calculates the reference values of the X coordinate and the Y coordinate for the position training and, then, extracts images that are centered on the reference values of the X coordinate and the Y coordinate and that have the pattern size. However, a configuration is possible in which the inspection device 1 extracts images that are centered on the measurement values of the X coordinate and the Y coordinate and that have the pattern size, without calculating the reference values of the X coordinate and the Y coordinate. That is, a configuration is possible in which the reference position calculator 308 and the "offset" item of the position inspection setting information are omitted.

Embodiment 2

With the inspection device 1 according to Embodiment 1, the position detector 312 extracts all of the images having the pattern size that are extractable from the position detection range. However, the present disclosure is not limited thereto, and a configuration is possible in which the position detector 312 does not extract all of the images having the pattern size that are extractable from the position detection range. With the inspection device 1 according to Embodiment 2, the position detector 312 roughly extracts a plurality of types of images having a pattern sizes from the position detection range. Hereinafter, the configuration of an inspection device 1 according to Embodiment 2 is described while referencing FIGS. 16 to 18. Note that, in Embodiment 2, configurations that differ from Embodiment 1 are described, and configurations that are the same as in Embodiment 1 are redundant and, as such, are foregone.

The inspection device, the inspection method, and the program according to Embodiment 2 of the present disclosure seek to achieve shorter processing time for the position detection compared to the inspection device, the inspection method, and the program according to Embodiment 1.
Details of Functional Configuration of Computer 3

FIG. 16 is a drawing illustrating an example of position inspection setting information according to Embodiment 2. In Embodiment 2, as illustrated in FIG. 16, the position inspection setting information further includes, as an information item classified by product name, a "rough detection spacing" information item that expresses a spacing between coordinate positions of centers of images having a pattern size. Note that, in Embodiment 2, the spacing between coordinate positions is the length in the X direction or the Y direction between coordinate positions but, provided that the spacing between the coordinate positions can be specified, is not limited thereto. For example, the spacing between coordinate positions may be the number of pixel pitches in the X direction or the Y direction between pixels corresponding to coordinate positions, the pixel size of a few pixels, or the like.

For example, in the first row of FIG. 16, for the product having the "product name" of "substrate A", the position inspection setting information illustrates that, in a rectangular detection range having the starting point (XSA1, YSA1) and the ending point (XEA1, YEA1) of that image as diagonal vertices, an image that has pattern size in which the width is WA1 and the height is LA1, and for which the spacing between the coordinate positions of the centers is PA1 is extracted and set to be inspected. Specifically, the position inspection setting information illustrates that images having a pattern size in which the coordinates of the centers are (XSA1, YSA1), (XSA1+PA1, YSA1), (XSA1+2×PA1, YSA1), . . . , (XSA1, YSA1+PA1), (XSA1, YSA1+2×PA1) are extracted.

In Embodiment 2, the position detector 312 acquires the value of the "image size" item of the device setting information and, also acquires the "position detection range", the "pattern size", and the "rough detection spacing" information items of the position inspection setting information corresponding to the product name of the metal part 401 stored in the setting information storage 304. Additionally, the position detector 312 extracts, from all the images having the pattern size that are extractable from the position detection range, images that have the pattern size and that are centered on coordinate positions selected in order from the coordinate position of the starting point of the position detection range, with a spacing every rough detection spacing, and calculates each score of the extracted images. Additionally, when there is a score that is greater than or equal to the score threshold, the position detector 312 calculates the measurement values of the X coordinate and the Y coordinate of when acquiring from the image having the maximum score to roughly detect the position of the metal part 401. Hereinafter, the X coordinate and the Y coordinate having the calculated measurement values are referred to as "rough detection result coordinates."

The position detector 312 updates, on the basis of the rough detection result coordinates, the "position detection range" information item of the position inspection setting information corresponding to the product name of the metal part 401. Specifically, firstly, the position detector 312 redefines the position detection range by calculating a starting point and an ending point with the coordinates expressed by the calculated measurement values of the X coordinate and Y coordinate as a center point. Moreover, the position detector 312 replaces the "position detection range" information item using the calculated values of the X coordinate and the Y coordinate of the starting point and the calculated values of the X coordinate and the Y coordinate of the ending point.

For example, when an image to be inspected of the "substrate A" is acquired, the position detector 312 references "FA1" of the "inspection image information temporary storage region" item of the device setting information to specify the address where the image information of the image to be inspected is stored, and acquires the image information of the image to be inspected. Additionally, the position detector 312 acquires "SZA1" of the "image size"

of the device setting information and, also acquires the range XSA1 to XEA1 of the X coordinate value and the range YSA1 to YEA1 of the Y coordinate value of the "position detection range" of the position inspection setting information, and the width WA1 and the height LA1 of the "pattern size" of the position inspection setting information. Additionally, the position detector 312 acquires "PA1" of the "rough detection spacing" of the position inspection setting information.

Moreover, the position detector 312 extracts, from the image to be inspected, an image that is centered on a coordinate position selected from the rectangular position detection range having the starting point (XSA1, YSA1) and the ending point (XEA1, YEA1) as diagonal vertices, and that has a range in which the width is WA1 and the height is LA1. In this case, the position detector 312 extracts, from the image to be inspected, images that are centered on coordinates (XSA1+PA1, YSA1), (XSA1+2×PA1, YSA1), (XSA1, YSA1+PA1), (XSA1, YSA1+2×PA1) . . . and that have a range in which the width is WA1 and the height is LA1. Here, the coordinates are separated, in order, by a spacing of PA1 in the X direction or the Y direction from the starting point (XSA1, YSA1).

When there are M positions of selectable coordinates in the position detection range, the position detector 312 applies the acquired position detection model to M extracted images to calculate scores SC11 to SC1M of the M images. When, for example, the maximum score among the scores greater than or equal to SA1, which is the score threshold, is SC1M, the position detector 312 calculates, from the image having the maximum score SC1M, the measurement values (X1, Y1) of the X coordinate and the Y coordinate. Moreover, the position detector 312 calculates a new starting point (XSA21, YSA21) and a new ending point (XEA21, YEA21) for which the calculated measurement values (X1, Y1) of the X coordinate and Y coordinate are the center point, and updates the "position detection range" information item of the position inspection setting information.

Specifically, firstly, the median of the range XSA1 to XEA1 of the X coordinate value of the position detection range is set to XCA1, and the median of the range YSA1 to YEA1 of the Y coordinate value of the position detection range is set to YCA1. Error between the measurement value X1 of the X coordinate and the median XCA1 of the X coordinate of the position detection range is set as $\alpha x$ and error between the measurement value Y1 of the Y coordinate and the median YCA1 of the Y coordinate of the position detection range is set as $\alpha y$. In this case, the position detector 312 calculates the errors $\alpha x$ and $\alpha y$ of the X coordinate and the Y coordinate by calculating $\alpha x = X1 - XCA1$ and $\alpha y = Y1 - YCA1$.

Additionally, the position detector 312 calculates XSA21=XSA1-$\alpha x$, XEA21=XEA1-$\alpha x$, YSA21=YSA1-$\alpha y$, and YEA21=YEA1-$\alpha y$ to calculate the range XSA21 to XEA21 of the new X coordinate value and the range YSA21 to YEA21 of the new Y coordinate value of the position detection range. Moreover, the position detector 312 updates the "position detection range" information item of the position inspection setting information on the basis of the calculated range XSA21 to XEA21 of the new X coordinate value and the calculated range YSA21 to YEA21 of the new Y coordinate value.

Figure 17:
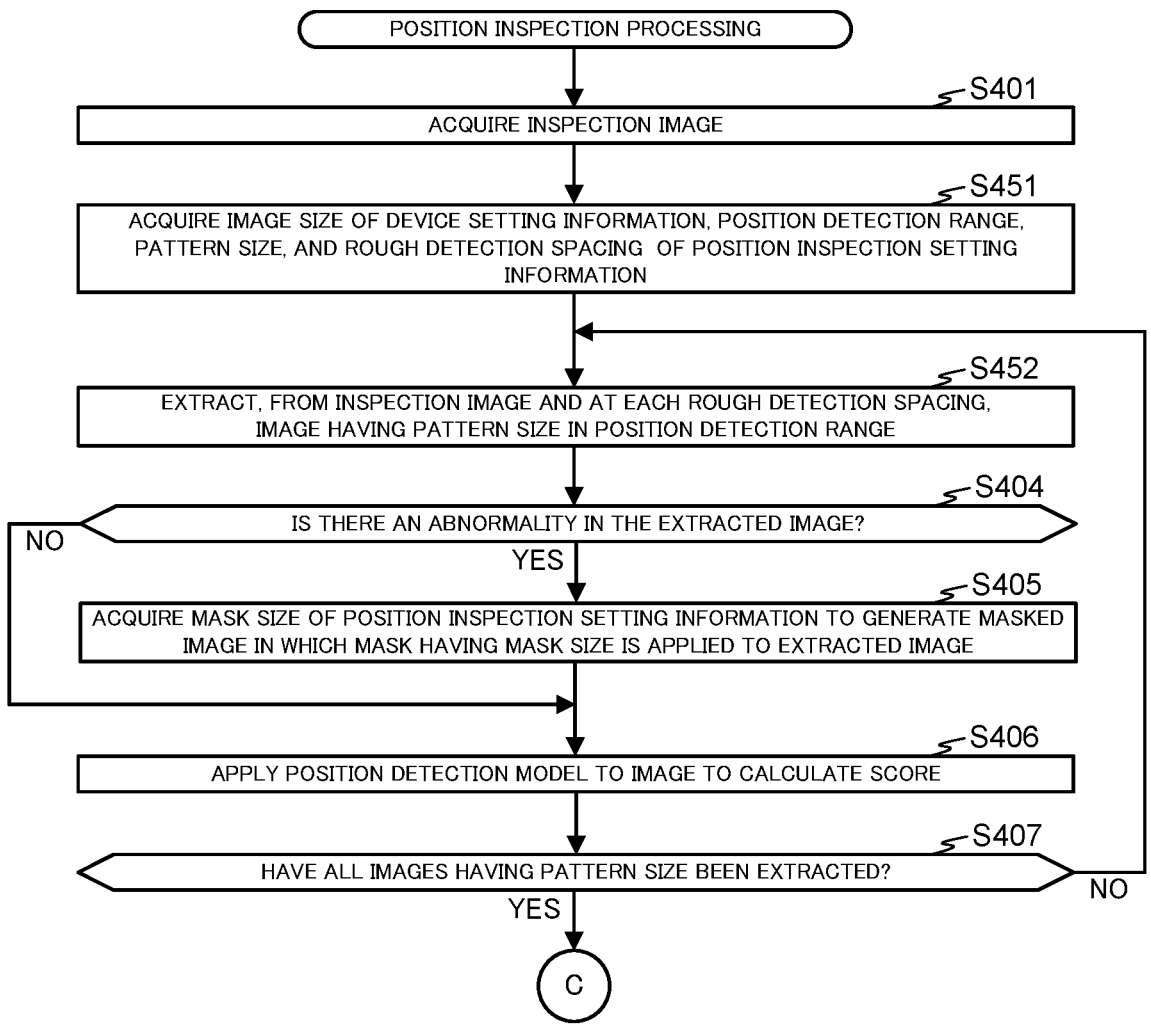
FIG. 17 is a flowchart illustrating position inspection processing according to Embodiment 2.
Figure 18:
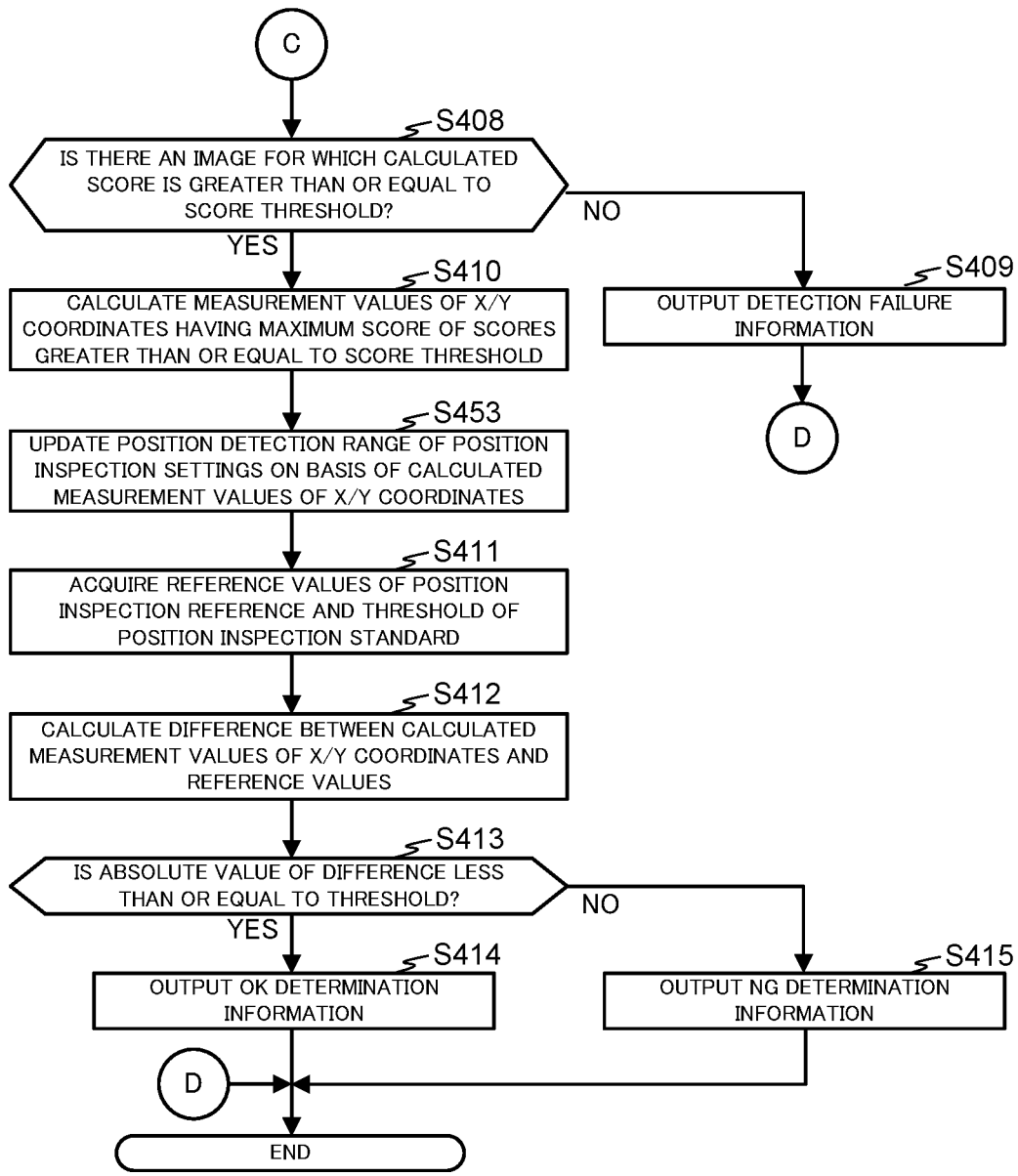
FIG. 18 is a flowchart continued from FIG. 17.

FIGS. 17 and 18 are flowcharts illustrating position inspection processing according to Embodiment 2. The operations of the inspection device 1 according to Embodiment 2 for inspecting the position of the metal part 401 are described using the flowcharts illustrated in FIGS. 17 and 18. Firstly, as illustrated in FIG. 17, the position detector 312 executes the processing of step S401 and, then, acquires the image size from the device setting information corresponding to the product name selected on the inspection screen 7, and acquires the position detection range, the pattern size, and the rough detection spacing of the position inspection setting information (step S451). For example, when the "substrate A" is selected on the inspection screen 7, the position detector 312 acquires "SZA1" of the device setting information, and acquires "XSA1 to XEA1, YSA1 to YEA1", "(WA1, LA1)", and "PA1" of the position inspection setting information.

The position detector 312 extracts, from the image to be inspected, an image having the pattern size every rough detection spacing in the position detection range (step S452). For example, when the "substrate A" is selected on the inspection screen 7, the position detector 312 extracts, from the image to be inspected, images that are centered on coordinates (XSA1+PA1, YSA1), (XSA1+2×PA1, YSA1), (XSA1, YSA1+PA1), (XSA1, YSA1+2×PA1) . . . and that have a range in which the width is WA1 and the height is LA1. Here, the coordinates are separated, in order, by a spacing of PA1 in the X direction or the Y direction from the starting point (XSA1, YSA1). Additionally, the position detector 312 executes the processing of steps S404 to S407. When all of the images having the pattern size are not extracted (step S407; NO), the position detector 312 repeats the processing of steps S452, and S404 to S406 until all of the images having the pattern size are extracted.

However, as illustrated in FIG. 18, when all of the images having the pattern size for each rough detection spacing are extracted (step S407; YES), the position detector 312 executes the processing of steps S408 to 410, and updates the position detection range of the position inspection setting information on the basis of the calculated measurement values of the X coordinate and the Y coordinate (step S453). For example, when the "substrate A" is selected on the inspection screen 7, the position detector 312 calculates a new starting point (XSA21, YSA21) and a new ending point (XEA21, YEA21) for which the coordinates (X1, Y1) expressed by the calculated measurement values of the X coordinate and Y coordinate are the center point, and updates the "position detection range" information item of the position inspection setting information. Additionally, the position standard determiner 313 executes the processing of steps S411 to S415, and ends the processing.

As described above, with the inspection device 1 according to Embodiment 2, the position detector 312 roughly extracts a plurality of types of images having a of pattern size by extracting an image that has the pattern size from the position detection range every rough detection spacing. Moreover, the position detector 312 calculates each score by applying the position detection model to the extracted images having the pattern size, and specifies the image having the maximum score among the scores that are greater than or equal to the score threshold to detect the position of the metal part 401 in the image to be inspected, and the position outputter 314 outputs the detected position of the metal part 401.

As a result, the inspection device 1 can detect the position of the metal part 401 without extracting all of the images having the pattern size that are acquirable from the position detection range, can inspect whether the position of the metal part 401 conforms to the position inspection standard, and can reduce the load and time of the work of carrying out the inspections.

In particular, with the inspection device 1 according to Embodiment 2, the position detector 312 updates the position detection range of the position inspection setting information on the basis of the calculated rough detection result coordinates. Here, the calculated rough detection result coordinates can be expected to be near the center of the metal part 401.

As a result, the inspection device 1 can more precisely detect the position of the metal part 401 in the image to be inspected compared to an inspection device in which the position detection range is not updated on the basis of the rough detection result coordinates. As such, the inspection device 1 can narrow the position detection range on the basis of the amount of error expected between the rough detection result coordinates and the actual position of the metal part 401, and can shorten the time required for the operations of the position detector 312. For example, when the rough detection spacing PA1 is the length of five pixels, the position detector 312 can sufficiently detect the position of the metal part 401 even if the position detection range is about ±15 pixels in the X and Y directions, respectively. As a result, the inspection device 1 can further reduce the load and the time of the work of carrying out the inspections.

Note that the inspection device 1 according to Embodiment 2 also demonstrates the same effects as the inspection device 1 according to Embodiment 1.

Note that it is preferable that, as in Embodiment 2, the position detector 312 updates the position detection range of the position inspection setting information on the basis of the calculated rough detection result coordinates in order to enable detection of the position of the metal part 401 even when the position detection range is narrow. However, Embodiment 2 is not limited thereto. For example, a configuration is possible in which the position detector 312 updates the position detection range when the error between the calculated rough detection result coordinates and the set coordinates of the center point of the position detection range exceeds a predetermined threshold. Additionally, for example, a configuration is possible in which the position detector 312 does not update the position detection range even when the rough detection result coordinates is calculated.

Embodiment 3

With the inspection device 1 according to Embodiments 1 and 2, the position detector 312 uses the position detection model to detect the position of the metal part 401 in the image to be inspected. However, the present disclosure is not limited thereto, and a configuration is possible in which the position detector 312 uses another training model in addition to the position detection model to detect the position of the metal part 401 in the image to be inspected. With the inspection device 1 according to Embodiment 3, the position detector 312 uses the position detection model and a hereinafter described rough detection model to detect the position of the metal part 401 in the image to be inspected. Hereinafter, the configuration of an inspection device 1 according to Embodiment 3 is described while referencing FIGS. 19 to 22. Note that, in Embodiment 3, configurations that differ from Embodiments 1 and 2 are described and configurations that are the same as in Embodiments 1 and 2 are redundant and, as such, are foregone.

The inspection device, the inspection method, and the program according to Embodiment 3 of the present disclosure seek to achieve shorter processing time for the position detection compared to the inspection device, the inspection method, and the program according to Embodiment 1.

Computer 3

Figure 19:
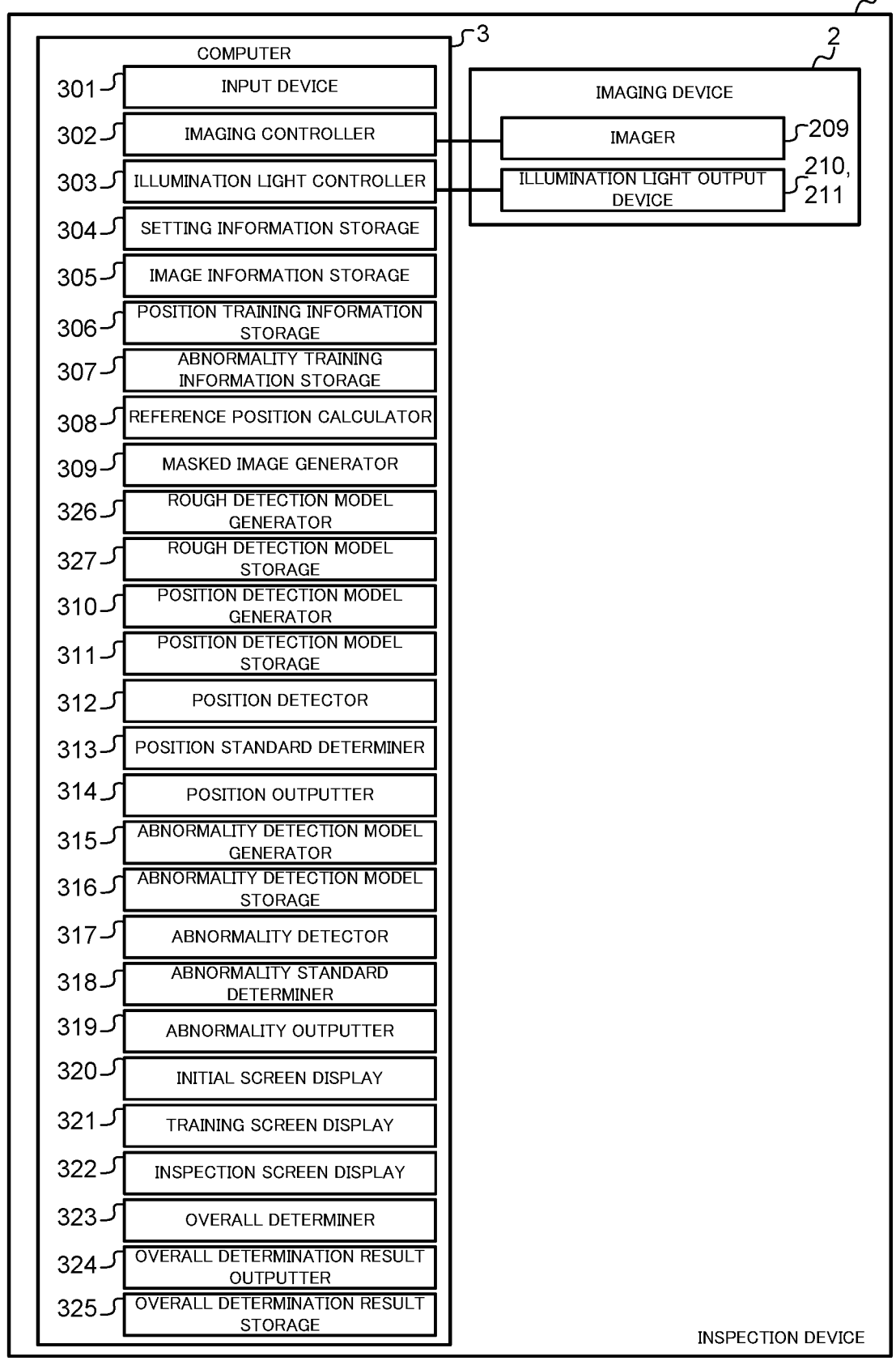
FIG. 19 is a drawing illustrating the functional configuration of an inspection device according to Embodiment 3.

FIG. 19 is a drawing illustrating the functional configuration of the inspection device according to Embodiment 3. As illustrated in FIG. 19, the computer 3 further includes a rough detection model generator 326 as an example of a position rough detection model generator that generates, by machine learning, a rough detection model that is an example of a position rough detection model expressing the relationship between an image and the position of the metal part 401. The computer 3 also further includes a rough detection model storage 327 that stores the generated rough detection model. Returning to FIG. 4, in Embodiment 3, in accordance with the control program 59, the controller 51 functions as the rough detection model generator 326 of the computer 3. Additionally, in Embodiment 3, the external storage 53 functions as the rough detection model storage 327.

The computer 3 realizes the functions of the rough detection model generator 326 and the rough detection model storage 327 by the controller 51 using the main storage 52, the external storage 53, the operator 54, the display 55, and the transmitter/receiver 56 as resources. For example, the computer 3 executes a rough detection model generation step carried out by the rough detection model generator 326, and a rough detection model storage step carried out by the rough detection model storage 327.

Details of Functional Configuration of Computer 3

FIG. 20 is a drawing illustrating an example of position inspection setting information according to Embodiment 3. In Embodiment 3, as illustrated in FIG. 20, the position inspection setting information further includes, as an information item classified by product name and as a range for roughly detecting the position of the metal part 401, a "rough detection range" item expressing a range of the X coordinate value from the starting point to the ending point and a range of the Y coordinate value from the starting point to the ending point. Additionally, the "model format" information item expresses the format of the rough detection model in addition to the format of the position detection model.

For example, in the first row of FIG. 20, for the product having the "product name" of "substrate A", the position inspection setting information illustrates that, in a rectangular rough detection range having the starting point (XSA3, YSA3) and the ending point (XSA3, YEA3) of that image as diagonal vertices, an image that has the width WA1 and the height LA1 is extracted. Additionally, for the product having the "product name" of "substrate A", the position inspection setting information illustrates that, as the training models used in the inspection, the position detection model is "MA1" and the rough detection model is "MA3."

As described above, the rough detection model generator 326 generates, by machine learning, the rough detection model that expresses the relationship between the image and the position of the metal part 401. In this case, the rough detection model is a training model that is used when roughly detecting the position of the metal part 401 before detecting the position of the metal part 401 using the position detection model. The rough detection model generator 326 acquires the "model format" information item of the position inspection setting information corresponding to the product name of the metal part 401 stored in the setting information storage 304, that is, acquires the format of the training model of the machine learning to generate a template of the rough detection model. Note that the format of the training model of the machine learning that the rough detection model generator 326 can generate can be selected from among "SSD", "YOLOv3", and "M2Det", which are typical object recognition models used in applications of detecting categories and positions of objects from images. However, the format of the training model is not limited thereto, and other object recognition models for object recognition applications may be selected. In this case, the set format of the training model of the machine learning method must be selectable.

The rough detection model generator 326 references the "training image information storage region" information item of the device setting information stored in the setting information storage 304 to acquire the image information of the image to be learned stored in the image information storage 305. Additionally, the rough detection model generator 326 acquires the "pattern size" information item of the position inspection setting information corresponding to the product name of the metal part 401, that is, acquires the lengths of the width and the height of the image to be extracted from the image to be learned. Moreover, the rough detection model generator 326 extracts, from the image to be learned, an image that has the pattern size of the acquired width and height, and that is centered on the reference values of the X coordinate and the Y coordinate calculated by the reference position calculator 308. Additionally, the rough detection model generator 326 updates the rough detection model by carrying out machine learning using the extracted image, and the X coordinate and Y coordinate values of the starting point and the X coordinate and Y coordinate values of the ending point of the extraction range of that image. Note that the rough detection model generator 326 calculates, on the basis of the extracted image and the reference values of the X coordinate and the Y coordinate, the X coordinate and the Y coordinate values of the starting point and the X coordinate and the Y coordinate values of the ending point of the extraction range of that image. Additionally, when the masked image generator 309 generates a masked image for the extracted image, the rough detection model generator 326 updates the rough detection model by carrying out machine learning using the masked image as well.

For example, when an image to be learned of the "substrate A" is acquired, the rough detection model generator 326 acquires "MA3" of the "model format" item of the position inspection setting information. Here, when, for example, "MA3" is "M2Det", the rough detection model generator 326 generates a template of a position detection model having "M2Det" as the format of the training model. Additionally, the rough detection model generator 326 references "FA2" of the "training image information storage region" of the device setting information to specify the address where the image information of the image to be learned is stored, and acquires the image information of the image to be learned. Moreover, the rough detection model generator 326 acquires the width WA1 and the height LA1 of the "pattern size" of the position inspection setting information to extract, from the image to be learned, an image that is centered on the coordinate position (261+XOA1 and 115+YOA1) and that has a range in which the width is WA1 and the height is LA1. Additionally, the rough detection model generator 326 updates the rough detection model by carrying out machine learning using the extracted image, and the X coordinate and Y coordinate values of the starting point and the X coordinate and Y coordinate values of the ending point of the extraction range of that image. Note that, when a masked image of the extracted image is generated, the rough detection model generator 326 updates the rough detection model by carrying out machine learning using the masked image and the X coordinate and Y coordinate values of the starting point of the extraction range.

Returning to FIG. 9, in Embodiment 3, when the user operates, via the input device 301, the train button 614 while there is a display in the position training information display field 607, the training screen display 321 causes the position detection model generator 310 to generate a position detection model and the rough detection model generator 326 to generate a rough detection model. Note that, when the user operates, via the input device 301, the train button 614 during the generation of the position detection model, the rough detection model, and the abnormality detection model, the training screen display 321 stops the generating by the position detection model generator 310, the rough detection model generator 326, and the abnormality detection model generator 315.

Returning to FIG. 20, in Embodiment 3, the position detector 312 acquires the value of the "image size" item of the device setting information, and also acquires the "position detection range", the "pattern size", and the "rough detection range" information items of the position inspection setting information corresponding to the product name of the metal part 401 stored in the setting information storage 304. That is, the position detector 312 acquires not only the X coordinate and Y coordinate values that are the starting point of the position detection range and the X coordinate and Y coordinate values that are the ending point of the position detection range in the image to be inspected, and the lengths of the width and the height of the image to be extracted, but also acquires the X coordinate and Y coordinate values that are the starting point of the rough detection range and the X coordinate and Y coordinate values that are the ending point of the rough detection range.

Additionally, the position detector 312 acquires the rough detection model stored in the rough detection model storage 327, and applies the rough detection model to the image extracted, from the image to be inspected, on the basis of the rough detection range to calculate, as a roughly detected result, the coordinate values of the position of the metal part 401 in the extracted image. Hereinafter, the X coordinate and the Y coordinate having the calculated values are referred to as "rough detection result coordinates."

The position detector 312 updates, on the basis of the rough detection result coordinates, the "position detection range" information item of the position inspection setting information corresponding to the product name of the metal part 401. Specifically, firstly, the position detector 312 calculates the starting point and the ending point of the X coordinate value that has the calculated X coordinate value as the center point, and calculates the minimum value and the maximum value of the Y coordinate value that has the calculated Y coordinate value as the median, thereby redefining the position detection range. Moreover, the position detector 312 replaces the "position detection range" information item using the X coordinate and Y coordinate values having the calculated minimum values and the X coordinate and Y coordinate value having the maximum values.

Additionally, the position detector 312 extracts all of the images having the pattern size that are extractable from the updated position detection range, and calculates each score of the extracted images. When there are scores that are greater than or equal to the score threshold, the position detector 312 calculates the measurement values of the X coordinate and the Y coordinate acquired from the image having the maximum score to detect the position of the metal part 401.

For example, when an image to be inspected of the "substrate A" is acquired, the position detector 312 references "FA1" of the "inspection image information temporary storage region" item of the device setting information to specify the address where the image information of the image to be inspected is stored, and acquires the image information of the image to be inspected. Additionally, the position detector 312 acquires "SZA1" of the "image size" of the device setting information and, also acquires the range XSA1 to XEA1 of the X coordinate value and the range YSA1 to YEA1 of the Y coordinate value of the "position detection range" of the position inspection setting information, and the width WA1 and the height LA1 of the "pattern size" of the position inspection setting information. Moreover, the position detector 312 acquires the range XSA3 to XEA3 of the X coordinate value and the range YSA3 to YEA3 of the Y coordinate value of the "rough detection range" of the position inspection setting information.

The position detector 312 extracts, from the image to be inspected, an image of the rectangular rough detection range having the starting point (XSA3, YSA3) and the ending point (XEA3, YEA3) as diagonal vertices. Additionally, the position detector 312 applies the acquired rough detection model to the extracted image to calculate the rough detection result coordinates. When the calculated rough detection result coordinates are (X3, X3), the position detector 312 calculates a new starting point (XSA31, YSA31) and a new ending point (XEA31, YEA31) for which the rough detection result coordinates (X3, X3) are the center point. Additionally, the position detector 312 updates the acquired range XSA1 to XEA1 of the X coordinate value and the acquired range YSA1 to YEA1 of the Y coordinate value to XSA31 to XEA31 and YSA31 to YEA31.

Specifically, firstly, error between the value X3 of the X coordinate of the rough detection result coordinates and the median XCA1 of the X coordinate is set as βx and error between the value Y3 of the Y coordinate of the rough detection result coordinates and the median YCA1 of the Y coordinate of the position detection range is set as βy. In this case, the position detector 312 calculates the errors βx and βy of the X coordinate and the Y coordinate by calculating βx=X3−XCA1 and βy=Y3−YCA1. Moreover, the position detector 312 updates the acquired position detection range by calculating XSA31=XSA1-βx, YSA31=YSA1-βy, XEA31=XEA1-βx, and YEA31=YEA1-βy.

The position detector 312 extracts, from the image to be inspected, an image that is centered on a coordinate position selected in the rectangular position detection range having an updated new starting point (XSA31, YSA31) and an updated new ending point (XEA31, YEA31) as diagonal vertices, and that has a range in which the width is WA1 and the height is LA1. When there are N positions of selectable coordinates in the position detection range, the position detector 312 applies the acquired position detection model to N extracted images to calculate scores SC11 to SC1N of the N images. When, for example, the maximum score among the scores greater than or equal to SA1, which is the score threshold, is SC1M, the position detector 312 calculates, from the image having the maximum score SC1M, the measurement values (X1, Y1) of the X coordinate and the Y coordinate.

Figure 21:
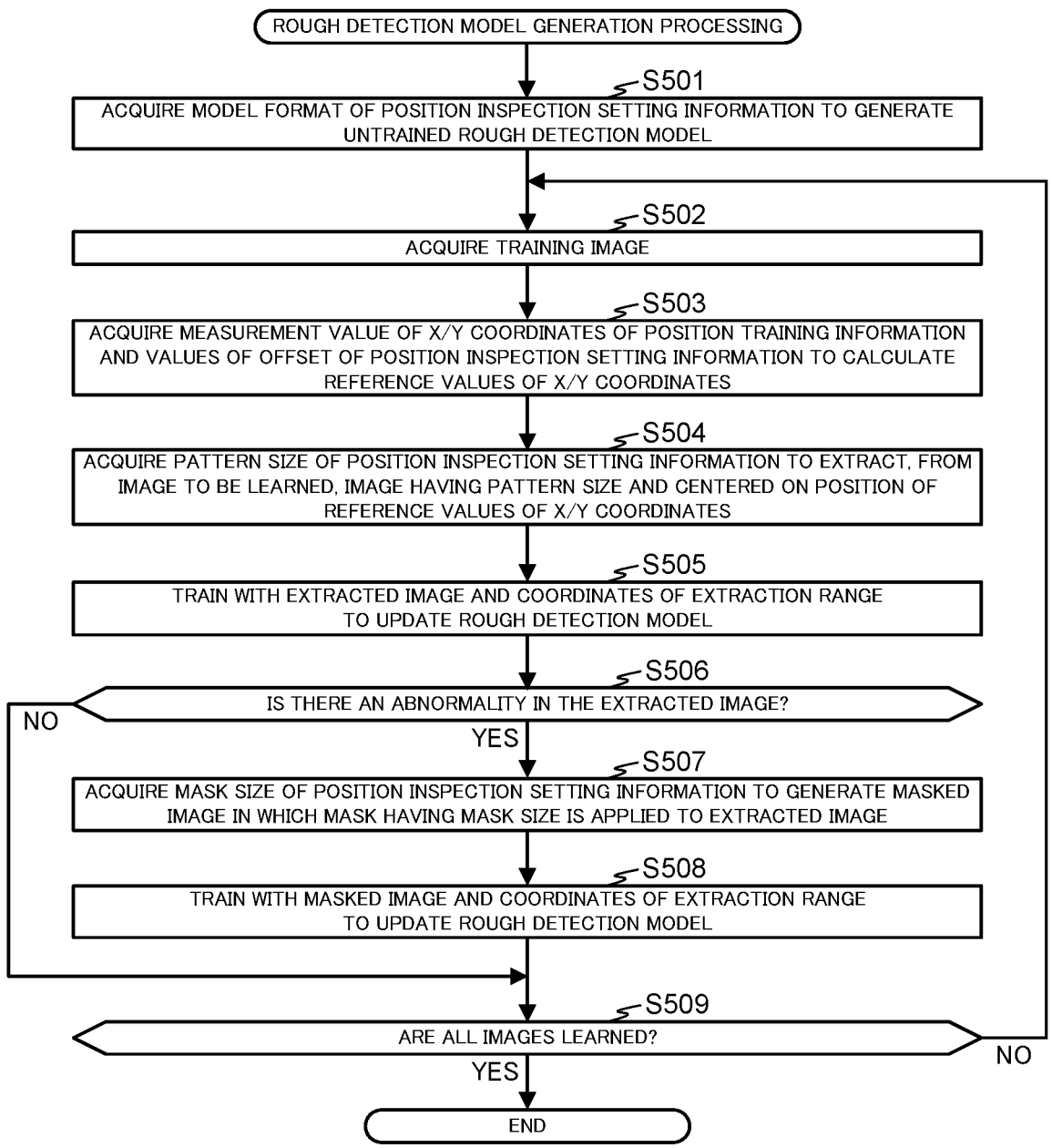
FIG. 21 is a flowchart illustrating position detection model generation processing according to Embodiment 3.

FIG. 21 is a flowchart illustrating rough detection model generation processing according to Embodiment 3. The operations of the inspection device 1 according to Embodiment 3 for generating the rough detection model are described using the flowchart illustrated in FIG. 21. When the user operates, via the input device 301, the train button 614 on the training screen 6, the rough detection model generator 326 starts the execution of the rough detection model generation processing. Firstly, as illustrated in FIG. 21, the rough detection model generator 326 acquires the model format from the position inspection setting information corresponding to the product name selected on the training screen 6 to generate an untrained rough detection model (step S501). For example, when the "substrate A" is selected on the training screen 6, the rough detection model generator 326 acquires "MA3" from the position inspection setting information and generates a rough detection model having "MA3" as the model format.

The rough detection model generator 326 acquires the image to be learned from the image information corresponding to the product name selected on the training screen 6 (step S502). Additionally, the rough detection model generator 326 acquires the measurement values of the X coordinate and the Y coordinate of the position training information and the offset values of the X coordinate and the Y coordinate of the position inspection setting information corresponding to the product name selected on the training screen 6, and causes the reference position calculator 308 to calculate the reference values of the X coordinate and the Y coordinate (step S503). For example, when the "substrate A" is selected on the training screen 6, the reference position calculator 308 acquires "261" and "115" from the position training information and acquires "(XOA1, YOA1)" from the position inspection setting information, and calculates (261+XOA1, 115+YOA1).

The rough detection model generator 326 acquires the pattern size of the position inspection setting information corresponding to the product name selected on the training screen 6, and extracts, from the image to be learned, an image that is centered on the reference values of the X coordinate and the Y coordinate and that has the pattern size (step S504). For example, when the "substrate A" is selected on the training screen 6, the rough detection model generator 326 acquires "(WA1, LA1)" of the position inspection setting information, and extracts, from the image to be learned, an image that is centered on the coordinate position (261+XOA1, 115+YOA1) and that has a range in which the width is WA1 and the height is LA1. Additionally, the rough detection model generator 326 carries out machine learning using the extracted image, and the X coordinate and Y coordinate values of the starting point and the X coordinate and Y coordinate values of the ending point of the extraction range of that image, and updates the rough detection model (step S505).

The rough detection model generator 326 acquires the X coordinate and Y coordinate values of the abnormality training information stored in the abnormality training information storage 307, and determines whether an abnormality of the surface of the substrate 4 is detected in the extracted image (step S506). For example, when the "substrate A" is selected on the training screen 6, the rough detection model generator 326 acquires "110" and "170" of the abnormality training information, and determines whether the coordinate position (110, 170) is included in the extracted image having the pattern size.

When an abnormality is detected (step S506; YES), the rough detection model generator 326 acquires the mask size from the position inspection setting information corresponding to the product name selected on the training screen 6, and causes the masked image generator 309 to generate a masked image in which a mask of the masked size is applied to the extracted image (step S507). For example, in a case in which the "substrate A" is selected on the training screen 6, when the coordinate position (110, 170) is included in the extracted image having the pattern size, the masked image generator 309 acquires "(MWA1, MLA1)" from the position inspection setting information. The masked image generator 309 replaces a range centered on the coordinate position (110, 170) in which the width is MWA1 and the height is MLA1 with an image filled with white.

Additionally, the rough detection model generator 326 carries out machine learning using the generated masked image, and the X coordinate and Y coordinate values of the starting point and the X coordinate and Y coordinate values of the ending point of the extraction range of that image, and updates the rough detection model (step S508). Moreover, after the rough detection model updating or when an abnormality is not detected (step S506; NO), the rough detection model generator 326 determines whether the machine learning has been carried out using all of the images to be learned (step S509). When the machine learning has not been carried out using all of the images to be learned (step S509; NO), the rough detection model generator 326 repeats the processing of steps S502 to S508 until the machine learning has been carried out using all of the images to be learned. However, when the machine learning has been carried out using all of the images to be learned (step S509; YES), the rough detection model generator 326 ends the processing.

Figure 22:
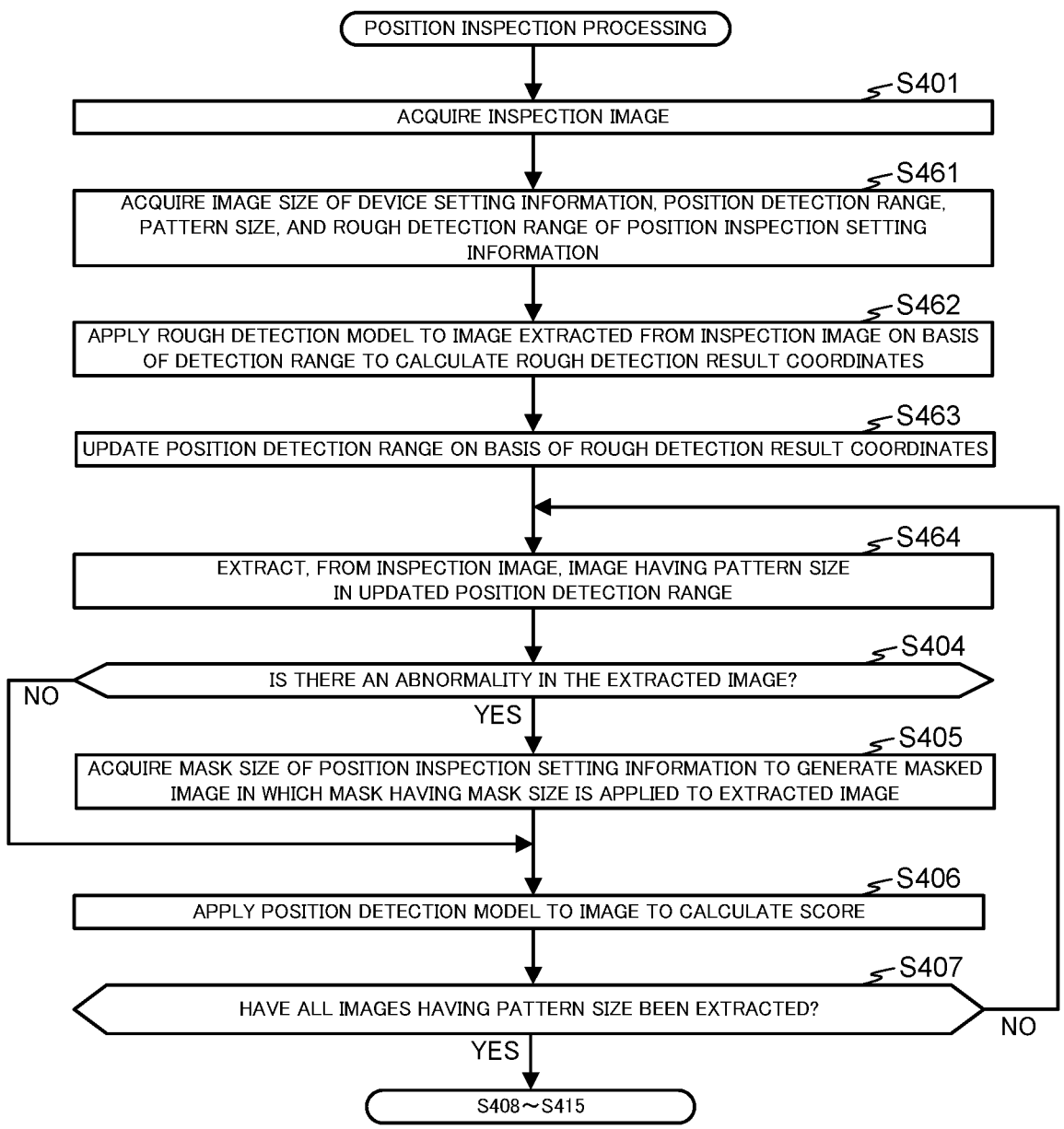
FIG. 22 is a flowchart illustrating position inspection processing according to Embodiment 3.

FIG. 22 is a flowchart illustrating position inspection processing according to Embodiment 3. The operations of the inspection device 1 according to Embodiment 3 for inspecting the position of the metal part 401 are described using the flowchart illustrated in FIG. 22. Firstly, as illustrated in FIG. 22, the position detector 312 executes the processing of step S401 and, then, acquires the image size from the device setting information corresponding to the product name selected on the inspection screen 7, and acquires the position detection range, the pattern size, and the rough detection range of the position inspection setting information (step S461). For example, when the "substrate A" is selected on the inspection screen 7, the position detector 312 acquires "SZA1" of the device setting information, and acquires "XSA1 to XEA1, YSA1 to YEA1", "(WA1, LA1)", and "XSA3 to XEA3, YSA3 to YEA3" of the position inspection setting information.

The position detector 312 applies the rough detection model to the image extracted from the image to be inspected on the basis of the rough detection range to calculate the rough detection result coordinates (step S462), and updates the position detection range of the position inspection setting information on the basis of the calculated rough detection result coordinates (step S463). For example, when the "substrate A" is selected on the inspection screen 7, the position detector 312 extracts, from the image to be inspected, an image of a rectangular rough detection range having the starting point (XSA3, YSA3) and the ending point (XEA3, YEA3) as diagonal vertices. Additionally, the position detector 312 applies the rough detection model corresponding to the product name selected on the inspection screen 7 to the extracted image to calculate the rough detection result coordinates (X3, Y3). Moreover, the position detector 312 calculates a new starting point (XSA31, YSA31) and a new ending point (XEA31, YEA31) for which the rough detection result coordinates (X3, Y3) are the center point.

The position detector 312 extracts, from the image to be inspected, an image having the pattern size in the updated position detection range (step S464). For example, when the "substrate A" is selected on the inspection screen 7, the position detector 312 extracts, from the image to be inspected, an image that is centered on a coordinate position selected in the rectangular position detection range having the new starting point (XSA31, YSA31) and the new ending point (XEA31, YEA31) as diagonal vertices, and that has a range in which the width is WA1 and the height is LA1.

Additionally, the position detector 312 executes the processing of steps S404 to S407. When all of the images having the pattern size have not been extracted (step S407; NO), the position detector 312 repeats the processing of steps S464, and S404 to S406 until all of the images having the pattern size have been extracted. For example, when the "substrate A" is selected on the inspection screen 7, the position detector 312 continues to extract images having the pattern size from the image to be inspected until scores SC11 to SC1N of N images are calculated. However, as illustrated in FIG. 15, when all of the images having the pattern size have been extracted (step S407; YES), the position detector 312 executes the processing of steps S408 to S415, and ends the processing.

As described above, with the inspection device 1 according to Embodiment 3, the position detector 312 applies the rough detection model to the image, extracted from the image to be inspected on the basis of the rough detection range, to calculate the rough detection result coordinates. Additionally, the position detector 312 extracts the plurality of types of images having the pattern size by extracting images having the pattern size from the new position detection range based on the calculated rough detection result coordinates. Moreover, the position detector 312 calculates each score by applying the position detection model to the extracted images having the pattern size, and specifies the image having the maximum score among the scores that are greater than or equal to the score threshold to detect the position of the metal part 401 in the image to be inspected, and the position outputter 314 outputs the detected position of the metal part 401.

As a result, the inspection device 1 can detect the position of the metal part 401 in the image to be inspected, using the rough detection model in addition to the position detection model.

In particular, with the inspection device 1 according to Embodiment 3, the position detector 312 updates the position detection range, acquired from the position inspection setting information, on the basis of the calculated rough detection result coordinates. Note that the calculated rough detection result coordinates can be expected to be near the center of the metal part 401.

As a result, the inspection device 1 can more precisely detect the position of the metal part 401 in the image to be inspected compared to an inspection device in which the position detection range is not updated on the basis of the rough detection result coordinates. As such, the inspection device 1 can narrow the position detection range on the basis of the amount of error expected between the rough detection result coordinates and the actual position of the metal part 401, and can shorten the time required for the operations of the position detector 312. For example, when the error of the rough detection result coordinates is the length of about twenty pixels, the position detector 312 can sufficiently detect the position of the metal part 401 even if the position detection range is about ±40 pixels in the X and Y directions, respectively. As a result, the inspection device 1 can further reduce the load and the time of the work of carrying out the inspections.

Note that the inspection device 1 according to Embodiment 3 also demonstrates the same effects as the inspection device 1 according to Embodiment 1.

In Embodiment 3, the inspection device 1 includes the rough detection model generator 326 and the rough detection model storage 327, but a configuration is possible in which the rough detection model generator 326 and the rough detection model storage 327 are not provided. For example, a configuration is possible in which an external training device includes the rough detection model generator 326 and the rough detection model storage 327, the rough detection model generator 326 generates the rough detection model by machine learning using the information described above, and the generated rough detection model is stored in the rough detection model storage 327. In such a case, the inspection device 1 must acquire the rough detection model stored in the training device.

As described above, in Embodiment 3, as in Embodiment 2, the position detector 312 extracts a plurality of image having a pattern size by extracting, from in the position detection range, images having the pattern size every rough detection spacing. However, Embodiment 3 is not limited thereto. For example, a configuration is possible in which the configurations of Embodiments 2 and 3 are combined, and the position detector 312 updates to a new position detection range on the basis of the rough detection result coordinates calculated using the rough detection model, and roughly extracts the plurality of types of images having the pattern sizes by extracting, from the newly updated position detection range, images having the pattern size every rough detection spacing.

Embodiment 4

With the inspection device 1 according to Embodiments 1 to 3, the position detector 312 detects, as the position of the metal part 401, a position corresponding to the calculated measurement values of the X coordinate and the Y coordinate in the image to be inspected, that is, detects a position corresponding to the coordinates of the center of the image of the pattern size having the maximum score. However, the present disclosure is not limited thereto, and a configuration is possible in which the position detector 312 does not detect, as the position of the metal part 401, the position corresponding to the coordinates of the center of the pattern size having the maximum score. With the inspection device 1 according to Embodiment 4, the position detector 312 detects, as the position of the metal part 401, a position specified on the basis of the calculated measurement values of the X coordinate and the Y coordinate in the image to be inspected. Hereinafter, the configuration of the inspection device 1 according to Embodiment 4 is described while referencing FIGS. 23 to 25. Note that, in Embodiment 4, configurations that differ from Embodiments 1 and 3 are described, and configurations that are the same as in Embodiments 1 and 3 are redundant and, as such, are foregone.

The inspection device, the inspection method, and the program according to Embodiment 4 of the present disclosure seek to improve the accuracy of position detection compared to the inspection device, the inspection method, and the program according to Embodiment 1.

Details of Functional Configuration of Computer 3

FIG. 23 is a drawing illustrating an example of position inspection setting information according to Embodiment 4. In Embodiment 4, as illustrated in FIG. 23, the position inspection setting information further includes, as an information item classified by product name, a "peak detection range" information item that expresses a maximum value of a brightness value of a pixel, and lengths of the height and the width as a so-called detection range of a peak.

For example, in the first row of FIG. 23, for the product having the "product name" of "substrate A", the position inspection setting information illustrates that an image having the width WA4 and the height LA4 as the peak detection range is extracted to detect the position of the metal part 401.

In Embodiment 4, the position detector 312 calculates the measurement values of the X coordinate and the Y coordinate from the image of the pattern size and that has the maximum score and, then, acquires the width and the height of the "peak detection range" of the position inspection setting information corresponding to the product name of the metal part 401. Additionally, the position detector 312 extracts, from the image to be inspected, an image that is centered on the calculated measurement values of the X coordinate and the Y coordinate and that has the acquired width and the height.

Figure 24:
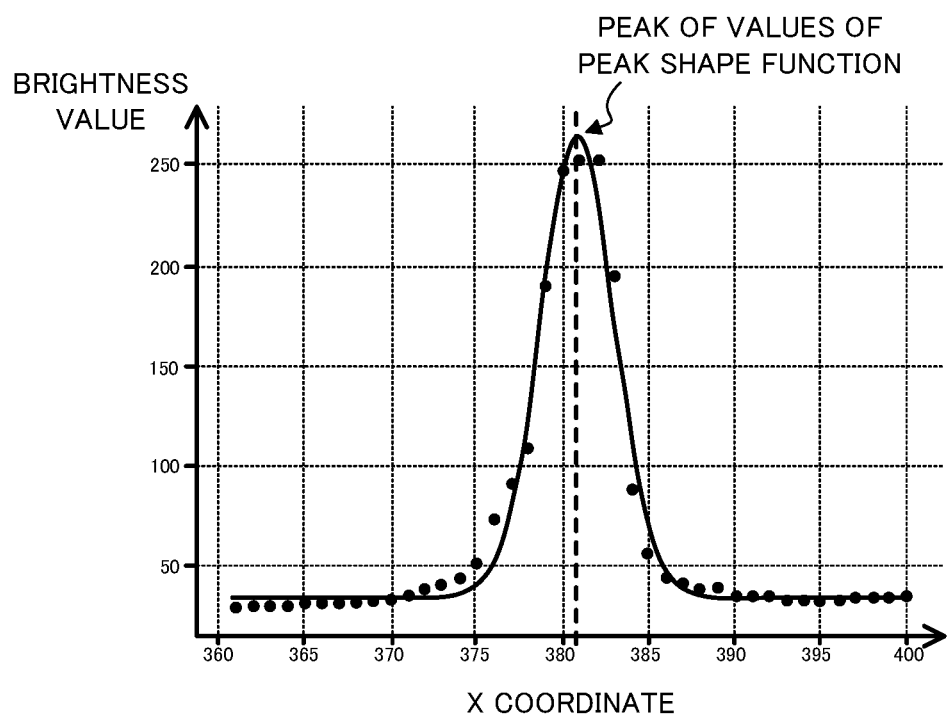
FIG. 24 is a drawing illustrating an example of fitting processing according to Embodiment 4.

FIG. 24 is a drawing illustrating an example of fitting processing according to Embodiment 4. In the graph illustrated in FIG. 24 is a peak shape function graph that illustrates the relationship between the X coordinate value and an average value of a brightness of pixels arranged in the Y direction. The X coordinate value is illustrated on the horizontal axis, and the average value of the brightness of the pixels arranged in the Y direction is illustrated on the vertical axis. As described above, the glossy portion 402 of the metal part 401 appears extending in the vertical direction, that is, the Y direction. As such, the position detector 312 calculates, in the extracted image, the average value of the brightness of the pixels arranged in the Y direction every X coordinate. Additionally, as illustrated in FIG. 24, the position detector 312 executes so-called fitting processing for fitting the average value of the brightness of the pixels arranged in the Y direction calculated every X coordinate to a predetermined peak shape function while minimizing error, and calculates the X coordinate value at which the value of the peak shape function peaks. Note that, in one example, a Gaussian function, a Lorenz function, or the like can be used for the peak shape function. Moreover, the position detector 312 updates the measurement value of the X coordinate to the calculated value, and detects, as the position of the metal part 401, a position based on the updated measurement values of the X coordinate and the Y coordinate.

For example, the position detector 312 calculates the measurement values (X1, Y1) of the X coordinate and the Y coordinate and, then, acquires the width WA4 and the height LA4 of the "peak detection range" of the position inspection setting information. Additionally, the position detector 312 extracts an image that is centered on the measurement values (X1, Y1) of the X coordinate and the Y coordinate and that has width WA4 and the height LA4, and calculates the average value of the brightness of the pixels arranged in the Y direction of all of the X coordinates selectable from the extracted image.

Here, when there are K X coordinates selectable in the extracted image, the selectable X coordinates are defined as XP1, XP2, . . . , XPK, and the average values of the brightness of the pixels arranged in the Y direction of the K X coordinates XP1, XP2, . . . , XPK are defined as YP1, YP2, . . . , YPK. In this case, the position detector 312 calculates the average values YP1 to YPK of the brightness of the pixels arranged in the Y direction of the X coordinates XP1 to XPK, and executes the fitting processing for fitting to the peak shape function to calculate the X coordinate value at which the value of the peak shape function peaks. Additionally, when, for example, the peak shape function is illustrated by the graph illustrated in FIG. 24, the X coordinate value at which the value of the peak shape function peaks is "381" and, as such, the position detector 312 sets X1=381 and updates the measurement value X1 of the X coordinate to "381."

FIG. 25 is a flowchart illustrating position inspection processing according to Embodiment 2. The operations of the inspection device 1 according to Embodiment 4 for inspecting the position of the metal part 401 are described using the flowchart illustrated in FIG. 25. Firstly, as illustrated in FIG. 25, the position detector 312 executes the processing of steps S401 to S410 and, then, acquires the peak detection range of the position inspection setting information corresponding to the product name selected on the inspection screen 7 (step S471). For example, when the "substrate A" is selected on the inspection screen 7, the position detector 312 acquires "(WA4, LA4)" of the position inspection setting information.

Additionally, the position detector 312 extracts, from the image to be inspected, an image corresponding to the lengths of the width and the height of the acquired peak detection range, centered on the coordinates of the calculated measurement values of the X coordinate and the Y coordinate (step S472). Additionally, the position detector 312 calculates the average value of the brightness of the pixels arranged in the Y direction for all of the X coordinates selectable from the extracted image (step S473). For example, the position detector 312 extracts, from the image to be inspected, an image that is centered on the coordinates of the calculated measurement values (X1, Y1) of the X coordinate and the Y coordinate and that has the width WA4 and the height LA4, and calculates the average values YP1 to YPK of the brightness of the pixels arranged in the Y direction for the X coordinates XP1 to XPK.

The position detector 312 executes the fitting processing for fitting the average values of the brightness of the pixels arranged in the Y direction calculated every X coordinate, calculates the X coordinate value at which the value of the peak shape function peaks (step S474), and updates the measurement value of the X coordinate to the calculated value (step S475). For example, the position detector 312 executes the fitting processing illustrated in FIG. 24, calculates the X coordinate value at which the value of the peak shape function peaks as "381", and sets X1=381 to update the measurement value X1 of the X coordinate to "381." Then, the position standard determiner 313 executes the processing of steps S411 to S415, and ends the processing.

As described above, with the inspection device 1 according to Embodiment 2, the position detector 312 calculates the measurement values of the X coordinate and the Y coordinate, that is, calculates the coordinates of the center of the image of the pattern size having the maximum score and, then, extracts an image that is centered on those coordinates and that has the peak detection range. Additionally, the position detector 312 calculates, from the extracted image and every X coordinate, the average value of the brightness of the pixels arranged in the Y direction, and calculates the X coordinate value at which the value of the peak shape function, which is an approximate function of the average value, peaks. Moreover, the position detector 312 updates the measurement value of the X coordinate to the calculated value, and detects, as the position of the metal part 401, a position based on the updated measurement values of the X coordinate and the Y coordinate.

As a result, compared to an inspection device that does not update the measurement value of the X coordinate to the X coordinate value at which the value of the peak shape function peaks, the inspection device 1 can bring the detected position of the metal part 401 closer to the position at which the brightness of the glossy portion 402 peaks and can detect the position of the metal part 401 with excellent accuracy. Note that the inspection device 1 according to Embodiment 4 also demonstrates the same effects as the inspection device 1 according to Embodiment 1.

Note that, in Embodiment 4, the glossy portion 402 of the metal part 401 appears extending in the Y direction and, as such, the position detector 312 obtains the average value of the brightness of the pixels arranged in the Y direction every X coordinated to calculate only the peak in the X direction, but Embodiment 4 is not limited thereto. For example, a configuration is possible in which, when the glossy portion 402 of the metal part 401 appears extending the X direction, the position detector 312 obtains the average value of the brightness of the pixels arranged in the X direction every Y coordinate to calculate only the peak in the Y direction. Additionally, for example, a configuration is possible in which, when the glossy portion 402 of the metal part 401 appears in a round shape, the position detector 312 obtains the average value of the brightness of the pixels arranged in the Y direction every X coordinate to calculate the peak in the X direction, and obtains the average value of the brightness of the pixels arranged in the X direction every Y coordinate to calculate the peak in the Y direction. Furthermore, a configuration is possible in which the position detector 312 calculates, in accordance with the shape of the glossy portion 402 of the metal part 401, peaks in the X direction and the Y direction.

Additionally, for example, a configuration is possible in which, when the glossy portion 402 of the metal part 401 appears extending in a diagonal direction inclined with respect to the X direction and the Y direction, the position detector 312 obtains, every coordinate in an orthogonal direction that is orthogonal to the inclination direction, the average value of the brightness of the pixels arranged in the inclination direction to calculate the peak in the inclined direction. Furthermore, a configuration is possible in which the position detector 312 calculates, in accordance with the shape of the glossy portion 402 of the metal part 401, the peak of the inclination direction.

Note that, it is preferable that, as in Embodiment 4, in order to update the measurement value of the X coordinate, the position detector 312 executes fitting processing for fitting, to the peak shape function, the average value of the brightness of the pixels arranged in the Y direction every X coordinate calculated from the extracted image to calculate the X coordinate value at which the value of the peak shape function peaks. However, the method for updating the measurement value of the X coordinate is not limited thereto. For example, a configuration is possible in which the position detector 312 updates the measurement value of the X coordinate to the X coordinate value at which the average value of the brightness of the pixels arranged in the Y direction every X coordinate is greatest. In this case, the detected position of the metal part 401 can, by processing simpler than the fitting processing, be brought near to the position at which the brightness of the glossy portion 402 peaks.

As described above, in Embodiment 4, as in Embodiment 2, the position detector 312 extracts a plurality of image having a pattern size by extracting, from in the position detection range, images having the pattern size every rough detection spacing. However, Embodiment 4 is not limited thereto. For example, the configurations of Embodiments 2 and 4 may be combined. Specifically, a configuration is possible in which the position detector 312 roughly extracts, from the position detection range, images having the pattern size every rough detection spacing, and updates the coordinates on the basis of a brightness value of a pixel of an extracted image centered on the coordinates of the image of the pattern size having the maximum score.

In Embodiment 4, the position detector 312 does not extract images having the pattern size after updating the position detection range on the basis of the rough detection result coordinates calculated using the rough detection model as in Embodiment 3. However, Embodiment 4 is not limited thereto. For example, a configuration is possible in which the configurations of Embodiments 3 and 4 are combined, and the position detector 312 updates the position detection range on the basis of rough detection results coordinates calculated using the rough detection model and, then updates those coordinates on the basis of the brightness value of a pixel from image an image extracted with the coordinates of the image having the maximum score, among the extracted images having the pattern size, as the center.

Note that the main portion that carries out the processing of the computer 3 that includes the controller 51, the main storage 52, the external storage 53, the operator 54, the display 55, the transmitter/receiver 56, the internal bus 50, and the like can be realized using a typical computer system instead of by a dedicated system. For example, the computer 3 that executes the processing described above may be configured by storing and distributing a computer program for executing the operations described above on a non-transitory storage medium that is readable by the computer 3 such as, for example, a flexible disk, a DVD read-only memory (ROM) or the like, and installing that computer program on a computer. Additionally, the computer 3 may be configured by storing the computer program on a storage device of a server device on a communication network such as the internet or the like, and downloading by a typical computer system.

When, for example, the functions of the computer 3 are realized by being divided between an operating system (OS) and an application/program, or are realized by cooperation between an OS and an application/program, it is possible to store only the application/program portion on the non-transitory recording medium or the recording device.

Additionally, the computer program can be piggybacked on a carrier wave and provided via a communication network. For example, a configuration is possible in which the computer program is posted to a bulletin board system (BBS) on a communication network, and the computer program is provided via a network.

Moreover, a configuration is possible in which the processing described above is executed by starting the computer program and, under the control of the OS, executing the computer program in the same manner as other applications/programs.

In addition, the configurations of the inspection device 1, the inspection method, and the program according to Embodiments 1 to 4 are examples, and can be changed and modified as desired provided that the problem to be solved of the present disclosure can be solved.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-132473, filed on Jul. 18, 2019, the entire disclosure of which is incorporated by reference herein.

REFERENCE SIGNS LIST

1 Inspection device
2 Imaging device
3 Computer
4 Substrate
5 Initial screen
6 Training screen
7 Inspection screen
50 Internal bus
51 Controller
52 Main storage
53 External storage
54 Operator
55 Display
56 Transmitter/receiver
59 Control program
201 Bottom plate
202 to 205 Support pillar
206 Ceiling plate
207 Horizontal direction positioning block
208 Vertical position positioning block
209 Imager
210, 211 Illumination light output device
301 Input device
302 Imaging controller
303 Illumination light controller
304 Setting information storage
305 Image information storage
306 Position training information storage
307 Abnormality training information storage
308 Reference position calculator
309 Masked image generator
310 Position detection model generator
311 Position detection model storage
312 Position detector
313 Position standard determiner
314 Position outputter
315 Abnormality detection model generator
316 Abnormality detection model storage
317 Abnormality detector
318 Abnormality standard determiner
319 Abnormality outputter
320 Initial screen display
321 Training screen display
322 Inspection screen display
323 Overall determiner
324 Overall determination result outputter
325 Overall determination result storage
326 Rough detection model generator
327 Rough detection model storage
401 Metal part
402 Glossy portion
501 Training screen display button
502 Inspection screen display button
503 End button 601 Training image display field
602, 702 Product selection field
603 Training image selection field
604 Training image capture button
605 Training image read button
606 Training image delete button
607 Positing training information display field
608 Abnormality training information display field
609 Position training information apply button
610 First abnormality training information apply button
611 Enlarged display field
612 Second abnormality training information apply button
613, 708 Store button
614 Train button
615, 709 Back button
616 Abnormality category selection field
617 Add abnormality category button
618 Delete abnormality category button
619 Cursor
620 Position corresponding to glossy portion
621 Position corresponding to abnormality
622 Region display frame
623 Image of abnormality
701 Inspection image display field
703 Position inspection information display field
704 Abnormality inspection information display field
705 Mark display switch field
706 Overall determination field
707 Execute inspection button
710 Position corresponding to measurement values
711 Measurement value mark

The invention claimed is:
1. An inspection device comprising:
a position detector to detect a position of an inspection target in an inspection image by (i) extracting a plurality of portions of the inspection image on the basis of a rough detection result of the position of the inspection target calculated by applying the inspection image including the inspection target to a position rough detection model generated by machine learning using image information of a training image, (ii) applying the plurality of extracted portions of the inspection image to a position detection model generated by machine learning using the image information of the training image to calculate a position detection score for the plurality of extracted portions of the inspection image, (iii) specifying an extracted portion from the plurality of extracted portions of the inspection image where the position detection score satisfies a predetermined relationship, and then (iv) specifying a position of a pixel in the inspection image where a brightness value of a pixel among a plurality of pixels is greatest in a predetermined range centered on a position of the specified extracted portion of the inspection image and (v) detecting, based on the specified position of the pixel in the inspection image where the brightness value is greatest, the position of the inspection target in the inspection image; and
a position outputter to output the position of the inspection target detected by the position detector.
2. The inspection device according to claim 1, further comprising:
a position standard determiner to determine whether the position of the inspection target detected by the position detector conforms to a predetermined standard.
3. The inspection device according to claim 1, wherein the position detection model is generated by machine learning further using position detection range information expressing a detection range in the training image.
4. The inspection device according to claim 1, further comprising:
an abnormality detector to detect an abnormality of a surface of the inspection target in the inspection image by applying the inspection image to an abnormality detection model, generated by machine learning using the image information of the training image, wherein the abnormality detector is configured to extract, from the inspection image, an image having a pattern size in an abnormality detection range, and to calculate, on the extracted image, a score for each abnormality category; and
an abnormality outputter to output the abnormality of the inspection target detected by the abnormality detector.
5. The inspection device according to claim 4, further comprising:
an abnormality standard determiner to determine whether a predetermined standard is conformed to, even when there is the abnormality of the inspection target detected by the abnormality detector.
6. The inspection device according to claim 4, wherein the abnormality detection model is generated by machine learning further using abnormality detection range information expressing a detection range in the training image.
7. The inspection device according to claim 1, further comprising:
a position detection model generator to generate the position detection model by machine learning using the image information of the training image.
8. The inspection device according to claim 7, further comprising:
a masked image generator to generate a masked image in which a mask that covers a portion where an abnormality is detected is applied to the training image that is acquired in advance and that includes an inspection target in which the abnormality is detected, wherein
the position detection model generator to generate the position detection model by machine learning using image information of the masked image.
9. The inspection device according to claim 7, further comprising:
an imager to image the inspection target; and
an illumination light output device to output illumination light on the inspection target, wherein
the position detection model generator generates the position detection model by machine learning about an image including reflected light from when the illumination light is output on the inspection target.
10. The inspection device according to claim 1, further comprising:
a position rough detection model generator to generate the position rough detection model by machine learning using the image information of the training image.
11. The inspection device according to claim 4, further comprising:
an abnormality detection model generator to generate the abnormality detection model by machine learning using the image information of the training image.
12. The inspection device according to claim 1, wherein the inspection target includes a glossy portion.
13. The inspection device according to claim 1, wherein the inspection target is a metal part that includes a glossy portion.

14. An inspection method comprising:
  detecting a position of an inspection target in an inspection image by (i) extracting a plurality of portions of the inspection image on the basis of a rough detection result of the position of the inspection target calculated by applying the inspection image including the inspection target to a position rough detection model generated by machine learning using image information of a training image, (ii) applying the plurality of extracted portions of the inspection image to a position detection model generated by machine learning using the image information of the training image to calculate a position detection score for the plurality of extracted portions of the inspection image, (iii) specifying an extracted portion from the plurality of extracted portions of the inspection image where the position detection score satisfies a predetermined relationship, and then (iv) specifying a position of a pixel in the inspection image where a brightness value of a pixel among a plurality of pixels is greatest in a predetermined range centered on a position of the specified extracted portion of the inspection image and (v) detecting, based on the specified position of the pixel in the inspection image where the brightness value is greatest, the position of the inspection target in the inspection image; and
  outputting the position of the inspection target detected in the detecting.

15. The inspection method according to claim 14, wherein the inspection target includes a glossy portion.

16. The inspection method according to claim 14, wherein the inspection target is a metal part that includes a glossy portion.

17. A non-transitory computer-readable recording medium storing a program, the program causing a computer to function as:

a position detector to detect a position of an inspection target in an inspection image by (i) extracting a plurality of extracted portions of the inspection image on the basis of a rough detection result of the position of the inspection target calculated by applying the inspection image including the inspection target to a position rough detection model generated by machine learning using image information of a training image, (ii) applying the plurality of extracted portions of the inspection image to a position detection model generated by machine learning using the image information of the training image to calculate a position detection score for the plurality of extracted portions of the inspection image, (iii) specifying an extracted portion from the plurality of extracted portions of the inspection image where the position detection score satisfies a predetermined relationship, and then (iv) specifying a position of a pixel in the inspection image where a brightness value of a pixel among a plurality of pixels is greatest in a predetermined range centered on a position of the specified extracted portion of the inspection image and (v) detecting, based on the specified position of the pixel in the inspection image where the brightness value is greatest, the position of the inspection target in the inspection image; and
  a position outputter to output the position of the inspection target detected by the position detector.

18. The non-transitory computer-readable recording medium according to claim 17, wherein the inspection target includes a glossy portion.

19. The non-transitory computer-readable recording medium according to claim 17, wherein the inspection target is a metal part that includes a glossy portion.

* * * * *